US012699567B2

(12) United States Patent
Horsnell et al.

(10) Patent No.: US 12,699,567 B2
(45) Date of Patent: Aug. 4, 2026

(54) MARK-LIVE INSTRUCTION THAT SETS DISCARD-ELIGIBILITY METADATA IN CACHE LINES FOR USE BY MARK-DEAD EVENTS

(71) Applicant: Arm Limited, Cambridge (GB)

(72) Inventors: Matthew James Horsnell, Cambridge (GB); Thomas Philip Speier, Wake Forest, NC (US); Salil Ramchandra Akerkar, Austin, TX (US); Richard Roy Grisenthwaite, Cambridge (GB)

(73) Assignee: Arm Limited, Cambridge (GB)

( * ) Notice: Subject to any disclaimer, the term of this patent is extended or adjusted under 35 U.S.C. 154(b) by 24 days.

(21) Appl. No.: 19/016,098

(22) Filed: Jan. 10, 2025

(65) Prior Publication Data

US 2026/0203063 A1     Jul. 16, 2026

(51) Int. Cl.
G06F 9/30 (2018.01)
G06F 12/08 (2016.01)
G06F 12/0875 (2016.01)

(52) U.S. Cl.
CPC ........ G06F 9/3016 (2013.01); G06F 12/0875 (2013.01); *G06F 2212/452* (2013.01)

(58) Field of Classification Search
CPC .............. G06F 9/30047; G06F 9/3834; G06F 12/0808; G06F 12/0811; G06F 12/0815; G06F 12/0882; G06F 12/0891
See application file for complete search history.

(56) References Cited

U.S. PATENT DOCUMENTS

| | | | | |
|---|---|---|---|---|
| 11,204,878 | B1 * | 12/2021 | Pusdesris | ............ G06F 12/0804 |
| 11,526,449 | B2 | 12/2022 | Alsop | |
| 11,556,478 | B2 * | 1/2023 | Dropps | .............. G06F 12/0824 |
| 12,524,344 | B1 * | 1/2026 | Gendler | .............. G06F 12/0802 |

(Continued)

OTHER PUBLICATIONS

International Search Report and Written Opinion of the International Searching Authority for PCT/GB2025/060056 mailed Feb. 27, 2026, 14 pages.

(Continued)

*Primary Examiner* — Jacob Petranek
(74) *Attorney, Agent, or Firm* — NIXON & VANDERHYE P.C.

(57) ABSTRACT

An apparatus comprises instruction decoding circuitry configured to decode instructions; and processing circuitry configured to perform data processing in response to the instructions decoded by the instruction decoding circuitry. Cache control circuitry is configured to set, in response to the instruction decoding circuitry decoding a mark-live instruction specifying mark-live target address information, discard-eligibility metadata associated with one or more target cache lines selected based on the mark-live target address information, to identify the one or more target cache lines as being eligible for being treated as a discardable cache line which is allowed to be discarded without data writeback even if the discardable cache line is dirty. In response to a mark-dead event associated with a given cache line, the cache control circuitry determines depending on the discard-eligibility metadata for the given cache line whether the given cache line is eligible for becoming a discardable cache line.

20 Claims, 29 Drawing Sheets

(56)                References Cited

U.S. PATENT DOCUMENTS

| | | | |
|---|---|---|---|
| 2004/0064651 A1 | 4/2004 | Conway | |
| 2007/0157007 A1 | 7/2007 | Jourdan | |
| 2014/0173214 A1 | 6/2014 | Ramrakhyani | |
| 2014/0304477 A1 | 10/2014 | Hughes et al. | |
| 2015/0347299 A1 | 12/2015 | Hagersten et al. | |
| 2022/0066940 A1* | 3/2022 | Alsop | G06F 12/0882 |
| 2022/0197797 A1 | 6/2022 | Mandal | |
| 2023/0236992 A1* | 7/2023 | Bruce | G06F 13/16 |
| | | | 710/306 |

OTHER PUBLICATIONS

International Search Report and Written Opinion of the International Searching Authority for PCT/GB2025/060057 mailed Feb. 26, 2026, 14 pages.

International Search Report and Written Opinion of the International Searching Authority for PCT/GB2025/060058 mailed Feb. 26, 2026, 15 pages.

International Search Report and Written Opinion of the International Searching Authority for PCT/GB2025/060059 mailed Feb. 27, 2026, 15 pages.

J.B. Sartor, "Cooperative Cache Scrubbing" Proceedings of the 23$^{rd}$ International Conference on Parallel Architectures and Compilation Techniques PACT' 14, Aug. 24-27, 2014, pp. 15-26.

U.S. Appl. No. 19/015,990, filed Jan. 10, 2025, Horsnell et al.

U.S. Appl. No. 19/016,082, filed Jan. 10, 2025, Horsnell et al.

U.S. Appl. No. 19/016,049, filed Jan. 10, 2025, Horsnell et al.

Robert Bedichek, "Some Efficient Architecture Simulation Techniques," Proceedings of the Winter 1990 USENIX Conference, Jan. 22-26, 1990, 12 pages.

Arm Limited, "Arm® Architecture Registers for A-profile architecture" Sep. 26, 2024, 7 pages.

Office Action dated Mar. 19, 2026 for U.S. Appl. No. 19/016,049, 17 pages.

* cited by examiner

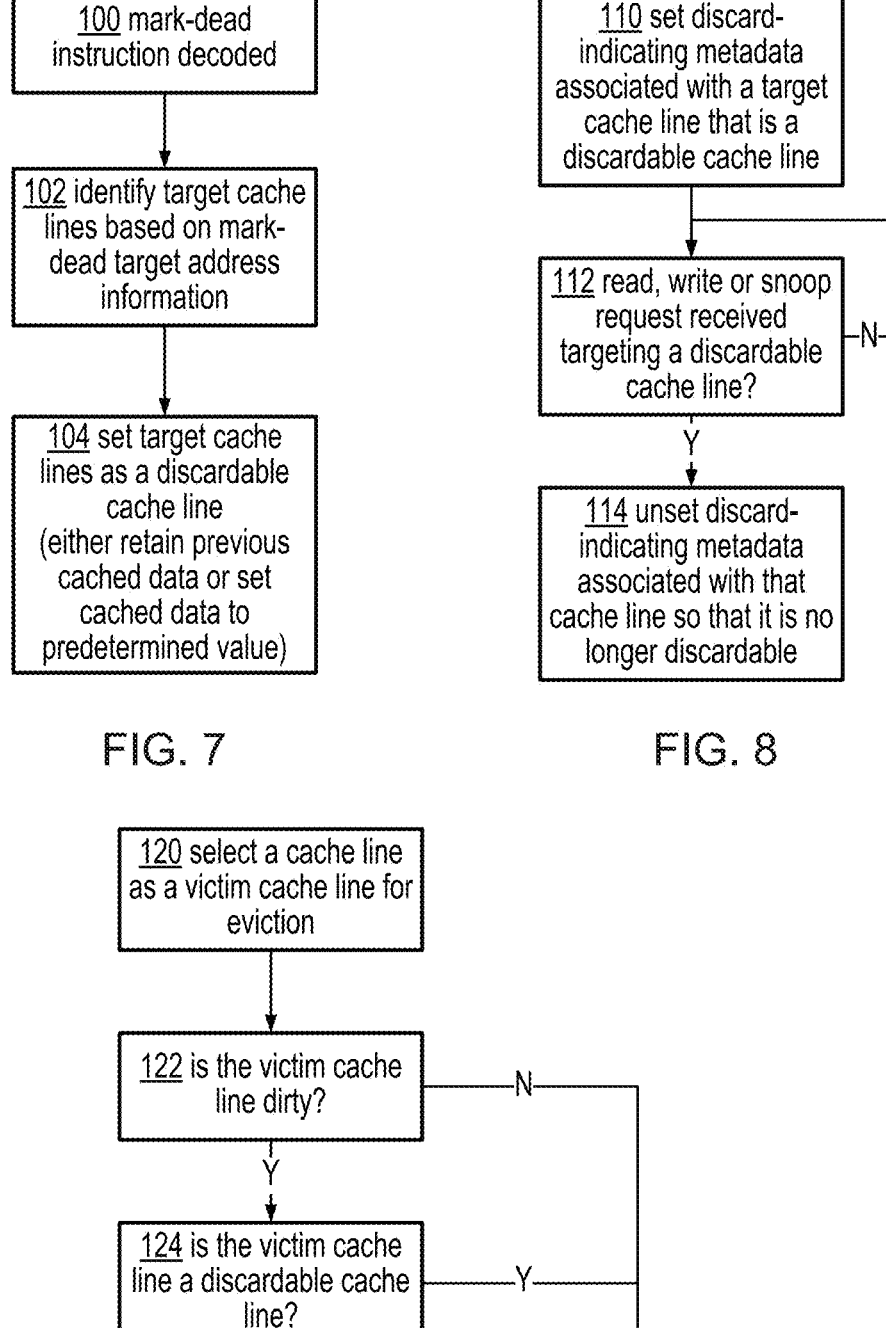

100 mark-dead instruction decoded 102 identify target cache lines based on mark-dead target address information 104 set target cache lines as a discardable cache line (either retain previous cached data or set cached data to predetermined value)

FIG. 7

110 set discard-indicating metadata associated with a target cache line that is a discardable cache line 112 read, write or snoop request received targeting a discardable cache line? —N

Y 114 unset discard-indicating metadata associated with that cache line so that it is no longer discardable

FIG. 8

120 select a cache line as a victim cache line for eviction 122 is the victim cache line dirty? ——N——

Y 124 is the victim cache line a discardable cache line? ——————Y————

N 126 perform data writeback and evict cache line 128 evict cache line without performing a data writeback

FIG. 9 mark-live calloc variant

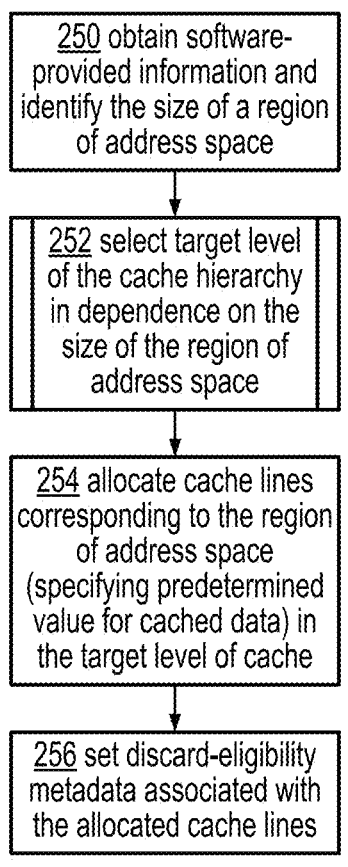

250 obtain software-provided information and identify the size of a region of address space 252 select target level of the cache hierarchy in dependence on the size of the region of address space 254 allocate cache lines corresponding to the region of address space (specifying predetermined value for cached data) in the target level of cache 256 set discard-eligibility metadata associated with the allocated cache lines

FIG. 17

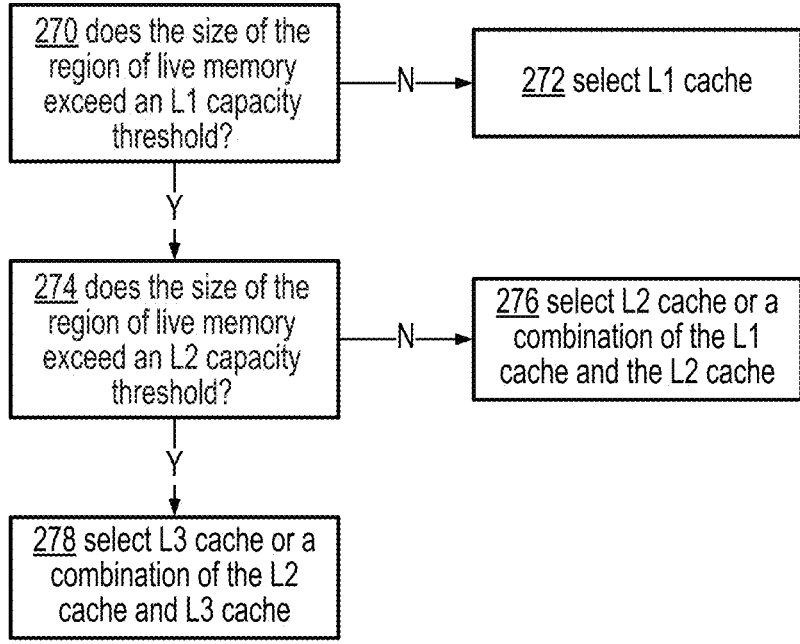

270 does the size of the region of live memory exceed an L1 capacity threshold?

—N→ 272 select L1 cache

Y 274 does the size of the region of live memory exceed an L2 capacity threshold?

—N→ 276 select L2 cache or a combination of the L1 cache and the L2 cache

Y 278 select L3 cache or a combination of the L2 cache and L3 cache

FIG. 18

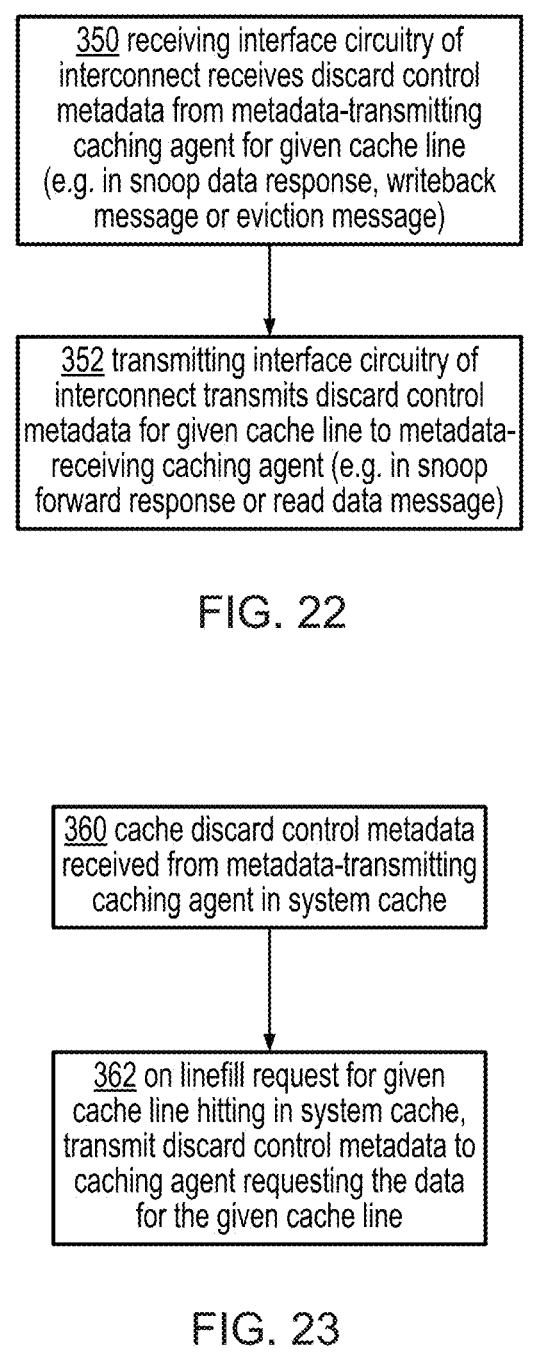

350 receiving interface circuitry of interconnect receives discard control metadata from metadata-transmitting caching agent for given cache line (e.g. in snoop data response, writeback message or eviction message)

352 transmitting interface circuitry of interconnect transmits discard control metadata for given cache line to metadata-receiving caching agent (e.g. in snoop forward response or read data message)

FIG. 22

360 cache discard control metadata received from metadata-transmitting caching agent in system cache 362 on linefill request for given cache line hitting in system cache, transmit discard control metadata to caching agent requesting the data for the given cache line

FIG. 23

| Stimulus | CPU $ | | Interconnect Request | Shared $ | |
|---|---|---|---|---|---|
| | Initial | Final | | Snoop filter | Final |
| dc mark_live_va | I | UD-xy / I | MU | U | I/UD-xy |
| | SC | UC-x | MRU | | I |
| | UC | | none | | |
| | UC-x | | | | |
| | UD | UD/UD-x/UD-xy | | | |
| | UD-x | UD-x | | | |
| | UD-xy | UD-xy | | | |
| dc mark_dead_va | UC-x | UC-y/UD-y | none | U | I |
| | UD-x | UD-y | none | | |
| | UD-xy | UD-y | none | | |
| | SC-x | UC-y/UD-y | MRU/MU | | |
| CopyBack | UC-x | I | WEOE or WEF or Evict+x | I | UC-x |
| | UD-x | | WBF+x | | UD-x |
| | UD-y | | WBF+y | | UD-y |
| | UD-xy | | WBF+xy | | UD-xy |
| | SC-x | | WEOE or Evict+x | | SC-x |

Meta-bits describing 'discardable' property of cacheline.

x – discard-eligible
y – discardable

FIG. 32

| Stimulus | CPU $ (RNF0) | | Other $ | | Shared $ |
|---|---|---|---|---|---|
| | Initial | Final | Other CPU1$ (RNF1) | | |
| Rd-Sharing SnpRd | UC-x | SC-x | SC | | SC |
| | UD-x | SC-x | SC-x | | SD-x |
| | UD-y | SC | SC | | SD |
| | UD-xy | SC-x | SC-x | | SD-x |
| | SC-x | SC-x | SC-x | | SC-x |
| Wr-Sharing SnpWr | UC | — | UC | | — |
| | UC-x | | UC-x | | |
| | UD-x | | UD-x | | |
| | UD-xy | | UC-x | | |
| | SC-x | | UC-x | | |
| PE-side read/write (access) | UD-xy | UD-x | none | | |
| | UD-y | UD | | | |

FIG. 33

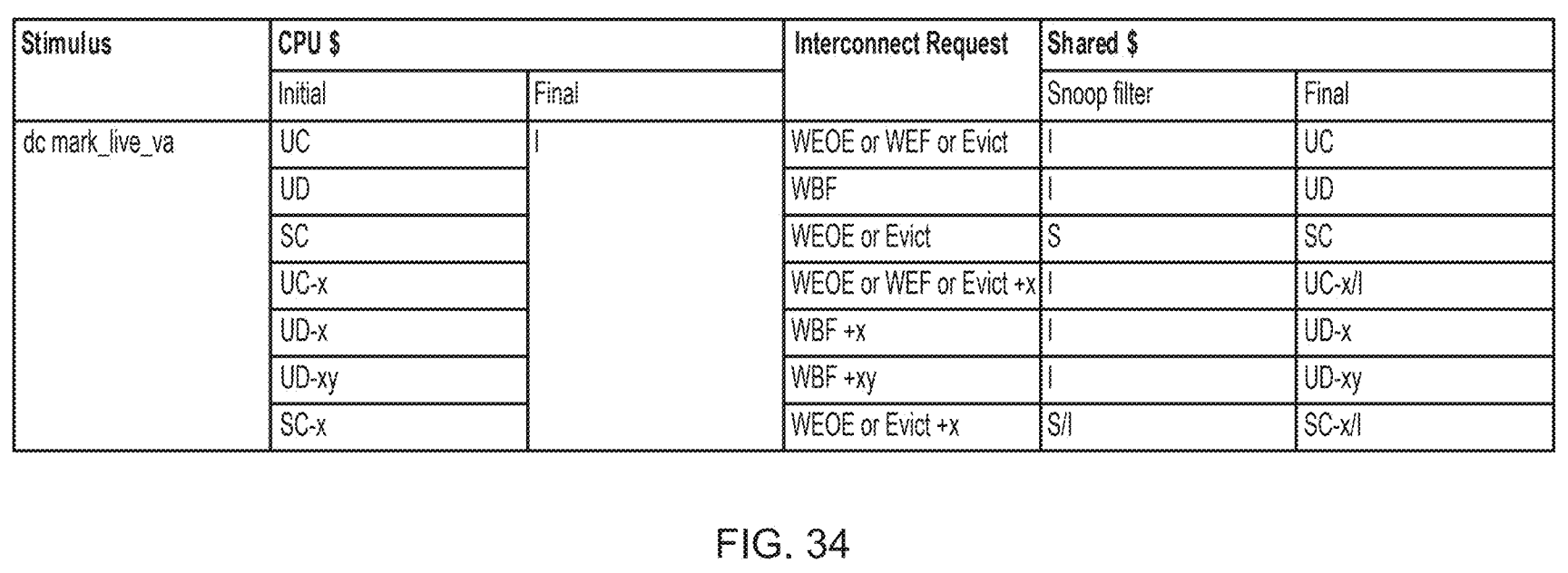

| Stimulus | CPU $ | | Interconnect Request | Shared $ | |
|---|---|---|---|---|---|
| | Initial | Final | | Snoop filter | Final |
| dc mark_live_va | UC | I | WEOE or WEF or Evict | I | UC |
| | UD | | WBF | I | UD |
| | SC | | WEOE or Evict | S | SC |
| | UC-x | | WEOE or WEF or Evict +x | I | UC-x/I |
| | UD-x | | WBF +x | I | UD-x |
| | UD-xy | | WBF +xy | I | UD-xy |
| | SC-x | | WEOE or Evict +x | S/I | SC-x/I |

FIG. 34

MARK-LIVE INSTRUCTION THAT SETS DISCARD-ELIGIBILITY METADATA IN CACHE LINES FOR USE BY MARK-DEAD EVENTS

BACKGROUND

Technical Field

The present technique relates to the field of data processing.

Technical Background

An apparatus for processing data may have instruction decoding circuitry for decoding instructions according to an instruction set architecture, and processing circuitry for performing data processing in response to the instructions decoded by the instruction decoding circuitry. A cache may be provided to cache, for faster access, data for a given subset of addressable memory. The processing circuitry may make cached data dirty, by writing to the cached data without also writing back the update to the corresponding item of data in memory. When the dirty data is eventually evicted from the cache, a data writeback may be performed to transfer the dirty data from the cache to a further level of cache or to main memory.

An interconnect may be provided to route communications between components of a data processing system, such as one or more caching agents (such as processors) having caches, other non-caching memory access requesters (such as peripheral devices) and memory controllers for accessing memory storage.

SUMMARY

At least some examples of the present technique provide an apparatus comprising: instruction decoding circuitry configured to decode instructions; processing circuitry configured to perform data processing in response to the instructions decoded by the instruction decoding circuitry; and cache control circuitry configured to: set, in response to the instruction decoding circuitry decoding a mark-live instruction specifying mark-live target address information, discard-eligibility metadata associated with one or more target cache lines selected based on the mark-live target address information, to identify the one or more target cache lines as being eligible for being treated as a discardable cache line which is allowed to be discarded without data writeback even if the discardable cache line is dirty; and in response to a mark-dead event associated with a given cache line, determine depending on the discard-eligibility metadata for the given cache line whether the given cache line is eligible for becoming a discardable cache line.

At least some examples of the present technique provide a system comprising: the apparatus described above, implemented in at least one packaged chip; at least one system component; and a board, wherein the at least one packaged chip and the at least one system component are assembled on the board.

At least some examples of the present technique provide a chip-containing product comprising the system described above, wherein the system is assembled on a further board with at least one other product component.

At least some examples of the present technique provide computer-readable code for fabrication of the apparatus described above.

At least some examples of the present technique provide a method comprising: decoding instructions; performing data processing in response to the decoded instructions; and in response to decoding a mark-live instruction specifying mark-live target address information, setting discard-eligibility metadata associated with one or more target cache lines selected based on the mark-live target address information, to identify the one or more target cache lines as being eligible for being treated as a discardable cache line which is allowed to be discarded without data writeback even if the discardable cache line is dirty; and in response to a mark-dead event associated with a given cache line, determining depending on the discard-eligibility metadata for the given cache line whether the given cache line is eligible for becoming a discardable cache line.

At least some examples provide a computer program for controlling a host data processing apparatus to provide an instruction execution environment for execution of target program code, the computer program comprising: comprising instructions which, when executed by a host data processing apparatus, control the host data processing apparatus to provide an instruction execution environment for execution of target code, the computer program comprising: instruction decoding program logic configured to decode instructions of the target code; processing program logic configured to control the host data processing apparatus to perform data processing in response to the instructions decoded by the instruction decoding program logic; and cache control program logic configured to: set, in response to decoding a mark-live instruction specifying mark-live target address information, discard-eligibility metadata associated with one or more target cache lines selected based on the mark-live target address information, to identify the one or more target cache lines as being eligible for being treated as a discardable cache line which is allowed to be discarded without data writeback even if the discardable cache line is dirty; and in response to a mark-dead event associated with a given cache line, determine depending on the discard-eligibility metadata for the given cache line whether the given cache line is eligible for becoming a discardable cache line.

Further aspects, features and advantages of the present technique will be apparent from the following description of examples, which is to be read in conjunction with the accompanying drawings.

BRIEF DESCRIPTION OF THE DRAWINGS

FIG. 7 illustrates processing of a mark-dead instruction;

FIG. 8 illustrates unsetting discard-indicating metadata in response to a read, write or snoop request;

FIG. 9 illustrates victim selection;

FIG. 17 illustrates selection of a target level to be allocated with cache lines corresponding to a software-specified region of address space;

FIG. 18 illustrates a particular example for controlling the selection of the target level;

FIG. 22 illustrates propagation of discard control metadata using the interconnect;

FIG. 23 illustrates caching of discard control metadata in a system cache;

FIGS. 32 and 33 illustrate a first example of coherency state and discard control metadata transitions associated with various events;

FIG. 34 shows a second example of coherency state and discard control metadata transitions in response to a mark-dead instruction;

DESCRIPTION OF EXAMPLES

Figure 1:
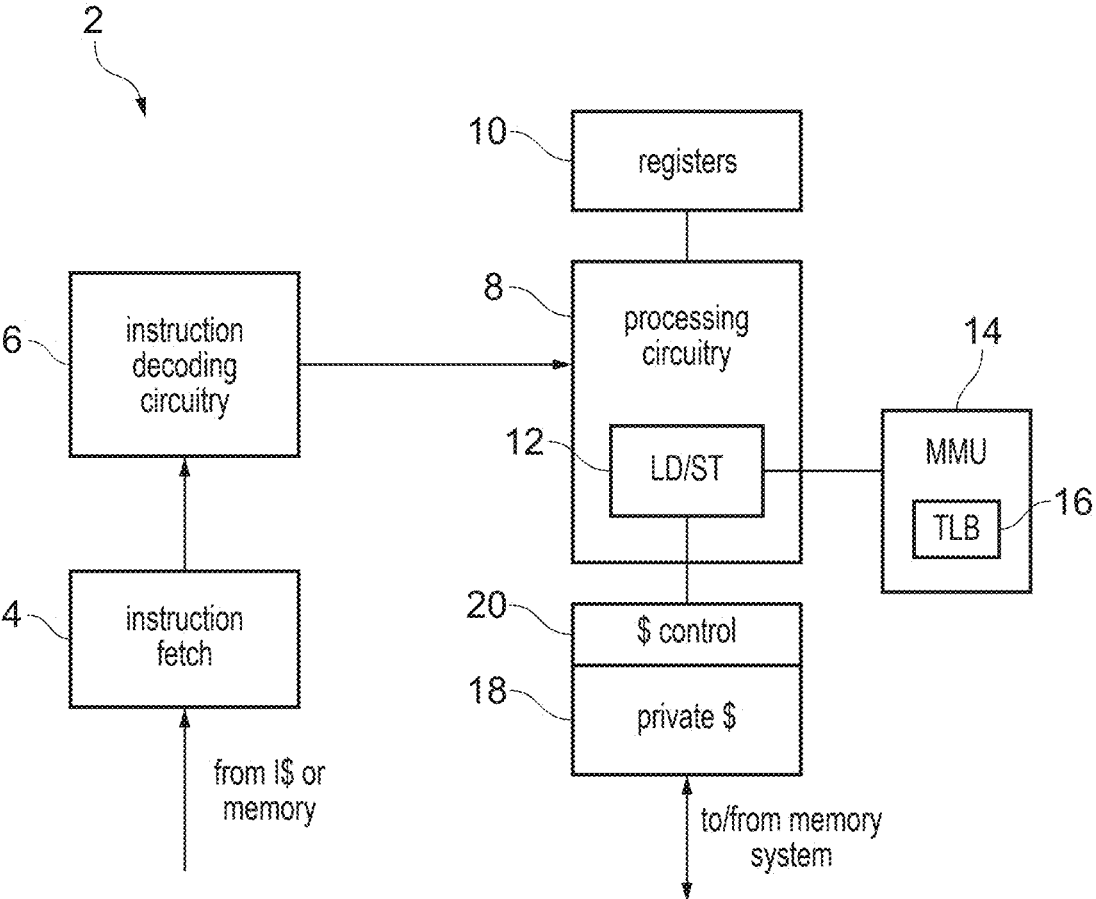
FIG. 1 illustrates an example apparatus comprising instruction decoding circuitry, processing circuitry and cache control circuitry.

Examples of the above techniques are set out below.
Mark-Dead Instruction

Memory system hardware may be configured to perform various memory operations to maintain data coherency. In some cases, such as when a software process terminates or otherwise frees an allocated region of memory for reuse for a different purpose, a cache line holding data associated with the prior memory allocation may not be of any further use. Hence, data coherency is unnecessary and any memory operations performed to maintain such data coherency (e.g. writebacks of dirty cached data) may only take up memory system bandwidth for no benefit. Hence, the inventors have recognised that it would be useful for software to be capable of signalling to the hardware that one or more cache lines contain "dead" data, i.e. data that will not be needed again (as opposed to "live" data which may be needed again).

Hence, in examples discussed below, a mark-dead instruction is supported which enables certain cache lines to be set as discardable cache lines so that the memory system is capable of recognising the cache lines that contain data which is now dead. The apparatus may comprise cache control circuitry configured to set, in response to the instruction decoding circuitry decoding a mark-dead instruction specifying mark-dead target address information, one or more target cache lines selected based on the mark-dead target address information as a discardable cache line. In accordance with the following examples, a discardable cache line is allowed to be discarded without performing a data writeback, even if the data of the discardable cache line is dirty.

"Dirty" herein refers to a coherence state that indicates that the cached data has been modified to be different from the corresponding data in a further level of cache or in memory. If the data was live, then when the cache line is evicted from the cache, e.g. due to allocation of a new cache line, the memory system writes the dirty data back to the memory so that the modified value can be retrieved again in future. However, this is not necessary when the data in that cache line is dead. Hence, in accordance with the following examples, the discardable cache line may be simply discarded, thereby avoiding the data writeback and freeing up memory system bandwidth for other purposes and providing an overall improvement in performance.

In response to the instruction decoding circuitry decoding the mark-dead instruction, the cache control circuitry may perform various different functions for a cache line that is set as discardable. In more aggressive examples, the cache control circuitry may cause discardable cache lines to be invalidated from the cache upon the cache line being set as discardable (e.g. as a direct response to the mark-dead instruction that causes the cache line to become discardable). The discardable cache line may be evicted immediately upon being marked as discardable, or the eviction may occur when there are no other cache maintenance operations being performed. However, in other examples, it may not be necessary to discard the discardable cache line quickly. Hence, the cache control circuitry may instead set discard-indicating metadata associated with the one or more target cache lines to indicate that the one or more target cache lines are discardable. In this way, the one or more target cache lines can be identified and treated as discardable at any time after the mark-dead instruction is decoded, e.g. the discarding of the discardable cache line could be deferred until there is a need to evict the cache line upon reallocation of the corresponding cache entry for storing a different cache line.

In some examples, despite data being marked as dead, it may be targeted by a memory access, e.g. read as part of debugging the program. If so, then for such purposes, the dead data may still be useful to write back to memory for the dead data to be available to view later. For example, it may be confusing for the debugger if repeated reads to the same location yield different values (before and after the dropping of the dead data)—there could be a risk of this happening if the line was allowed to become discarded without writeback even once read by the debugger or another observer. Similar issues may occur with write or snoop requests to the line, which are a sign that another observer is interacting with the cache line. Hence, the cache control circuitry may be configured to respond to receiving a read, write or snoop request targeting the one or more cache lines that are discardable cache lines to unset the discard-indicating metadata. Once the discard-indicating metadata has been unset (to indicate that the cache line is no longer a discardable cache line), the dead data may be treated as live data by being written back to memory when the cache line is evicted from the cache.

In further cases, such as to assist with debugging, it may be useful to identify whether a given cache line is currently marked as discardable. Hence, in some examples, a further read-metadata instruction may be supported to read a current value of the discard-indicating metadata for a selected cache line selected based on read-target address information. In such examples, the cache control circuitry may be configured to, in response to the instruction decoder circuitry decoding a read-metadata instruction specifying read-target address information, to return to a reader agent, an indication of a current value of the discard-indicating metadata for a cache line selected based on the read-target address information. The reader agent may be, for example, a debug port for communication with an external debugging device. In some examples, the indication of the current value of the discard-indicating metadata may be written to a software-readable register, or to a software-selected location in memory, such that the software itself may be the reader agent.

In examples that will be described later, the read-metadata instruction may further be used for reading metadata other than the discard-indicating metadata (e.g. such as discard-eligibility metadata).

In some cases, it may be determined that cache lines which are set as discardable should in fact be written back to memory. Hence, in some examples, a further clear-metadata instruction may be supported to clear the discard-indicating metadata. In such examples, the cache control circuitry may be configured to, in response to a clear-metadata instruction specifying clear-target address information, set the discard-indicating metadata to an initial state for at least one cache line selected based on the clear-target address information. The initial state of the discard-indicating metadata may be the unset state, such that the cache line is indicated as containing live data (i.e. not discardable). A clear-metadata instruction may be particularly useful when performing context switches between software processes so that the discard-indicating metadata may be maintained only in respect of the software process that indicated that the data is expected to be dead (i.e. the software process that executed the mark-dead instruction). For example, where an outgoing process indicates that a cache line is discardable, an incoming process may expect that the cache line still contains live data and hence expects the cache line to be written back if dirty. Accordingly, the clear-metadata instruction can be used during the context switch to set the cache line as non-discardable, thereby maintaining independence between processes and their respective interactions with memory.

A cache may occasionally evict cache lines. Hence, the apparatus may further comprise eviction circuitry configured to select a victim cache line for eviction. The eviction circuitry may perform the selection based on a cache eviction policy (e.g. least recently used (LRU), re-reference interval priority (RRIP), etc). In some examples, the discard-indicating metadata may be further considered as part of the cache eviction policy such that the victim cache line is selected in dependence on the discard-indicating metadata. Accordingly, a victim cache line may be selected based on whether it contains live data or dead data.

In particular examples, the eviction circuitry is configured to priorities selection of a discardable cache line as the victim cache line. In particular, a discardable cache line is prioritised for selection over a non-discardable cache line so that dead data is more likely to be evicted than live data. It will be appreciated that other criteria may also be considered for prioritising cache lines for eviction. For example, invalid cache lines may be further prioritised for eviction over valid (but discardable) cache lines. Therefore, one example of an eviction policy may be: (1) select an invalid cache line, (2) if there are no invalid cache lines, select a discardable cache line, (3) if there are no discardable cache lines, select a valid and non-discardable cache line based on a replacement algorithm, e.g. LRU or RRIP, etc. By prioritising the eviction of discardable cache lines, dead data is removed in favour of keeping live data, thereby improving the overall utilisation of the cache.

In examples that will be described in further detail later, the discard-indicating metadata may be passed to an interconnect so that one or more other caching agents can identify whether corresponding cache lines should be marked as discardable. However, in other examples, the eviction circuitry does not preserve the discard-indicating metadata when evicting a discardable cache line. Hence, in such examples, the eviction circuitry is configured to discard the discard-indicating metadata in response to evicting the victim cache line.

In other examples that will be described in further detail later, cache lines may also be marked with discard-eligibility metadata, which indicates whether the cache lines are eligible for becoming a discardable cache line. Hence, the cache control circuitry may be configured to determine whether the one or more target cache lines (that are selected based on the mark-dead target address information) are eligible to become discardable based on the discard-eligibility metadata associated with the one or more target cache lines. If any of the target cache lines are not eligible to become discardable, then the cache control circuitry may not set those cache lines as discardable. As will be discussed later, this serves as a way of policing which cache lines can be marked as discardable or not.

In some examples, when the discardable cache line is not evicted immediately, the cache control circuitry may, when setting a given target cache line to be a discardable cache line, set the cached data for the given target cache line to a predetermined value. As above, since the data is dead, there is no need to preserve that data after being set as discardable. Hence, in some examples, the predetermined value may be used to indicate discardability in a similar way to the discard-indicating metadata described above. In other examples, the predetermined value is set to zero. When the cached data of a cache line is set to zero or another fixed value, cached data compression techniques may be utilised to compress the cached data, thereby improving the usable capacity of the cache.

As mentioned above, the mark-dead instruction indicates mark-dead target address information for selecting which cache lines are set as discardable. The mark-dead target address information may be defined as an address range which may encompass one or more cache lines worth of data. However, it is possible for the end points of the address range to be unaligned with the boundaries of a cache line, which could cause a cache line to contain some live data and some dead data. It will be appreciated that cache lines which contain any live data should be written back to memory if dirty and should not be marked as discardable. Hence, the cache control circuitry may be configured to identify, as the one or more target cache lines, cache lines which are entirely within the address range specified by the mark-dead target address information. Therefore, any cache lines which are set as discardable are cache lines which have been identified by the mark-dead instruction as being expected to entirely contain dead data.

The address range may be specified in a number of different ways. In some examples, both end points of the address range are identified by the mark-dead instruction itself (e.g. using respective register operands). In other examples, the mark-dead instruction may only specify one end point of the address range, and the cache control circuitry uses size information stored in a control register to identify the other end point. For example, the size information may be set by a higher privilege process to define the granularity by which mark-dead operations are to be applied.

In some examples, the apparatus comprises writeback circuitry configured to, in response to an eviction of a victim cache line from a cache, perform a data writeback of the victim cache line to a further cache or to memory. It will be appreciated that, where a cache hierarchy exists (e.g. a private level 1 cache, private level 2 cache, and a shared level 3 cache), the eviction of a victim cache line may cause the victim cache line to be written back to a lower level of cache, rather than written back to memory. As mentioned above, by setting cache lines as discardable, those cache lines may be discarded without data writeback even if the discardable cache line is dirty. Hence, in such examples, the writeback circuitry is responsive to a case where the victim cache line is a discardable cache line, to suppress the data writeback of the victim cache line. Hence, the discardable cache line is not written back to a lower level or cache or to memory, thereby saving bandwidth usage in the memory system.

In some examples, such as those where the apparatus forms part of a larger data processing system, multiple caching agents may be connected by an interconnect. In such examples, it is possible for other caching agents, other than the caching agent having the processing circuitry executing the mark-dead instruction, to hold cache lines that are targeted by the mark-dead target address information. Hence, the processing circuitry may be configured to, in response to the instruction decoding circuitry decoding the mark-dead instruction, generate a mark-dead request to the interconnect, the mark-dead request specifying the mark-dead target address information to identify one or more target cache lines that are allowed to be treated as a discardable cache line in a system cache or a private cache of another caching agent. Accordingly, corresponding cache lines holding dead data can be set as discardable across multiple caching agents.

In some examples, for at least one setting of the apparatus, the mark-dead instruction is allowed to be executed at a least privileged execution state. For example, the least privileged execution state may be a "user" state in which applications may be executed. This allows user programs to identify live data and dead data so as to achieve the performance improvements described above.

In some examples, the discardability function of these examples may be disabled or enabled as desired. Hence, the instruction decoding circuitry or the processing circuitry may be configured to determine, based on programmable permissions control information, whether to allow setting the one or more cache lines as discardable cache lines in response to a mark-live instruction executed in a less privileged execution state. In some examples, the programmable permissions control information may be stored in a control register set based on an instruction executed during a more privileged execution state. In other examples, the programmable permissions control information may be stored alongside other permissions in page tables used for memory address translation (or referenced in page table entries indirectly, by pointing to a field in a control register storing the programmable permissions control information with the register field being selected based on a parameter encoded in the page tables). Accordingly, some regions of memory, e.g. protected regions, may have the discardability function disabled, such that a mark-dead instruction executed maliciously cannot cause protected data to be marked as dead.

In some examples, the instruction decoding circuitry is configured to decode instructions according to an instruction set architecture. In some examples, the instruction set architecture supporting the mark-dead instruction is an instruction set architecture for a central processing unit (CPU), e.g. as opposed to an instruction set architecture for a graphics processing unit (GPU).

Mark-Live Instruction

As mentioned above, some examples can support a mark-dead instruction enabling software to indicate when a given cache line can become discardable, to enable writebacks of dirty data to be avoided when software has already flagged that the data is dead and will not be needed again. The resulting memory system bandwidth savings can free up memory bandwidth for other purposes, providing an overall improvement in processing performance. In some implementations, the mark-dead instruction could be supported as a standalone instruction, without any dependence on metadata set by a corresponding mark-live instruction. This can still work, and provides the performance improvements discussed above.

However, in some (not necessarily all) use cases, there may be a concern that uncontrolled use of the mark-dead instruction could sometimes cause live data, which is not actually dead from a software perspective, becoming unintentionally marked as a discardable cache line (e.g. due to an inadvertent programming error or a malicious attack causing the mark-dead instruction to be executed specifying an address region which has not actually become dead from a software perspective). If live data becomes marked discardable, this could cause loss of coherency of certain cache lines for which dirty data might become discarded on eviction from the cache, when the software managing that data needed the dirty data to be preserved by writing the dirty data back to memory.

Hence, in examples discussed below, a mark-live instruction is supported which enables certain target cache lines to be identified as eligible for subsequently being discarded upon occurrence of a mark-dead event (such as the mark-dead instruction or a mark-dead event request received from an interconnect). The apparatus may comprise cache control circuitry which is configured to set, in response to the instruction decoding circuitry decoding a mark-live instruction specifying mark-live target address information, discard-eligibility metadata associated with one or more target cache lines selected based on the mark-live target address information, to identify the one or more target cache lines as being eligible for being treated as a discardable cache line which is allowed to be discarded without data writeback even if the discardable cache line is dirty. In response to a mark-dead event associated with a given cache line, the cache control circuitry determines, depending on the discard-eligibility metadata for the given cache line, whether the given cache line is eligible for becoming a discardable cache line.

With this approach, the mark-live instruction can be used to police which cache lines are eligible for becoming discardable, and which cache lines are ineligible for becoming discardable. Cache lines for which it is critical that any dirty data is written back to memory (such as cache lines holding sensitive or safety-critical information for which any coherency errors could be problematic) can be protected against loss of coherency by choosing not to specify those cache lines among the target cache lines for any mark-live instruction. On the other hand, cache lines for which the data life-cycle management involving the mark-dead instruction would be appropriate can be selected by specifying their addresses using the mark-live target address information of a mark-live instruction, to give opportunities for performance improvements by avoiding unnecessary writeback of data after the data has become dead. Hence, by supporting the mark-live instruction, this provides an instruction set architecture which enables software to better control safe usage of the mark-dead operation, and reduce the likelihood of loss of data coherency due to errors or malicious attacks which misuse the mark-dead operation.

As well as helping to police which cache lines are allowed to become discardable, the mark-live instruction also provides an opportunity for further performance improvements (beyond those performance improvements associated with discarding dead cache lines without writeback even if dirty). The mark-live instruction may, when in use by software, be anticipated to be executed at the point when a block of memory address space has been newly allocated for use by a given process, and so typically there is no meaningful data stored at the corresponding block of address space at that point. For example, the newly allocated block of memory address space may store garbage data which was previously stored in that block of memory address space by a process which was previously allocated the same block, but that process has freed the region of memory and so no longer needs the garbage data. However, in typical instruction set architectures (ISAs), there is no way for the software to hint to the hardware that a given region of memory is newly allocated and so any previous contents of that region are meaningless and do not need to be preserved. In typical ISAs, following allocation of the new memory block, the process allocated that region of memory may simply start executing store instructions to store fresh data into the newly allocated memory. However, coherency protocols may, for a given store operation that does not fully cover an entire cache line, issue linefill requests to obtain data from memory for the other parts of the cache line so that the linefilled data can be merged with the new store data for the given store operation. Hence, during an initial portion of processing following the new memory allocation, a significant amount of memory bandwidth may be consumed in unnecessary linefill requests to obtain garbage data from memory which will not actually be used by the process allocated that new block of memory.

On the other hand, the mark-live instruction provides mark-live target address information which can be used to identify to the hardware a region of memory which has just been made live (and so for which any previous data stored in that region memory is not important and can be overwritten if desired). This means there is an opportunity to eliminate the linefill request described above that would normally happen on a store operation covering only part of a cache line, and instead allocate one or more target cache lines corresponding to the mark-live target address information into a designated level of cache specifying a predetermined value, irrespective of the data value currently stored in memory for those target cache lines.

Hence, in some examples, in response to the mark-live instruction, for a given target cache line identified based on the mark-live target address information which is not already cached in a designated level of cache designated to be allocated with the given target cache line, the cache control circuitry is configured to allocate the given target cache line to the designated level of cache specifying a predetermined value as cached data for the given target cache line, and set the discard-eligibility metadata for the given target cache line to indicate that the given target cache line is eligible for being treated as a discardable cache line. The cache control circuitry can generate the predetermined value as the cached data, without issuing a linefill request to obtain the cached data specifying the predetermined value from a further cache or memory. By "materialising" the given target cache line into the designated level of cache specifying a fixed value as the predetermined value, rather than a variable value read from a further level of cache or memory by issuing a linefill request, this avoids the need to consume memory bandwidth in processing the linefill request, as well as reducing the delay in processing a subsequent store request to the given target cache line which does not need to wait for return of data following a linefill request. Hence, this can provide a performance uplift. As well as helping eliminate the linefill request, materialising the given target cache line as a response to the mark-live instruction (rather than waiting for a subsequent store to be executed) also helps improve performance for the subsequent store which is likely to hit in a cache with lower access latency than if the cache line had not been allocated into the cache in response to the mark-live instruction.

The predetermined value, which is set for the data associated with a given target cache line that is materialised into a designated level of cache without linefill in response to the mark-live instruction, could be any fixed value. In some examples, the predetermined value is zero. It can be particularly useful to set the predetermined value as zero, because some micro-architectural cache implementations may support compression circuitry which enables cache lines of data set to zero to be compressed into a smaller storage size, to free up cache capacity for other data not set to zero. However, other examples could choose a different value for the predetermined value, e.g. a value with all bits set to 1.

The designated level of cache into which the given target cache line is materialised could be any level of cache, e.g. a private cache (e.g. level 1 or level 2 cache) of the processor comprising the instruction decoding circuitry and processing circuitry, or a shared system cache shared between multiple processors or other caching agents. In some examples, the designated level of cache into which the given target cache line is allocated could be a fixed level of cache, fixed by design choice for a given implementation of the apparatus (e.g. fixed to be a level 1, level 2 or level 3 cache, or the shared system cache say). However, as explained further below, it is also possible for the designated level of cache to be selected dynamically depending on the size of a region of memory address space being marked as live based on the mark-live instruction.

When a given target cache line is materialised into the designated level of cache, in some examples as well as setting the discard-eligibility metadata to indicate a cache line eligible for being treated as a discardable cache line, the cache control circuitry could also set the discard-indicating metadata mentioned above to indicate that the given target cache line is currently discardable (not just eligible for becoming discardable in future once a mark-dead event happens). It can be appropriate to set the given target cache line is currently discardable in response to the mark-live instruction in cases where the given target cache line is materialised into a cache specifying the predetermined value, as in this case the currently cached data for the line is not meaningful for the software and so can be discarded without writeback if it has not changed by the time the cache line is evicted from the cache, to avoid the memory system bandwidth cost of performing a writeback.

In cases where the given target cache line is materialised into the designated level of cache specifying the predetermined value, the cached data for that cache line is allowed to be incoherent with respect to memory. That is, the predetermined value may be different to the value stored for the same address in main memory, and it is not necessary to ensure that the modified data in the designated level of cache is eventually propagated through to memory. This can be seen as counter-intuitive as it represents a loss of coherency which would normally be seen as problematic in typical cache coherency schemes. However, the inventors recognised that, at the point when a newly allocated region of memory is made live, any previous contents of the allocated memory locations are garbage data not needed by the process allocated that region of memory, and so this loss of coherency is not a problem and can be exploited to improve processing performance by avoiding unnecessary linefills of garbage data.

When the given target cache line is allocated into a cache specifying the predetermined value, the cache control circuitry may allocate the given target cache line specifying the predetermined value to the given cache in a dirty-but-discardable state indicating that the given target cache line is dirty and is currently treated as a discardable cache line. The dirty-but-discardable state could be denoted by a particular coherency state (e.g. a new type of coherency state distinguished from a dirty-but-not-discardable coherency state) so that, for example, the discard-indicating metadata indicating that the cache size discardable could be identified based on a coherency state identifier which also indicates other coherency information defined according to a cache coherency protocol. However, in some examples the dirty-but-discardable state could be indicated by a coherency state identifier indicating that the cache line is in a dirty coherency state (without the coherency state identifier indicating any information about whether the cache line is discardable), and separate discard-indicating metadata indicating that the cache line is also discardable. Separating the discard-indicating metadata from the coherency state identifier may make it easier for the cache supporting the discard-indicating metadata to be compatible with other system components which may have been designed to support a given coherency protocol using the coherency state identifier, but do not support the discard-eligibility metadata or any coherency state indicator supporting the dirty-but-discardable state.

In response to the mark-live instruction, when a given target cache line identified based on the mark-live target address information is already cached in the designated level of cache in a clean state, a number of options are possible for determining how to handle caching for the given target cache line. The response taken could depend on a current coherency state of the given target cache line, and/or on implementation choice, and/or on the particular variant of the mark-live instruction executed, in an implementation supporting two or more variants of the instruction for triggering different caching responses in the case where one of the target cache lines is already cached.

In some examples, when the given target cache line is already cached in a clean state, the cache control circuitry may retain the given target cache line in the designated level of cache in the clean state with the discard-eligibility metadata for the given target cache line set to indicate that the given target cache line is eligible for being treated as a discardable cache line (the data for the clean cache line could be the previously cached clean data held in the designated level of cache, or could be more up to date dirty data obtained from another caching agent's cache or a system cache). If the line is already held as clean in the cache, some implementations may see little performance benefit to clearing the cached data to zero (as this would not improve access latency for a subsequent store), so the cache line can be left as clean with either the previous clean data or more up to date data obtained from another caching agent's cache or a system cache.

Other examples, could clear the cached data to the predetermined value even if the cache line was already held in a clean state. This could help to improve compressability of cached data in implementations supporting compression of cache lines set to a particular value (e.g. zero).

In cases where the given target cache line is already cached in a dirty state, a number of options are possible (again, an architecture could prescribe use of only one of these options, or could give flexibility for multiple options with the hardware system designer either selecting a single fixed option or providing circuitry for dynamic selection at runtime of which option is taken in a given scenario).

In some examples, the cache control circuitry may leave the given target cache line that is dirty unchanged in the designated level of cache, without updating the discard-eligibility metadata for the given target cache line (in this case, the given target cache line does not become eligible for being discardable unless it was already marked as discard-eligible).

Another option for handling the case when the given target cache line is dirty is to clean the given target cache line to trigger writeback of dirty cached data for the given target cache line, retain previously cached data for the given target cache line in the designated level of cache, and set the discard-eligibility metadata for the given target cache line to indicate that the given target cache line is eligible for being treated as a discardable cache line.

Another option could be that, in response to the mark-live instruction, when the given target cache line is already cached in the designated level of cache in a dirty state, the cache control circuitry is configured to set the cached data held by the designated level of cache for the given target cache line to the predetermined value (in some examples, having written back the previously cached dirty data prior to clearing the cache line to the predetermined value), and set the discard-eligibility metadata for the given target cache line to indicate that the given target cache line is eligible for being treated as a discardable cache line.

It is also possible to provide, for at least one variant of the mark-live instruction, a response where the cache control circuitry sets cached data held by the designated level of cache for the given target cache line to the predetermined value regardless of a previous coherency state in which the given target cache line is held in the designated level of cache. This could be useful in cases where a memory region has been allocated by memory allocator software calling a "calloc" function which involves, in addition to the new memory region being allocated, clearing the data of that region to a predetermined value (as opposed to a "malloc" function where the new memory region is allocated but previous garbage data in that memory region can be retained).

There could be a number of ways in which the mark-live instruction identifies the one or more target cache lines. In some examples, the mark-live instruction could specify an address of a single cache line (in that case, to mark multiple cache lines as discard-eligible, it would be needed to execute multiple instances of the mark-live instruction).

However, in some examples, the cache control circuitry is configured to identify, as the one or more target cache lines, one or more cache lines which are entirely within an address range identified based on the mark-live target address information. By identifying an address range based on the mark-live target address information specified by a single instance of the mark-live instruction, fewer instructions are needed to identify a range of address space as discard-eligible. The address range information can also be a useful hint to the hardware of a memory region size designated for a particular purpose, which can be useful for more efficiently controlling caching policy, as discussed further below in relation to cache level selection. The specified address range may not necessarily start and end at a cache line boundary, so a cache line which is not entirely within the specified address range may not be marked as discard-eligible in response to the mark-live instruction (to prevent data which is outside the scope of the range marked as "live" having its discard-eligibility metadata changed—the discard-eligibility metadata may be maintained at granularity of cache lines).

The address range can be defined by a range start address and a range end parameter, with the mark-live instruction identifying at least the range start address as an operand of the make-live instruction. The range end parameter could be specified as a further operand of the make-live instruction, or in a control register.

As noted above, the mark-live instruction causes one or more target cache lines to be marked as discard-eligible, indicating they are eligible for becoming discardable upon occurrence of a subsequent mark-dead event. Hence, in response to the mark-dead event associated with mark-dead target address information, the cache control circuitry may treat as a discardable cache line one or more cache lines corresponding to the mark-dead target address information which are indicated by the discard-eligibility metadata as being eligible for being treated as the discardable cache line. For a given cache line corresponding to the mark-dead target address information which is indicated by the discard-eligibility metadata as being ineligible for being treated as the discardable cache line, the cache control circuitry prevents the given cache line being treated as a discardable cache line.

When a given cache line is treated as discardable in response to the mark-dead event, this could be done by invalidating the discardable cache line as a direct response to the mark-dead event itself (and discarding the corresponding cached data without writeback even if dirty). However, in case the cache line is subsequently needed to be accessed again, it can be more efficient to retain the cache line in the cache and instead set metadata indicating that the cache line can be discarded without writeback on a future eviction of that cache line from the cache (e.g. upon a capacity-based eviction caused by a need to reallocate the cache entry used for that cache line for storing data for another address).

Hence, in some examples, the cache control circuitry is configured to treat a given cache line as the discardable cache line by setting discard-indicating metadata for the given cache line indicating that the given cache line is discardable on eviction without data writeback even if dirty. The discard-indicating metadata and the discard-eligibility metadata could be indicated as separate items of metadata (e.g. a first bit or bitfield indicating the discard-indicating metadata, and a second bit or bitfield indicating the discard-eligibility metadata), or could be indicated using different encodings of a common item of metadata (e.g. a single bitfield with various encodings corresponding to the respective states: non-discardable/discard-ineligible; non-discardable/discard-eligible; discardable/discard-ineligible; and discardable/discard-eligible).

In some examples, when setting a given cache line as the discardable cache line in response to the mark-dead event, the cache control circuitry is configured to update cached data for the discardable cache line to a predetermined value (e.g. zero). This can be useful to support improved compressability of discardable cache lines in a cache implementation which supports compression of lines set to a particular value, such as zero.

The cache control circuitry may clear the discard-indicating metadata for the given cache line in response to detecting a read, write or snoop request to the given cache line. When the discard-indicating metadata is cleared, this causes the given cache line to be indicated as not being discardable. Once a read, write or snoop request has been detected to the given cache line, there is a risk that another observer may have observed the current cached data for the given cache line, so if the given cache line is later discarded without writeback even if dirty, then this could risk inconsistent views of the memory location becoming observable by other observers, which may be problematic in some scenarios such as debugging. Therefore, it can be helpful to cause the given cache line previously set as discardable to be indicated as no longer discardable, if a read, write or snoop request is detected to that cache line after the discard-indicating metadata has been set. In practice, such read, write or snoop requests should be relatively rare as the expectation would be that software would choose to invoke a mark-dead instruction that triggers the mark-dead event once the data is dead and not going to be accessed anymore. However, some debugging operations might still access the data after it has become dead.

Similar to the mark-live instruction, for the mark-dead event, the cache control circuitry may identify, as the one or more cache lines, cache lines which are entirely within an address range identified based on the mark-dead target address information. The mark-dead target address information can be encoded in a similar way to the mark-live target address information, e.g. using range start/end parameters encoded as operands of a mark-dead instruction, or using a range start parameter encoded as an instruction operand or as an address parameter of a mark-dead request received from an interconnect in combination with a range size/end parameter encoded in a control register.

The mark-dead event could be triggered either by a local instruction executed by the processing circuitry, or by an event happening at another processor, which may cause a mark-dead event request to be issued over an interconnect to the processor comprising the cache control circuitry. Hence, the mark-dead event could comprise execution of a mark-dead instruction specifying the mark-dead target address information, and/or receipt from an interconnect of a mark-dead event request specifying the mark-dead target address information.

The discard-eligibility metadata (and if supported, the discard-indicating metadata) may in some implementations be discarded for a given cache line when that cache line is written back from a given level of cache. Hence, some implementations may support the use of this metadata only up to a particular cache level, and then if the cache line is evicted beyond that cache level, any previously set discard control metadata may be lost and not restored even if the cache line subsequently is restored to that level of cache.

In other examples, the discard-eligibility metadata (and if supported, the discard-indicating metadata) may be retained in a further cache upon writeback from a given level of cache of a cache line specifying the discard-eligibility metadata (e.g. the further cache could be a system cache or a private cache of another caching agent). This can enable further performance improvements as even if the cache line is migrated between different levels of cache or between different caching agents, the metadata previously set for controlling use of the discardable cache state can be retained, enabling greater likelihood that performance can be improved by reducing consumption of memory system bandwidth in performing unnecessary writebacks of dead data or unnecessary linefills of garbage data for regions of memory freshly allocated as live.

In some examples, in response to a clear-metadata instruction specifying clear-target address information, the cache control circuitry is configured to set the discard-eligibility metadata to an initial state for at least one cache line selected based on the clear-target address information. The initial state may be a state in which the at least one cache line is indicated as not eligible for being treated as discardable. Supporting the clear-metadata instruction can be useful for enforcing process-independence where it may be desirable to ensure that one software process executing on a shared hardware platform cannot influence the operation of another software process executing on the same platform, as this instruction enables a given software process to ensure that the discard control metadata is initialised in a known state following a transition from another process.

In some examples, in response to a read-metadata instruction specifying read-target address information, the cache control circuitry is configured to return, to a reader agent, an indication of a current value of the discard-eligibility metadata for a cache line selected based on the read-target address information. The reader agent could be software (e.g. debug software) executing on the processing circuitry, or could be an external debug unit provided for supporting debugging. Either way, providing an instruction with the ability to test current values of the discard-eligibility metadata (and if supported, the discard-indicating metadata) could be helpful for debugging purposes, as the constrained incoherency introduced based on the concept of discardable cache lines may be relevant to diagnosing reasons for unexpected outcomes when software is executed.

In some examples, for at least one setting of the apparatus, the discard-eligibility metadata is allowed to be updated in response to a mark-live instruction executed in a least privileged execution state. For example, the mark-live instruction (and the mark-dead instruction) can be successfully executable in an execution state with application-level privilege. As in typical use scenarios, a processor may spend more time in the state with lowest privilege than in more-privileged execution states, making the mark-live instruction available for use in the least-privileged execution state increases the likelihood that software can make use of the instruction to enable performance improvements, and is more performance-efficient than requiring the least-privileged software to call into a more-privileged execution state each time regions of memory are to be marked live or marked dead (such calls would incur exception handling latency).

In some examples, the instruction decoding circuitry or the processing circuitry may determine, based on programmable permissions control information, whether to allow the discard-eligibility metadata to be updated in response to the mark-live instruction. For example, the programmable permissions control information could be specified in a system register (e.g. a system register restricted to being updated only in execution states with a threshold level of privilege or higher, and which cannot be updated in a least privileged execution state). Alternatively, or in addition, the programmable permissions control information could be specified using page table attributes specified directly or indirectly based on information in a page table entry corresponding to an address region corresponding to the mark-live instruction (e.g. the page table entry which corresponds to the region of address space comprising the instruction address of the mark-live instruction, or the page table entry which corresponds to a region of address space comprising an address indicated by the mark-live target address information). Regardless of the particular implementation of the permissions control information, by supporting a permissions control mechanism by which the apparatus can restrict the scenarios in which the mark-live instruction is allowed to be executed (e.g. limiting which execution states or which address regions are allowed to make use of the instruction), this can reduce the likelihood of the instruction being inadvertently or intentionally misused to mark as discard-eligible data which was not intended to be discardable.

In some examples, the instruction decoding circuitry is configured to decode instructions according to an instruction set architecture. In some examples, the instruction set architecture is a central processing unit (CPU) instruction set architecture (as opposed to other more specialized ISAs such as a graphics processing unit (GPU) instruction set architecture). By supporting the mark-live instruction (and mark-dead instruction) in a CPU ISA, this can support more widespread performance savings as it makes the ability to designate discardable cache lines available to general purpose applications and operating system software.

Cache Level Selection

As mentioned above, some examples can cause a cache line to be materialised into a level of cache specifying a predetermined value as cached data. Where a cache hierarchy is provided, the cache lines may be materialised into any one or more levels of that cache hierarchy. Hence, in examples discussed below, an apparatus may comprise cache control circuitry to allocate, to a cache hierarchy comprising a plurality of levels of cache, one or more materialised cache lines corresponding to a region of address space indicated by software-provided information, each materialised cache line specifying a predetermined value as cached data. The apparatus may further comprise cache level selection circuitry configured to select, based on a size of the region of address space indicated by the software-provided information, at least one target level of the plurality of levels of cache to which the one or more materialised cache lines are to be allocated.

It will be appreciated that, when software is accessing a data structure allocated a given region of memory, for some workloads the overall performance of a sequence of code interacting with the data structure may be limited by the access latency of the parts of the structure that are slowest to access, so for larger structures there can be less benefit in caching them in a faster-to-access cache of small capacity than for smaller structures. In some examples, in cases where a data structure is large enough to require some accesses to slower-to-access levels of caches, allocating the materialised cache lines for that structure into a higher level of cache may even reduce performance due to useful cache lines that are already present in the cache being evicted. Hence, the cache selection circuitry can be used to control a performance trade-off between the retention of existing cache lines or allocation of the materialised cache lines into the cache hierarchy, and by considering the size of the allocated region of address space provided using a software-supplied hint, more informed decisions can be made which would not be possible in an implementation where there is no software-provided hint regarding the size of a region of memory to be allocated with materialised cache lines.

As mentioned above, materialised cache lines may specify any predetermined value as cached data. In some examples, the predetermined value is zero to allow cache data compression as described above.

In some examples, the cache level selection circuitry is configured to select a given level of the plurality of levels to be the at least one target level, based on whether the size of the region of address space exceeds a capacity threshold of the given level. It will be appreciated that the capacity threshold of a given level of cache is not necessarily equal to the total capacity of the given level of cache. In some examples, the capacity threshold may be a predetermined value defining a proportion of that total capacity which is acceptable to replace with one or more materialised cache lines. It will be appreciated that such a proportion may vary depending on the particular implementation and use-case.

In response to determining that the size of the region of address space does not exceed the capacity threshold of the given level of cache, the cache level selection circuitry may then select that given level as one of the at least one target level.

On the other hand, in response to determining that the size of the region of address space exceeds the capacity threshold of the given level, the cache level selection circuitry is configured to select, as the at least one target level either the given level and a further level of the plurality of levels, or the further level (and not the given level). Hence, if materialising the cache lines (entirely) at the given level is not feasible, then the further level may be used. In particular, the cache lines may be materialised between both the given level and the further level of the hierarchy, such that cache lines corresponding to the region of address space is split between two levels within the hierarchy. Alternatively, the cache lines may be materialised entirely at the further level of cache.

To facilitate the above, some examples of the further level of cache may be deeper down the cache hierarchy than the given level (e.g. the further level of cache may be of larger capacity, slower to access, and/or further from the core than the given level of cache).

In some examples, the further level comprises a private cache for holding cached data that is private to a processing element. In other examples, the further level comprises a shared cache for holding cached data shared between a plurality of processing elements. It will be appreciated that the particular configuration of a cache hierarchy may vary between implementations.

As mentioned above, materialising the cache lines at the at least one target level of the cache hierarchy allows the cache control circuitry to make use of the discardability functionality described previously. Hence, in some examples, the cache control circuitry is configured to set discard-eligibility metadata associated with the one or more materialised cache lines, where the discard-eligibility metadata indicates that each of the one or more materialised cache lines is eligible for being treated as a discardable cache line which is allowed to be discarded without data writeback even if dirty.

Materialising the cache lines according to the present examples does not require a line fill request from the memory for the one or more materialised cache lines. It will however be appreciated that this does not preclude line fill requests occurring later, e.g. if a materialised cache line that has been allocated (materialised) to a lower level cache of the hierarchy is required by the software, then a line fill request may target that materialised cache line to bring it to a higher level cache to be accessed by processing circuitry.

Although the software-provided information may be obtained from any type of software hint that a region of memory is about to be used, the above examples may particularly be used in combination with the mark-live instruction described previously. Hence, instruction decoding circuitry may be provided to decode instructions, e.g. according to an instruction set architecture. The software-provided information described above may therefore comprise mark-live target address information specified by a mark-live instruction decoded by the instruction decoding circuitry.

In some examples, the mark-live instruction specifies the mark-live target address information as an address range, and the cache line allocation circuitry is configured to identify, as the one or more materialised cache lines, cache lines which are entirely within the address range specified by the mark-live target address information.

In some examples, the mark-live instruction specifies a first end point of the address range, and the cache line allocation circuitry is configured to determine the second end point of the address range based on range size information stored in a control register.

Interconnect Circuitry

Interconnect circuitry may be provided to connect components of a processing system including at least one caching agent. In some of the implementations using the discard control metadata described above (e.g. discard-indicating metadata, discard-eligibility metadata), the discard control metadata may be kept private to one or more private caches associated with a particular caching agent, and not exposed to the interconnect or other caching agents. Hence, if a cache line associated with discard control metadata is evicted from a given level of private cache, the discard control metadata could be discarded and lost.

However, in examples discussed below, interconnect circuitry comprises receiving interface circuitry configured to receive, from a metadata-transmitting caching agent, discard control metadata for a given cache line previously held in a private cache of the data-transmitting caching agent; and transmitting interface circuitry configured to transmit the discard control metadata for the given cache line to a metadata-receiving caching agent for caching in a private cache of the metadata-receiving caching agent. The discard control metadata indicates whether the given cache line is, or is eligible for becoming, a discardable cache line allowed to be discarded without data writeback even if dirty. By providing a signal path by which discard control metadata can be transmitted from a caching agent to the interconnect circuitry, and returned from the interconnect circuitry to a caching agent, this enables the discard control metadata for a given cache line to be preserved beyond the time in which the given cache line is resident in the private cache of that caching agent, increasing the likelihood that the discard control metadata is still present if the given cache line is later allocated into a private cache of a caching agent before the cache line becomes marked dead. By supporting an extension of the time for which the discard control metadata can be retained beyond the residency in a given private cache, the interconnect circuitry can increase the performance uplift achieved by use of the discard control metadata in comparison to a system which discards the discard control metadata at the point of evicting an associated cache line from a given private cache to the interconnect.

In some examples, the interconnect circuitry comprises control circuitry configured to cache the discard-eligibility metadata received from the metadata-transmitting caching agent for the given cache line in a shared system cache shared between a plurality of caching agents. Hence, by enabling the discard control metadata received from the metadata-transmitting caching agent to be cached in the shared system cache, this preserves the metadata even if the cache line has been evicted from the private cache in which the discard control metadata was first set.

The control circuitry may discard the discard-eligibility metadata for the given cache line from the shared system cache upon eviction of the given cache line from the shared system cache. If the given cache line is evicted from the final level of shared cache to main memory, the memory may not have capability for storing the discard-eligibility metadata, and so the metadata can be discarded.

The transmitting interface circuitry may transmit the discard control metadata cached in the shared system cache for the given cache line to the metadata-receiving caching agent in response to a linefill request received from the metadata-receiving caching agent requesting that the given cache line is allocated into the private cache of the metadata-receiving caching agent. Hence, the system cache enables the discard control metadata to be preserved until a time when the given cache line is needed again by the metadata-receiving caching agent, so that the line can still subsequently be made discardable even if it has been evicted from a private cache and then later been filled into a private cache in the period since the metadata was first set.

Note that the timing of the transmission of the discard control metadata to the metadata-receiving caching agent may not be immediately in response to receipt of the discard control metadata from the metadata-transmitting caching agent. There could be an intervening period when the metadata is held in the system cache, and so the subsequent transmission of the metadata to the metadata-transmitting caching agent may be in response to a later linefill event to allocate the line into a private cache of the metadata-receiving caching agent, separate from an event that caused the metadata to be allocated to the system cache.

In some use case scenarios, the metadata-receiving caching agent and the metadata-transmitting caching agent may be the same caching agent. For example, the metadata-transmitting caching agent may transmit the discard control metadata to the interconnect circuitry upon eviction of the given cache line from its private cache, and then later receive the discard control metadata for the given cache line again when it later requests a linefill of the same cache line back into its private cache. Even in an example where the interconnect circuitry only has one associated caching agent that supports use of the discard control metadata (with any other caching agents not supporting the discard control metadata), it can still be useful for the communications link between the interconnect circuitry and the caching agent to support communication of the discard control metadata, as this can enable the interconnect circuitry to hold the metadata in the system cache in a period when the cache line is not resident in the private cache of the caching agent, in case that caching agent later requires the line again before the line has been discarded.

However, it can be particularly useful to provide support for transmission of the discard control metadata via the interconnect, in an example where there are at least two caching agents which support use of the discard control metadata. Hence, in some examples, the transmitting interface circuitry is configured to support transmission of the discard control metadata set by the metadata-transmitting caching agent to the metadata-receiving caching agent, in a case where the metadata-receiving caching agent is a different caching agent to the metadata-transmitting caching agent. This enables retention of the metadata even when a given cache line is migrated from one caching agent to another caching agent, again prolonging the period when the metadata can be retained to increase the fraction of cache lines which can become discardable on a mark-dead event compared to an implementation which drops the discard control metadata when the cache line is migrated from one caching agent to another.

The discard control metadata could be propagated in association with a number of different types of messages communicated between a caching agent and the interconnect.

In one example, the receiving interface circuitry is configured to receive the discard control metadata from the metadata-transmitting caching agent in a snoop data response which responds to a snoop request previously transmitted to the metadata-transmitting caching agent. The interconnect circuitry may send a snoop request to a given caching agent specifying an address of a given snooped cache line for which a read/write request has been received by the interconnect from another caching agent. The snoop request may trigger a change of coherency state of the snooped cache line (e.g. invalidation of the cache line in the private cache of the given caching agent), and return any dirty cached data that was held in the private cache of the given caching agent for the cache line. If discard control metadata has been set for the snooped cache line, the discard control metadata may be returned along with the snoop data response, to enable the discard control metadata to be propagated to the caching agent that issued the read/write request.

In response to the snoop data response, the transmitting interface circuitry may transmit to the metadata-receiving caching agent a snoop forward response specifying the discard control metadata obtained from the snoop data response. Hence, on a snoop event when a first caching agent triggers a snoop of a second caching agent, if the snoop data response from the second caching agent returns discard control metadata, that metadata can be forwarded back to the first caching agent so that it can be preserved when the cache line is held at the private cache of the first caching agent. This can be useful in multi-threaded processing applications which have multiple threads of processing executing on different processors interacting with shared data, so that the metadata created on one of the processors by the mark-live/mark-dead life cycle described earlier can be preserved when the cache line is migrated to another processor.

Another scenario when the receiving interface circuitry may receive the discard control metadata may be when the metadata-transmitting caching agent sends a writeback message or eviction message specifying the discard control metadata for the given cache line. A writeback message may be a message to indicate that the data for the given cache line is being written back to a shared cache or memory (either upon eviction of the cache line from the private cache of the metadata-transmitting caching agent, or on a writeback without eviction, with the line being retained in the private cache). An eviction message may indicate that the given cache line has been evicted from the private cache (e.g. for reasons of capacity conflict), with or without writeback of the data (e.g. the data writeback may not be needed if the evicted cache line was clean). Some messages may be a writeback-evict message which indicates that the line is both written back and evicted from the private cache. Other variants of the message may indicate only a writeback without eviction or an eviction without writeback. In any case, upon a writeback and/or eviction of a cache line from the private cache, it may be useful to preserve the discard control metadata, e.g. to allow it to be stored in a shared system cache managed by the interconnect circuitry.

In some cases, the transmitting interface circuitry may transmit to the metadata-receiving caching agent a read data message providing read data and the discard-eligibility metadata for the given cache line to be allocated into the private cache of the metadata-receiving caching agent. For example, the read data message specifying the discard control metadata could be provided to the metadata-receiving caching agent in response to a read request from the metadata-receiving caching agent which specified an address of the given cache line and hits in the shared system cache in an entry specifying the discard control metadata.

As discussed above, the discard control metadata could be of various types. In some examples, the discard control metadata comprises discard-indicating metadata indicating whether the given cache line is a discardable cache line. Even if dirty data corresponding to a discardable cache line is not written back (due to the writeback being eliminated based on the discardable status), it could still be useful to convey the discard-indicating metadata to the interconnect to allow corresponding cache entries in a shared system cache or in other caching agent's caches to become discardable.

However, the use of the interconnect to propagate discard control metadata around a memory system can be particularly useful in cases where the discard control metadata comprises discard-eligibility metadata indicating whether the given cache line is eligible to become a discardable cache line upon occurrence of a mark-dead event. When the discard-eligibility metadata is set, the cache line may not be able to be discarded yet as the cache line could still provide live data if the mark-dead event has not happened yet, so the cache line may be propagated around the memory system without being dropped. It can be useful in this case to propagate the discard-eligibility metadata alongside the data for the cache line itself, to retain the hint that this line is eligible for discard if a later mark-dead event occurs. This reduces the likelihood that the discard-eligibility hints assigned based on the mark-live instruction are lost when the cache line travels around the memory system between different caching agents or between a caching agent and a system cache.

In some examples, the interconnect circuitry comprises control circuitry responsive to a mark-dead event request received from a given caching agent to cause a target cache line identified by the mark-dead event request to be treated as a discardable cache line. For example, this mark-dead event request could be generated by the given caching agent in response to the mark-dead instruction described earlier being executed by processing circuitry of the given caching agent where the mark-dead instruction specifies mark-dead target address information corresponding to the target cache line.

Hence, when a given caching agent executes the mark-dead instruction, by sending a mark-dead event request to the interconnect circuitry, the interconnect circuitry can cause the target cache line to become treated as a discardable cache line, to enable saving of memory system bandwidth by eliminating a need for subsequent writeback of data to another cache or memory even if the data is dirty.

In some examples, in response to the mark-dead event request, whether the target cache line becomes treated as the discardable cache line may be dependent on whether the discard control metadata associated with the target cache line indicates that the target cache line is eligible to become a discardable cache. This discard-eligibility metadata can be some of the metadata which is propagated around the memory system using the interconnect circuitry. As noted above, making the discardability of the cache line dependent on discard-eligibility metadata can help to improve data integrity by reducing the likelihood that a cache line is accidentally or maliciously made discardable while the corresponding data is still live.

There are various ways in which the interconnect circuitry can cause the target cache line to become discardable. In some examples, the control circuitry is configured to cause the target cache line to become treated as a discardable cache line in a system cache shared between a plurality of caching agents. Also, the control circuitry could forward the mark-dead event request to a further caching agent, to cause the target cache line to become treated as a discardable cache line at the private cache of the further caching agent. Also, the timing of the target cache line becoming discardable could vary. In some examples, the target cache line could be dropped from the system cache or the private cache of the further caching agent as a direct response to receipt of the mark-dead event request. In other examples, the target cache line could be retained but marked using discard control metadata as being discardable, to indicate that if the target cache line is later evicted from the system cache or the private cache of the further caching agent for capacity reasons, the cached data for that target cache line can be discarded without writeback even if dirty.

In some examples, the discard-eligibility metadata for a given cache line is separate from a coherency state associated with the given cache line.

In some examples, the interconnect circuitry comprises home node circuitry configured to manage coherency of data cached in private caches of a plurality of caching agents. Hence, by exposing the discard control metadata to a component having the home node circuitry which manages coherency of data cached at multiple caching agents, the discard control metadata can be more widely shared through the memory system, to increase the likelihood that at a mark-dead event there is still metadata present which enables writebacks of dead dirty data to be elided.

SPECIFIC EXAMPLES

Specific examples are now described with reference to the drawings. It will be appreciated that the claimed subject-matter is not limited to these particular examples.

FIG. 1 schematically illustrates an example of an apparatus 2, for example a processor, such as a central processing unit (CPU). The apparatus 2 comprises processing circuitry 8 for performing data processing operations in response to instructions decoded by instruction decoding circuitry 6. The instruction decoding circuitry 6 and processing circuitry 8 support processing of instructions according to a particular instruction set architecture (ISA), which defines the encoding format of each instruction supported by the apparatus, the operands and result of each instruction, and the operation to be performed to map the operands to the result.

The instructions decoded by the instruction decoding circuitry 6 are fetched from a cache or memory by instruction fetch circuitry 4. Based on the decoded instructions, the instruction decoding circuitry 6 generates control signals to control the processing circuitry 8 to perform data processing operations represented by the instructions. Operands for the data processing operations are obtained from registers 10. Results of the operations can be written to registers by the processing circuitry 4. For load/store instructions requesting that data from a memory system is loaded to the registers 10 or that data in the registers 10 is stored to the memory system, a load/store unit 12 may be instructed to carry out the load/store operation. A memory management unit (MMU) 14 may be provided to perform address translation of virtual addresses specified based on instruction operands to physical addresses referencing locations in the memory system, and to control access to memory based on permissions information. The address translation mappings and permissions information may be defined using page tables stored in the memory system, which define page table entries each corresponding to a given region of address space and defining the page table mappings and permissions information for that region. In some cases, a page table entry may contain a reference to a permissions field stored in a control register 10, so that the page table entry indirectly specifies those permissions. The MMU 14 may have a translation lookaside buffer (TLB) 16 for caching a portion of information obtained from the page tables for faster access.

The memory system accessible by the load/store unit 12 includes at least one private cache 18. Cache control circuitry 20 is provided for controlling access to the cache in response to load/store requests issued by the load/store unit 12 and in response to other instructions acting upon the cache such as cache invalidation instructions or the mark-live and mark-dead instructions discussed further below. The cache control circuitry 20 may control lookups of the cache 18 to determine whether the cache holds information for a given target address, and may control updates to cache metadata held in the cache for associated cache lines of data. Here, a "cache line" refers to a unit of data of granularity with which data is transferred between levels of cache or between a cache and memory. The cache line may also be the unit of data at the granularity with which coherency status is tracked for cache lines according to a coherency protocol.

It will be appreciated that FIG. 1 is a simplified example of a processing apparatus 2, and that the apparatus 2 may include many other elements not shown in FIG. 1 for conciseness.

Figure 2:
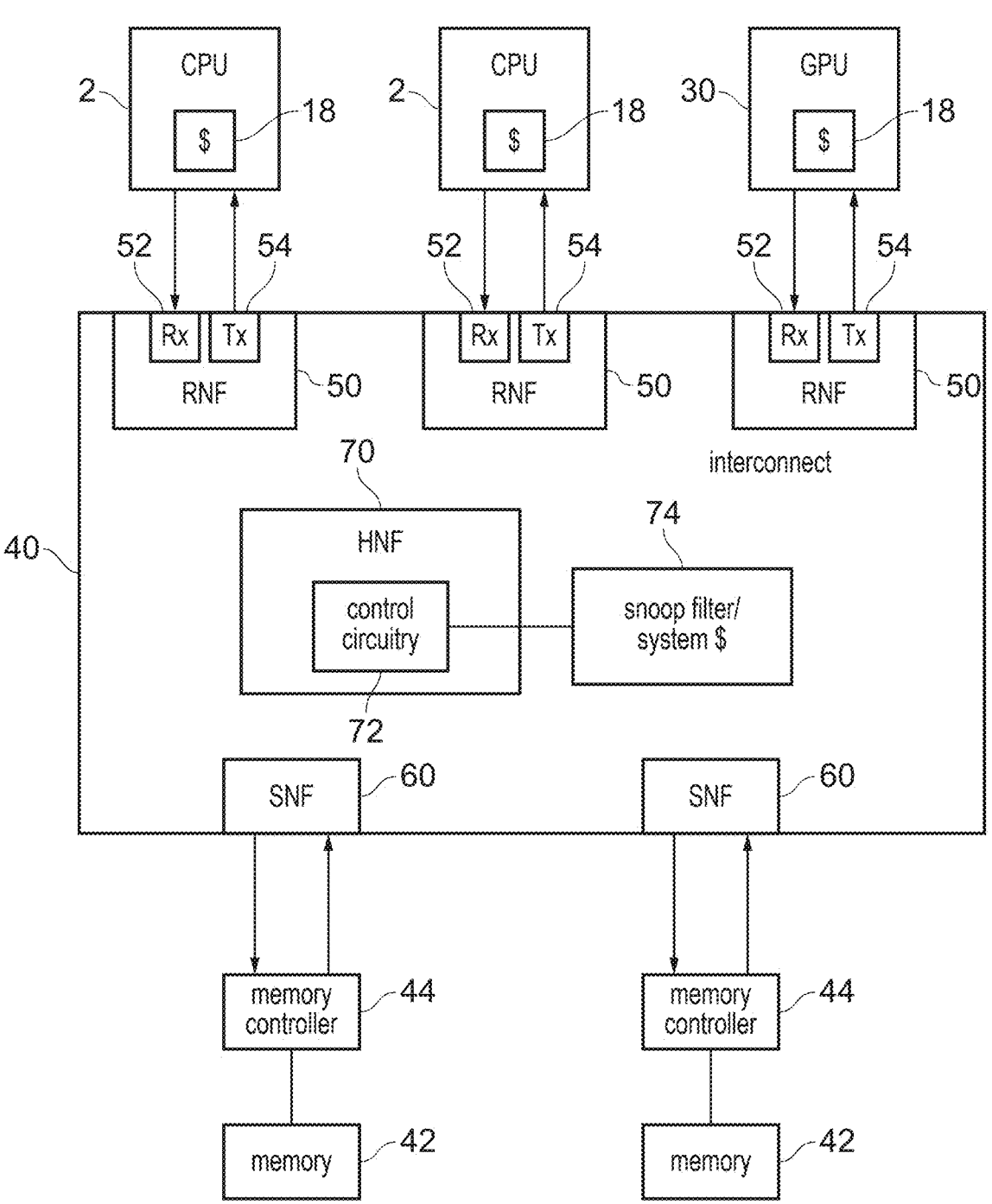
FIG. 2 illustrates an example of a processing system comprising an interconnect.

FIG. 2 illustrates a processing system comprising the apparatus 2 of FIG. 1. The system may, for example, be a compute system implemented on an integrated circuit, a system-on-chip, or a set of interconnected chiplets. The system comprises a number of CPUs 2 as shown in FIG. 1, each with a respective private cache 18. The system can also include other kinds of caching agents having a private cache

18, such as a graphics processing unit (GPU) for performing graphics processing. The caching agents 2, 30 are connected to each other via an interconnect 40, and access shared memory storage 42 via the interconnect 40. Each memory storage unit 42 has an associated memory controller 44 which controls access to the data storage array of the memory storage unit 42 to perform read/write operations requested via the interconnect 40.

The interconnect 40 has a number of requester node interfaces (RNFs) 50 which communicate with the caching agents 2, 30 which act as "requesters" (also known as masters) capable of initiating read/write transactions to read or write locations in memory 42. Each RNF 50 includes receiving interface circuitry 52 for receiving communications from the corresponding caching agent 2, 30 and transmitting interface circuitry 54 for transmitting communications to the corresponding caching agent 2, 30. The interconnect 40 also has subsidiary node interfaces (SNFs) which communicates with "subsidiary" nodes (also known as completers, or slaves), which service the read/write transactions initiated by the requesters. For example, the memory controllers 44 providing access to the corresponding memory storage units 42 may be examples of subsidiary nodes.

The interconnect 40 is a coherent interconnect which has home node circuitry (HNF) 70 for managing coherency of data cached in the private caches 18 of the caching agents 2, 30. The home node circuitry 70 may operate according to a given coherency protocol, such as the AMBA® 4 ACE or AMBAR 5 CHI coherency protocol provided by Arm® Limited. A coherency protocol defines sets of protocol transaction flows for the communication links between the caching agents 2 and RNFs 50 and between subsidiary nodes and the SNFs 60, and corresponding coherency state transitions which may occur for a given cache line when a particular transaction type is initiated by a caching agent 2 (the coherency state transition selected depending on the transaction type and on the current coherency state of the given cache line in one or more caches). The home node circuitry 70 has control circuitry 72 which controls the response taken to particular transaction types, and also manages lookups to a system cache and/or snoop filter 74.

Each cache line may, with respect to a particular caching agent 2, 30, be considered to be held in that caching agent's private cache 18 in a particular coherency state. For example, the coherency state may specify, with respect to a given address and a given caching agent 2, 30, whether valid data for that address is held at the given caching agent's private cache 18, and if valid data is held, whether that data is clean or dirty, and/or is held in a unique (also known as exclusive) or shared state. Clean data is data for which the most up to date copy of the data is held elsewhere other than the private cache 18 for which the coherency status is clean, so that no writeback is needed upon eviction of the clean data. When data is held by a cache as dirty, the data held in that cache is potentially the most up to date copy of the data for the cache line and so may (unless marked as discardable as discussed later) require writeback upon eviction from that cache. "Unique" data is data held exclusively in that caching agent's private cache 18 (and not in other caching agent's private caches 18—note that the unique status does not preclude the data also being held in the shared system cache 74). When data is held in a unique state (e.g. UniqueClean, UC, or UniqueDirty, UD), the caching agent holding the data as unique is allowed to write to the data in the cache without first issuing coherence transactions to check with the home node 70 whether other caching agents could also be holding the data. "Shared" data is data which could potentially be held by other caching agents as well as the caching agent that holds the data as shared. When the data is held in a shared state (e.g. SharedClean, SC, or SharedDirty, SD), a write to the shared data in a given caching agent's private cache would require first issuing a coherence transaction to check with the home node 70 whether there are conflicting copies in other caches 18 (e.g. that coherence transaction may typically be a request that the data in the given caching agent's private cache 18 is upgraded to the unique coherency state, which may cause the control circuitry 72 of the home node 70 to send snoop requests to any other agents holding that data to trigger invalidation of data from those caching agents' private caches 18).

The control circuitry 72 of the home node circuitry 70 also manages any system level cache (SLC) 74, also known as last-level cache (LLC), which is a shared cache, shared between multiple caching agents 2, 30, and is also part of the coherency scheme managed by the home node circuitry 70. The shared system cache 74 provides faster access to data than if the data had to be obtained from main memory 42.

The coherency protocol may require that certain coherence transaction types or responses to such transactions may be associated with certain transitions of coherency state for cached items of data associated with the target address of the request. When a read/write coherence transaction is received from one of the caching agents 2, 30 requesting a read/write operation to a given physical address, the home node circuitry 70 controls issue of snoop requests to one or more other caching agents 2, 30 that could potentially hold valid cached data for that physical address. A snoop request may query the current coherency state of the cached data for a specified cache line at a corresponding caching agent, and/or trigger changes in coherency state at the caching agent. For example, a change of coherency state triggered by a snoop request could include any of: invalidating cached data if the requester of the original read/write request requires the data to be cached in the unique state in its cache; causing return of dirty data held in a snooped caching agent's cache 18 so that the dirty data can be made accessible to the requester which sent the read/write request; and/or downgrading the coherency state of cached data for the specified address from unique to shared. The snoop filter 74 may at least partially track which data addresses are cached at certain caching agents 2, 30. The snoop filter 74 can be used to reduce snoop traffic by allowing the home node circuitry 70 to determine when data is not cached at a particular requester, so that snoop traffic can be limited to those caching agents 2, 30 which could potentially hold valid data for the required cache line. In this example, the snoop filter and system cache are shown as a combined data structure 74. The shared cache/snoop filter structure 74 is looked up based on an address of a given cache line, to return from a corresponding cache entry not only the cached data and coherency state information of the cache line, but also snoop filter information associated with that cache line to indicate which caching agents 2, 30 should be snooped on an access to that cache line. However, in other examples, the system cache and snoop filter could be implemented as separate structures looked up separately.

Figure 3:
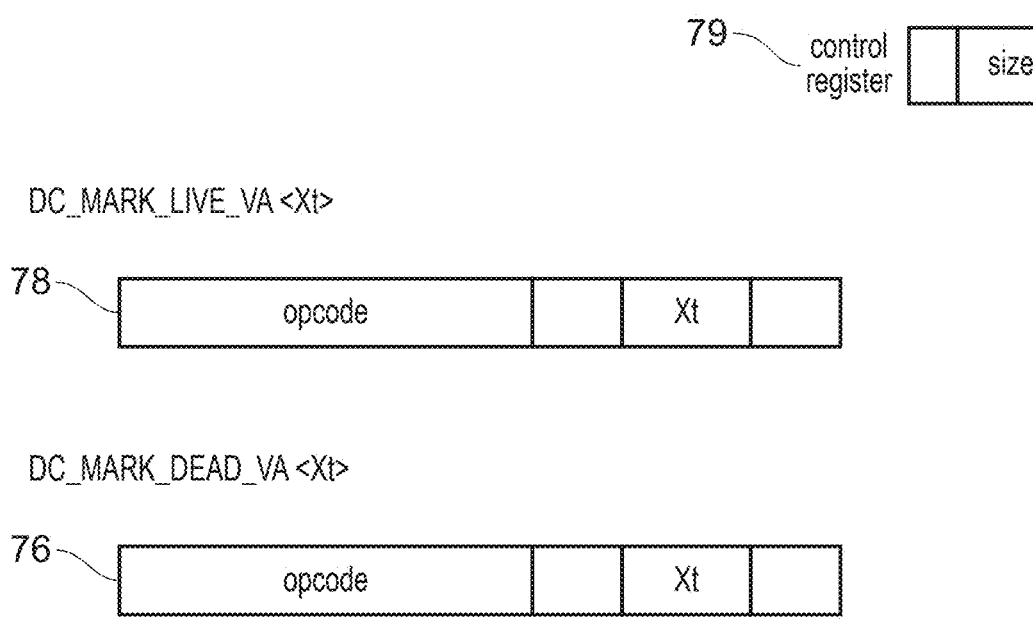
FIG. 3 illustrates examples of a mark-live instruction and a mark-dead instruction.

FIG. 3 illustrates an example of a mark-live instruction 78 and a mark-dead instruction 76 which can be included within the instruction set defined by a CPU instruction set architecture (ISA) supported by the instruction decoding circuitry 6, processing circuitry 8 and cache control circuitry 20 of a given CPU 2. It is not essential that all CPUs in the system shown in FIG. 2 support these instructions. A system could include a CPU 2 supporting these instructions and another CPU 2 that does not support these instructions.

The mark-dead instruction 76 specifies an opcode identifying the instruction type as being the mark-dead instruction, and mark-dead target address information for identifying at least one target cache line. Similarly, the mark-live instruction 78 specifies an opcode (differentiated from the opcode of the mark-dead instruction 76) identifying the instruction type as being the mark-dead instruction, and mark-live target address information for identifying at least one target cache line.

In this example, the mark-live instruction 78 and mark-dead instruction 76 each specify their mark-live/mark-dead target address information using an address operand specified in a register Xt which is referenced in a source register field of the instruction encoding. The address operand could be an absolute address directly specifying the address indicated by the address operand, or an offset to be applied relative to a reference address (e.g. program counter address of the instruction) to obtain the address indicated by the address operand.

In this example, the address identified based on the address operand is a start address of a range of addresses, and the end address is determined based on a size parameter held in a control register 79 of the CPU 2. The control register 79 is not explicitly identified in the encoding of the instructions 76, 78, but may be implicit from the opcode. Hence, where address #A is the address determined from the address operand Xt, the mark-live target address information and/or mark-dead target address information may be considered to identify cache lines falling within a certain address range #A to #A+size. The target cache lines may be considered to be those cache lines which fall entirely within that range (cache lines which only partially fall within the range may be excluded from being selected as target cache lines). The control register 79 used to provide the size parameter may be updated in response to a control register updating instruction which specifies the new value for the size parameter and identifies that the updated control register should be the control register 79 that specifies the size parameter. The control register updating instruction could, in some examples, be limited to being allowed to update the size parameter in certain execution states with at least a threshold level of privilege. In other examples, the control register updating instruction could be allowed to update the size parameter even in a least privileged execution state.

In other examples, the address range for selecting the target cache lines can be indicated in a different manner, e.g. with the range end parameter being encoded as a second operand of the instruction rather than in a control register.

Other examples could specify the mark-live target address information and/or mark-dead target address information using an address identifying a single target cache line, rather than identifying a range of cache lines.

It is also not essential for the mark-dead instruction 76 and mark-live instruction 78 to be symmetric in their addressing modes, and other examples could have a different encoding for the mark-live target address information and mark-dead target address information respectively.

The mark-dead instruction 76 is used to flag which cache lines of data can be considered "dead" from a software perspective, indicating that software does not need this data anymore. For example, software can choose to execute the mark-dead instruction at the point when a memory region is freed for reuse for representing a different variable or data structure to the variable/structure previously represented using that region of memory. In response to the mark-dead instruction 76, the cache control circuitry 20 of the CPU 2 can treat one or more target cache lines identified based on the mark-dead target address information as "discardable", indicating that they are allowed to be discarded from the cache 18 without writeback even if the cache line is dirty. The target cache lines could be invalidated from the cache as a direct response to the mark-dead instruction, or could be marked with metadata indicating that they can be discarded later upon subsequent eviction of the data from the cache. The cache control circuitry 20 can also cause a mark-dead request to be sent via the interconnect 40 to signal to the shared system cache 74 and/or private caches 18 of other caching agents that corresponding copies of the target cache lines can also become discardable.

On the other hand, the mark-live instruction 78 can be used as a hint from software to the hardware indicating that one or more cache lines of data have recently become "live" from a software perspective. The mark-live instruction can serve multiple purposes. Firstly, the mark-live instruction can flag that a region of memory has been allocated for a new purpose and so any previous contents of that region of memory are not meaningful, which can be helpful for enabling the cache/memory hierarchy to avoid issuing line-fill requests for the old data when starting to write to the newly allocated region of memory. Also, as explained further below, the mark-live instruction can qualify the operation of the mark-dead instruction, to ensure that only cache lines which have been marked as live using the mark-live instruction 78 are allowed to become treated as discardable in response to the mark-dead instruction 76, which is helpful for reducing risk of coding error or malicious attack compromising integrity of still-live data.

Figure 4:
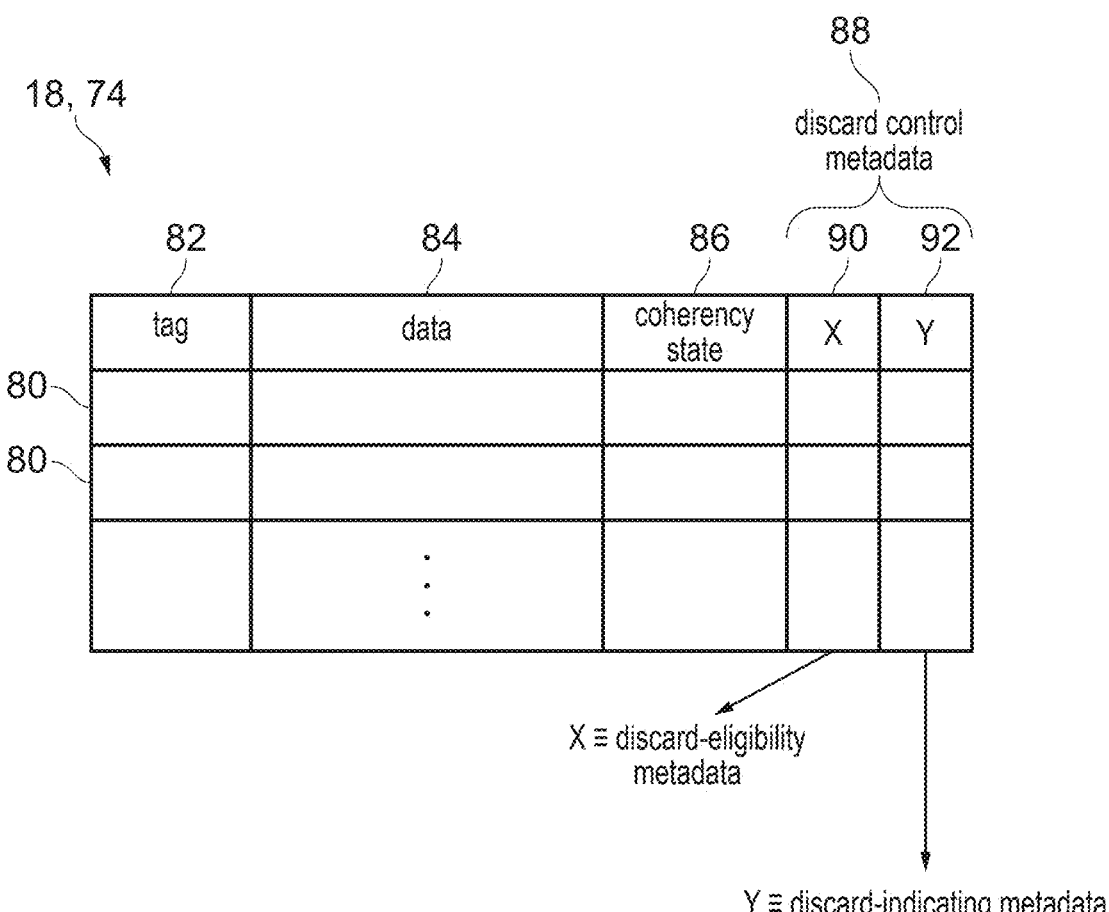
FIG. 4 illustrates an example of a cache which associates discard control metadata with cache lines.

FIG. 4 illustrates an example of a cache structure, which could be a private cache 18 of a given caching agent 2, 30, or could be the shared system cache 74 managed by the home node circuitry 70. The cache 18, 74 includes a number of entries 80 each capable of holding information for corresponding cache line. A given entry 80 comprises an address tag 82 for identifying an address of the corresponding cache line, cached data 84 corresponding to the cache line, and a coherency state indicator 86 indicating the coherency state of the cache line for that cache 18, 74. For example, with respect to a given cache, the coherency state 86 could be indicated as one of Invalid (I), UniqueClean (UC), UniqueDirty (UD), SharedClean (SC) or SharedDirty (SD)—UC, UD, SC, SD corresponding to the respective combinations of the Unique/Shared status and Clean/Dirty status as discussed above.

As shown in FIG. 4, each cache entry 80 may also specify discard control metadata 88 for the corresponding cache line, in this example including discard-eligibility metadata 90 (denoted for conciseness as "X" or "x" in subsequent diagrams) and discard-indicating metadata 92 (denoted for conciseness as "Y" or "y" in subsequent diagrams). While the two types of metadata 90, 92 are shown separately in FIG. 4 (e.g. each indicated by a corresponding bit of metadata in the cache entry 80), it would also be possible to indicate both items of metadata using a single combined field, or to combine encoding the metadata 90, 92 into the coherency state indicator 86.

The discard-eligibility metadata (X) 90 indicates whether the corresponding cache line is eligible for being treated as discardable when a subsequent mark-dead event occurs. The discard-eligibility metadata 90 can be set to indicate that the cache line is discard-eligible in response to the mark-live instruction being executed specifying mark-live target address information corresponding to that cache line. Lines not selected as target cache lines using the mark-live instruction may remain discard-ineligible.

The discard-indicating metadata (Y) 92 indicates whether the corresponding cache line is discardable, that is whether the data for the corresponding cache line can be evicted from the cache without writeback even if the line is dirty (hence if the writeback is eliminated, any dirty data discarded based on the discard-indicating metadata 92 would be lost). The discard-indicating metadata 92 can be updated in response to a mark-dead instruction or other mark-dead event that specifies mark-dead target address information corresponding to that cache line (e.g. another type of mark-dead event other than the execution of the mark-dead instruction could be receipt of a mark-dead request from the interconnect 40 triggered by execution of the mark-dead instruction at another CPU 2). The discard-eligibility metadata 90 is used to control whether the discard-indicating metadata 92 is set in response to the mark-dead event for a given target cache line-lines which are not discard-eligible do not become discardable even if selected as a target cache line by the mark-dead event. In this way the mark-live instruction may be used to police which lines are suitable for becoming discardable when the mark-dead instruction is executed. The discard-indicating metadata 92 can also be updated in response to other kinds of events, such as read/write/snoop requests to the cache line being detected, which may cause the discard-indicating metadata 92 to be reset to a state indicating that the line is not discardable.

Figure 5:
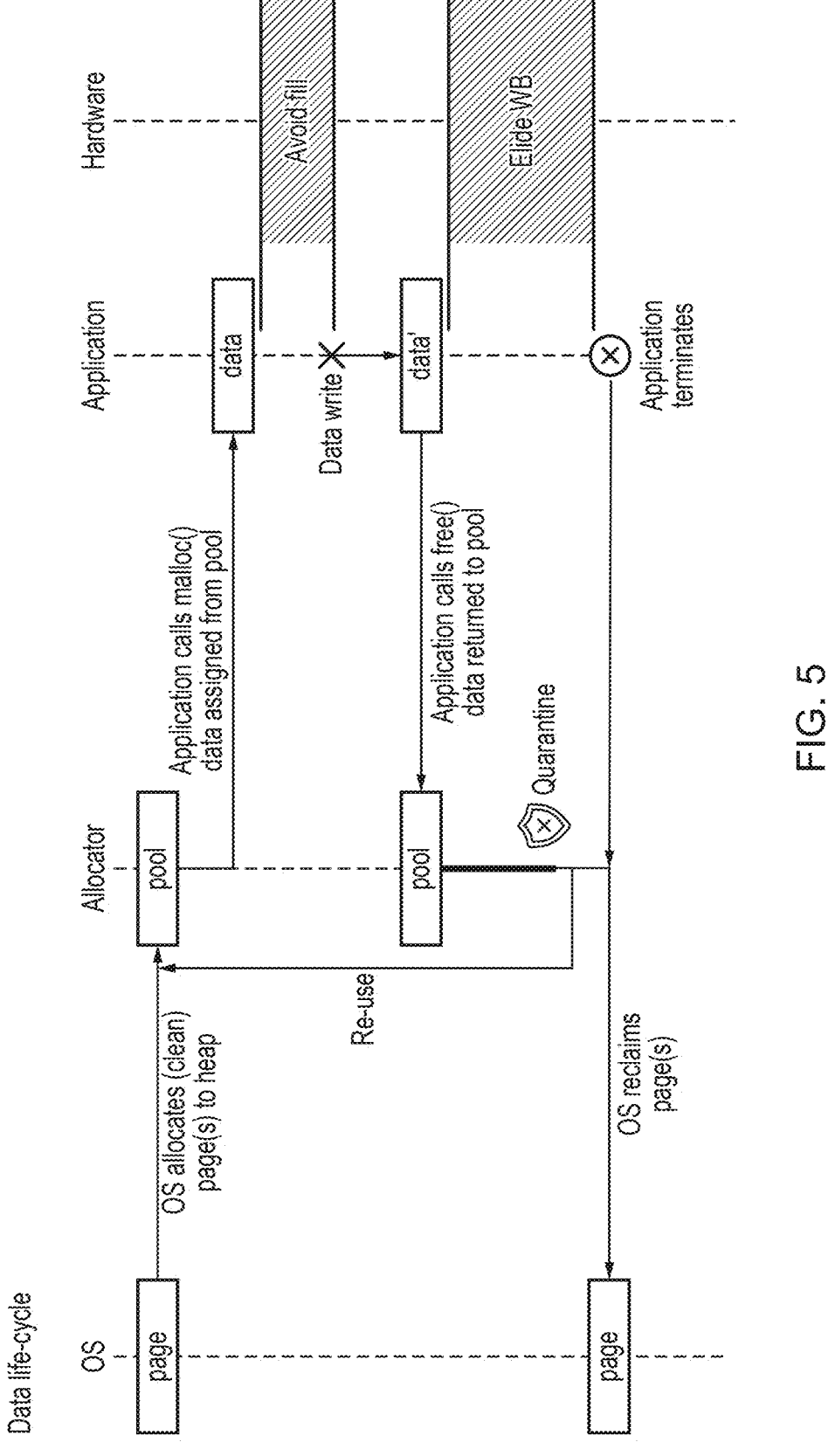
FIG. 5 illustrates an example of a data lifecycle.

FIG. 5 illustrates an example data life-cycle illustrating, for explanatory purposes only, a high-level software view of how memory is allocated for use by application software. It will be appreciated that this diagram does not show the machine code instructions of the CPU ISA that would actually be seen by the hardware of a CPU 2, but rather shows a view of functionality carried out by instructions written in a high-level programming language that would be compiled into machine code before being executed on the CPU 2.

An operating system (OS) may be responsible for allocating regions of memory available for use by a given application process. The OS may allocate a pool of clean pages to a "heap" structure which represents pages of memory space that are available for allocation to application processes. An "allocator" routine may select available pages of address space from the pool when requested to do so by an application calling a memory allocation function, when it needs memory address space to be used for a given data structure. For example, the application can call a so-called "malloc( )" function which causes the allocator to allocate a new block of memory pages to the application without overwriting the old contents of the pages, or call a so-called "calloc( )" function which causes the allocator to, in addition to allocating the new region of memory, also overwrites the old contents of that region with a fixed value such as zero. Either way, the allocator routine may update the address translation mappings specified in the page tables used by the MMU 14 to reflect the new memory allocations. The application software can now start writing its data to the allocated region of memory.

In a typical processing architecture not supporting the mark-live instruction discussed above, when the application starts writing new data to the newly allocated region, store requests which only update part of a corresponding cache line may trigger linefill requests to the memory system to obtain data for the remaining part of the same cache line, so that the new/old data can be merged. This is because typical architectures do not have a mechanism to identify to the hardware that the old data for the non-overwritten part of the cache line is meaningless to that application software because the memory region has only just been allocated and so contains garbage data from the application software perspective. Hence, typical processing systems may waste a significant amount of memory system bandwidth processing unnecessary linefill requests for data that will never be needed (see the period labelled "avoid fill" in FIG. 5 during which hardware could be occupied in processing such unnecessary linefill requests). By supporting the mark-live instruction 78 described above, an instruction type is provided which enables software (e.g. the allocator, as part of the memory allocation function) to signal to the hardware a hint that certain addresses have just been made "live", so that the hardware can understand that it is possible to eliminate linefills for the corresponding cache lines. For example, the mark-live instruction may cause a target cache line selected by the mark-live instruction to be "materialized" into the cache specifying a fixed value (such as zero), rather than initiating a linefill to obtain the corresponding data. This can help save a significant amount of memory system bandwidth, improving performance for other requests which are competing for limited bandwidth.

On the other hand, once the application has finished using the data structure located a given region of memory and no longer needs the corresponding data, the application can call a "free( )" function call, which causes the memory pages previously used for the data structure to be returned to the pool of pages managed by the allocator which are available for future re-allocation. A quarantine period may be imposed to reduce the likelihood that memory accesses to those freed pages are still outstanding in the memory system before the pages are re-allocated for a different purpose. After the quarantine period is over, the allocator is free once more to re-allocate the pages when requested by a given application. Eventually, the OS may also reclaim the pages so that they cannot be re-allocated by the allocator, e.g. this may occur if the software application is terminated.

When the application software has finished using the data structure and has freed the memory for reallocation, the caches 18, 74 may still hold dirty data for cache lines in those memory pages which has not yet been written back to memory. In a typical architecture not supporting the mark-dead instruction, that dirty data may eventually be written back to a further cache or memory when the cache line is evicted from a given cache due to capacity pressure when cache capacity in the given cache is needed for other data. However, if the software has already freed the memory pages than no subsequent read/write access is expected to that dirty, and so the energy and performance cost of consuming memory system bandwidth on processing the writebacks is wasted (see the period labelled "Elide WB" in FIG. 5 when the hardware would typically be occupied with this unnecessary writeback processing). Typical architectures have no way for the software to hint to the hardware that data is become dead from a software perspective. However, by providing the mark-dead instruction which identifies an address or range of addresses to identify at least one dead cache line that is discardable without writeback, the performance and energy cost of the writebacks can be at least partially eliminated, to save energy and improve system performance by allowing limited memory system bandwidth to be used for other more useful purposes.

Figure 6:
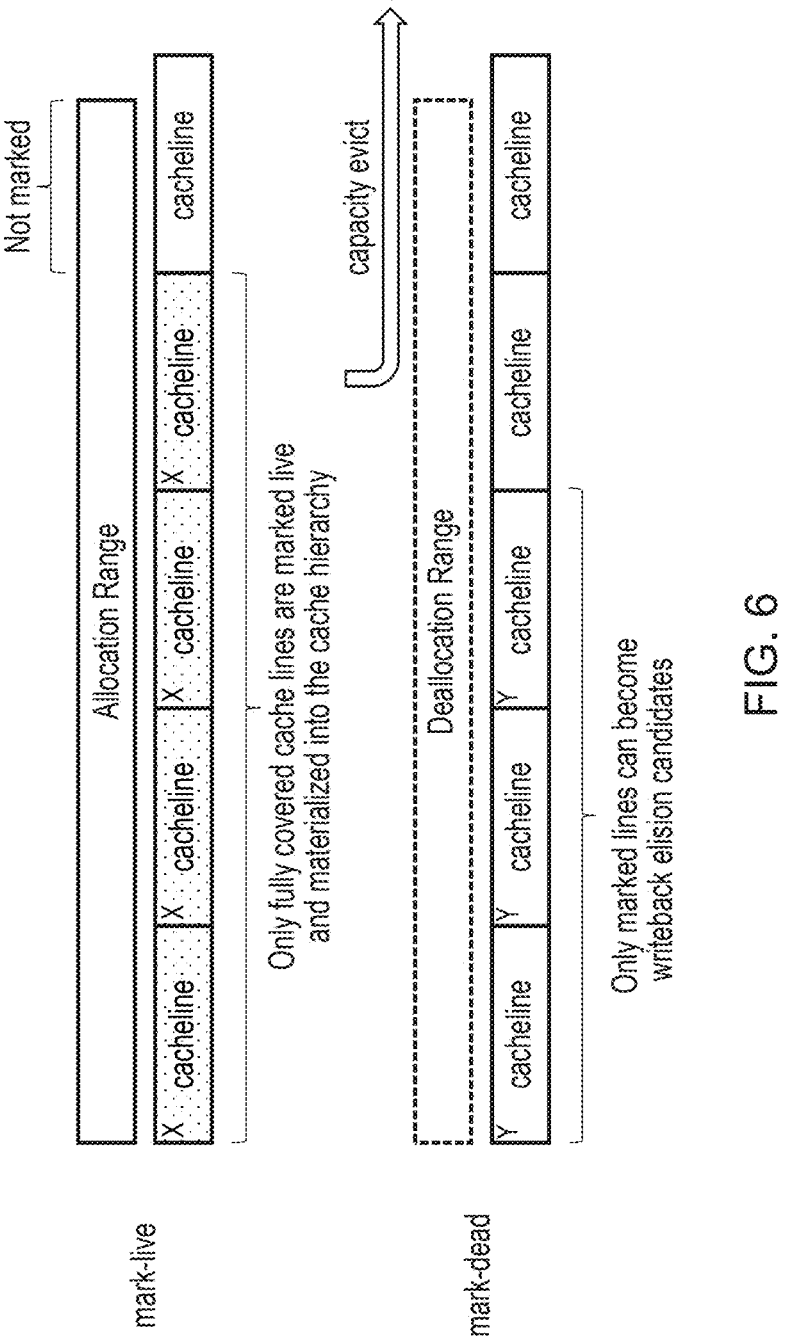
FIG. 6 illustrates an example of marking cache lines using discard-eligibility metadata in response to a mark-live instruction and using the discard-eligibility metadata to determine which cache lines can become discardable in response to a mark-dead event.

FIG. 6 illustrates an example of setting the discard control metadata 88 in response to the mark-live and mark-dead instructions. The top part of FIG. 6 shows an operation in response to execution of the mark-live instruction. The mark-live instruction specifies mark-live target address information corresponding to a particular allocation range of addresses which spans multiple cache lines. For those cache lines which are fully covered by the allocation range, the discard-eligibility metadata 90 is set (as denoted by "X" in FIG. 6) to indicate that the cache line is eligible for becoming discardable when a corresponding mark-dead event happens later. Note that the fifth cache line shown in the example of FIG. 6 is not marked as discard-eligible, because it only partially intersects with the allocation range identified by the mark-live target address information, so not all the data in that cache line can be guaranteed to have been made live by the memory allocation event which prompts software to choose to execute the mark-live instruction. For the cache lines which are marked as discard-eligible, if those cache lines were not already held in a given cache 18, 74, the data for that cache line can be initialised to a predetermined value (e.g. zero) without issuing any linefill request (this may result in the cached data being different from the data held in underlying memory, but this is not a problem as that underlying memory data is indicated by the mark-live instruction as being garbage data associated with a process that used the corresponding memory region for a different purpose prior to the latest "mark-live" allocation). If the discard-eligible lines were already in the cache, then different options are possible for determining how to update those lines, as discussed in more detail below with respect to FIG. 12.

In the example of FIG. 6, after the mark-live instruction is processed (but before the corresponding mark-dead instruction is executed), one of the cache lines shown fourth from the left in the example of FIG. 6 is evicted from a given level of cache, and the discard-eligibility metadata X for that cache line is lost (e.g. because a further level of cache did not support use of the discard-eligibility metadata, or because the line was evicted from a final level of cache to main memory 42). Hence, by the time a mark-dead event occurs, not all of the cache lines which were previously marked with the discard-eligibility metadata X by the mark-live instruction may still be indicated as discard-eligible.

The bottom part of FIG. 6 shows an operation in response to a mark-dead event, which could be execution of the mark-live instruction or receipt of a mark-dead request issued via the interconnect 40 in response to a mark-dead instruction being executed on another caching agent 2. The mark-dead event specifies mark-dead target address information identifying a deallocation range of addresses (e.g. a range of addresses that has been freed by the software). Again, the target cache lines to which the mark-dead event applies are those cache lines which fall entirely within the deallocation address range identified by the mark-dead instruction/request. However, lines which do not have the discard-eligibility metadata X set (such as a cache line which was evicted to memory since being marked live) are not eligible for becoming discardable. Hence, for the target cache lines which are both selected as wholly being within the deallocation range and have the discard-eligibility metadata X set at the time of the mark-dead event, those target cache lines can be marked as discardable (writeback elision candidates) by setting the discard-indicating metadata Y. On a subsequent capacity-based cache eviction, the writeback request for writing back data from those cache lines can be suppressed even if the line is dirty. By using the discard-eligibility metadata X to control which lines are eligible for being discardable, this reduces the risk of error or attack as even if the mark-dead instruction is erroneously executed for a given range of addresses, if that range has not previously been declared live using the mark-live instruction then this will prevent the data from those addresses being lost if writebacks are suppressed.

Once the discard control metadata Y has been set to mark a given cache line as discardable, the discard control meta- data Y can be cleared in response to events such as a read/write/snoop request being detected for the line (this reduces a risk that an external observer such as a debug process sees different values for the same cache line at different times before and after the dropped writeback, which may confuse debugging), or in response to a specific instruction for clearing metadata as discussed further below.

FIG. 7 illustrates an example of processing a mark-dead instruction encountered by the instruction decoding circuitry 6. At step 100, a mark-dead instruction is decoded. As described previously the mark-dead instruction specifies mark-dead target address information, in some examples indicative of an address range defined by end points (other examples could specify an address of a single cache line as the mark-dead target address information, but a range-based instruction could be more efficient from a performance viewpoint). At step 102, one or more target cache lines are identified based on the mark-dead target address informa- tion. For the range based address information, the target cache lines are those which are entirely within the address range. At step 104, the cache control circuitry 20 sets the identified target cache lines as discardable cache lines. As above, this may be done by setting the discard-indicating metadata 92 of the discard control metadata 88 to a value indicating the discardable status. The cached data that is present in the cache line 80 may either be retained or reset to a predetermined value, e.g. zero.

FIG. 8 illustrates an example of unsetting discard-indi- cating metadata in response to a read, write or snoop request. At step 110, the discard-indicating metadata 92 associated with a target cache line 80 is set, indicating that the target cache line 80 is a discardable cache line (i.e. which may be performed as described with reference to FIG. 7 above). At step 112, a received read, write or snoop request is moni- tored to determine whether it targets a discardable cache line. A read or write may be performed in response to execution of a load or store instruction in software executed on the same processor 2 that comprises the cache 18 storing the discardable cache line. A snoop request may be received from the home node 70 in response to a read/write transac- tion initiated from one of the other caching agents 2, 30.

If a read, write or snoop request targeting a discardable cache line is not received, then the process continues to monitor without modifying the discard-indicating metadata 92. However, if a read, write or snoop request targeting a discardable cache line is received, then at step 114, the discard-indicating metadata associated with that cache line is unset, so that the cache line is no longer discardable. In other words, that cache line is to be treated as containing live data and so if dirty at the point of eviction would be written back to a further level of cache or memory, rather than having the writeback eliminated.

FIG. 9 illustrates how data writeback is controlled. At step 120, a cache line is selected as a victim cache line for eviction. This may occur, for example, because a new cache line is to be allocated to the cache 18. At step 122, it is determined whether the cache line is dirty, based on the cache coherency state indication 86. If not, then no data writeback is required (the dirty/clean status indicates whether the cache holding the cache line has the responsi- bility to writeback dirty data or can assume that the most up to date data is held in another location). Hence, the victim cache line may be evicted without performing a data write- back at step 128, if the data is clean.

If the victim cache line is dirty, then at step 124, it is determined whether the victim cache line is a discardable cache line. For example, the current value of the discard control metadata 88 may be checked to determine whether the discard-indicating metadata 92 has been set. If so, then the victim cache line is a discardable cache line, and the victim cache line is allowed to be discarded without per- forming a data writeback at step 128.

If the victim cache line is not discardable, then it is still possible for the cached data to be live data (at least because the cached data has not been indicated as dead data). Therefore, a data writeback is performed and the victim cache line is evicted at step 126.

It will be appreciated that the steps 122, 124 shown in FIG. 9 could be performed in the opposite order or per- formed at least partially in parallel.

Figure 10:
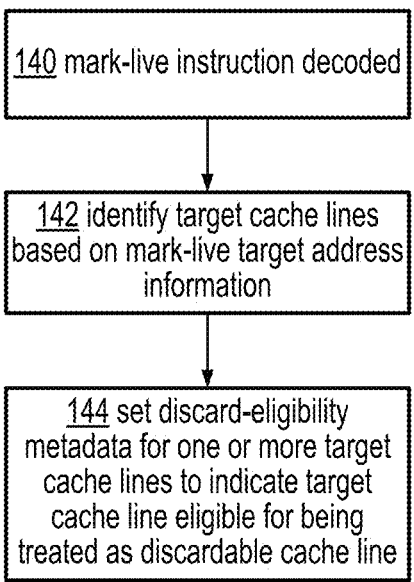
FIG. 10 illustrates processing of a mark-live instruction.

FIG. 10 is a flow diagram illustrating steps for processing a mark-live instruction. At step 140, the mark-live instruc- tion is decoded by the instruction decoding circuitry 6. At step 142, in response to the mark-live instruction, the processing circuitry 8 and/or cache control circuitry 20, 72 identifies one or more target cache lines based on mark-live target address information specified by the mark-live instruction. For example, the instruction could specify a single address identifying a single target cache line, or an address range for which the target cache lines are those cache lines falling entirely within the address range. At step 144, in response to the mark-live instruction, the cache control circuitry 20, 72 updates entries in a corresponding cache 18, 74 to set discard-eligibility metadata for one or more target cache lines to indicate those cache lines as being eligible for being treated as a discardable cache line. In some examples, each of the target cache lines could be marked as discard-eligible. As shown in more detail in FIG. 12 dis- cussed further below, some examples could also apply other criteria for whether a given one of the target cache lines is actually marked as discard-eligible, for example depending on the current coherency state in which the given target cache line is currently held in the cache.

Figure 11:
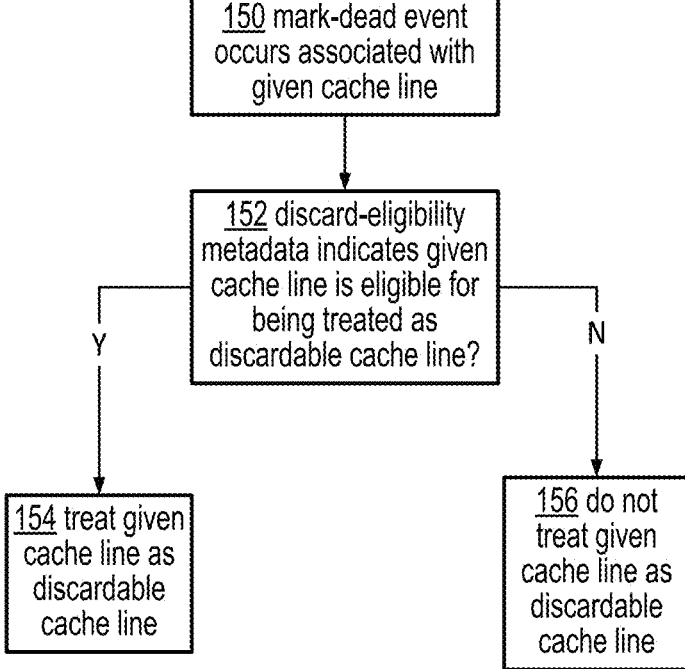
FIG. 11 illustrates processing of a mark-dead event.

FIG. 11 is a flow diagram illustrating steps for processing a mark-dead event occurring at a given caching agent 2, 30 that has a private cache 18 or at the system cache 74 maintained by the home node 70. At step 150, a mark-dead event occurs associated with the given cache line. For example, the mark-dead event could be the execution of the mark-dead instruction specifying mark-dead target address information which identifies the given cache line as one of the target cache lines to which the mark-dead operation is to be applied, as discussed above for FIG. 7. Alternatively, the mark dead event could be receipt of a mark-dead request from the interconnect 40 (triggered by execution of the mark-dead instruction at another caching agent 2) or received at the home node 70 following transmission from the caching agent 2 that executed the mark-dead instruction, which specifies address information corresponding to the given cache line.

At step 152, the cache control circuitry 20, 72 determines whether the discard-eligibility metadata 90 indicates whether the given cache line is eligible for being treated as a discardable cache line. If the given cache line is eligible for being treated as discardable cache line, then at step 154, the cache control circuitry 20, 72 treats the given cache line as a discardable cache line. For example, this could be done by invalidating the given cache line (and not writing back the associated cached data, even if the data 84 is dirty), or by setting the discard-indicating metadata 92 to indicate that the line is discardable upon eviction (in that case, once the line is evicted at a later time when the entry 80 is needed to be reallocated for a different address, the data 84 can be dropped without writing it back to a further cache or memory even if it is dirty). On the other hand, if the discard-eligibility metadata 90 indicated that the given cache line is not eligible for being treated as a discardable cache line, then at step 156 the line is not treated as a discardable cache line, even if its address corresponds to the address information specified as target address information for the mark-dead event. Hence, the discard-eligibility metadata 90 (set based on the mark-live instruction) is used to control whether the cache line can be marked-dead in response to the mark-dead instruction, or should remain non-discardable even if a mark-dead instruction or mark-dead interconnect request is encountered specifying address information corresponding to that cache line.

Figure 12:
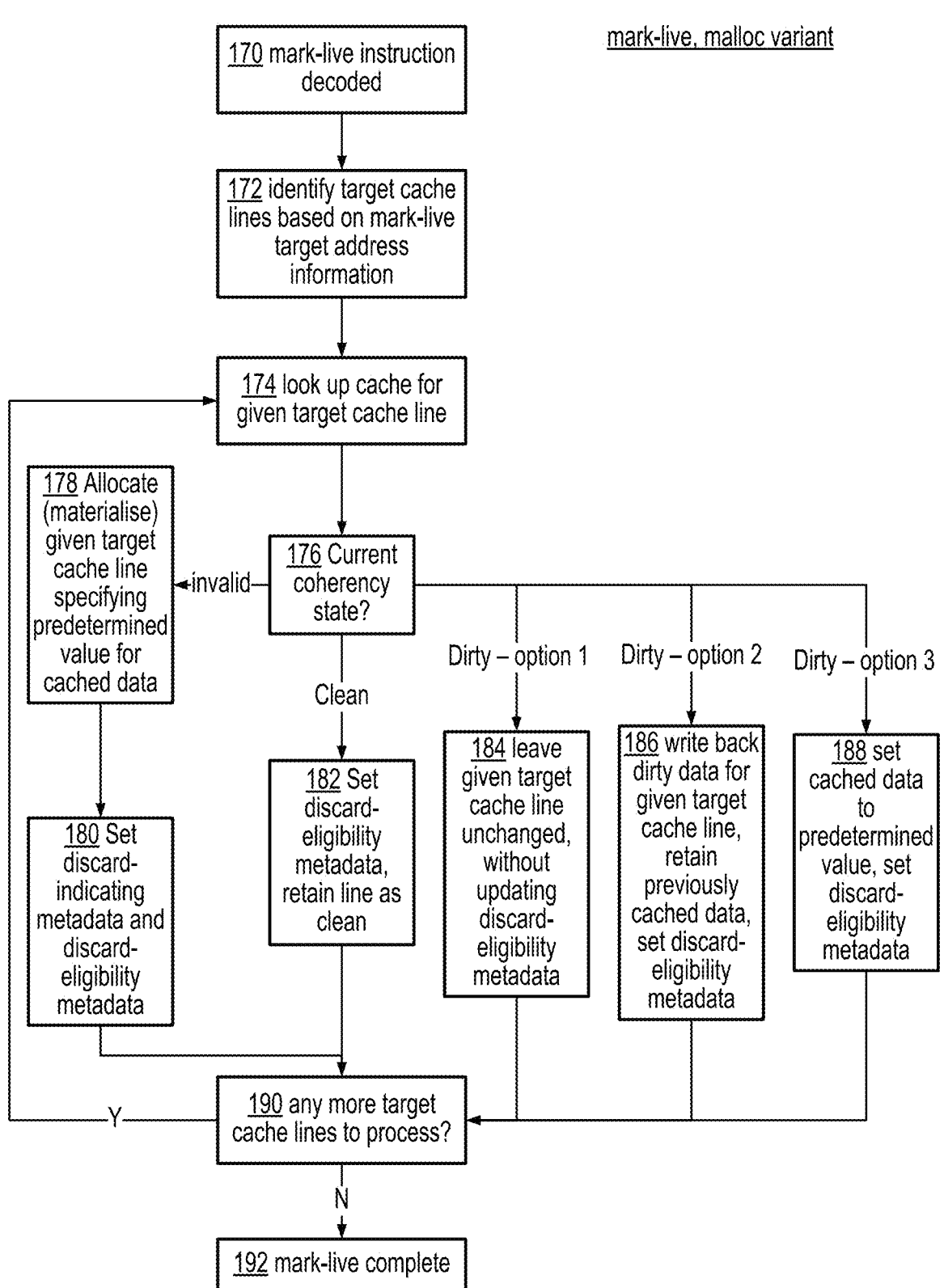
FIG. 12 illustrates processing of a malloc variant of a mark-live instruction.

FIG. 12 is a flow diagram illustrating a specific example of processing the mark-live instruction, for a variant suitable for use in a "malloc" memory allocation function. In the malloc allocation function, the newly allocated region of memory is not required to be cleared to a particular value as part of the "malloc" call (so the malloc function can tolerate the data within the newly allocated region of memory taking any arbitrary value on completion of the malloc call).

At step 170, the mark-live instruction is decoded by the instruction decoding circuitry 6. At step 172, the processing circuitry 8 and/or cache control circuitry 20 identifies one or more target cache lines based on mark-live target address information specified by the mark-live instruction. In this particular example, the mark-live instruction specifies an address range (e.g. using a range start address encoded as an operand of the instruction and a range size parameter defined in a software-programmable control register 79, as in the example of FIG. 3), and the target cache lines are those cache lines falling entirely within the specified address range (cache lines crossing only partially with the address range are not selected as target cache lines). When the instruction is used by software within a malloc allocation call, the expected usage may be that one or more instances of the mark-live instruction would be called, each specifying an address within the newly allocated memory address range and specifying as the range end another address also within the newly allocated memory address range. It is not essential for the software to execute mark-live instructions covering the entirety of the allocated memory range—as the mark-live/mark-dead feature is a performance enhancement that is useful but not required for ensuring architecturally correct processing results, software could choose only to mark as live a portion of the allocated range to reduce the overhead of processing the mark-live instructions. It may be that performance is better for software if it does not execute mark-live instructions for the entire allocated range, e.g. to reduce the amount of cache capacity that is allocated with the predetermined value if not previously held in the cache, so as to preserve a greater fraction of cache entries for other information relating to other address regions which might be more beneficial for performance to have cached. Hence, it will be appreciated that it is a software-use-case-dependent decision as to how the mark-live instruction is used is used in practice, but the instruction offers a way by which software can express a hint to the hardware that a certain region of memory address space has been newly allocated for a new purpose.

At step 174, the cache control circuitry 20, 72 looks up a designated level of cache 18, 74 for a given target cache line identified based on the mark-live target address information, and at step 176 determines the current coherency state 86 for the given target cache line. The designated level of cache could be a private cache 18 (e.g. level 1 or level 2 cache) or a shared system cache 74 in the interconnect 74, for example, and as noted further below, in some examples the designated level of cache could be selected dynamically based on the range size of the address range specified by the mark-live instruction.

If the given target cache line is currently invalid in the designated level of cache 18, 74 (the cache 18 does not hold any valid entry corresponding to the address of the given target cache line), then at step 178 a new entry 80 is allocated for the given target cache line which specifies a predetermined value (e.g. zero) for the cached data 84. That is, the line can be "materialised" into the designated level of cache 18, 74 without sending any cache linefill request to a subsequent level of cache or to main memory 42 to obtain the data for the cache line. The cached data 84 can be generated locally by the control circuitry 20, 72 associated with the designated level of cache 18, 74, e.g. by specifying zeroes for each bit of the cached data 84. This avoids the memory bandwidth overhead of processing a linefill request. At step 180, both the discard-indicating metadata 92 and the discard-eligibility metadata 90 can be set to indicate that the given target cache line as both currently discardable and eligible for being made discardable in response to a mark-dead event. The coherency state 86 for the given target cache line may be set as dirty (e.g. UniqueDirty) as the predetermined value set for the line in the designated level of cache 18, 74 may be different from the value held for the same address in a further level of cache or main memory—the incoherence implied by the combination of dirty coherency state 86 and discardable status indicated by the discard-indicating metadata 92 being acceptable because the nature of the malloc( ) function is that the old data held in memory for that cache line will not matter and it is expected that if software then accesses the corresponding cache line it will be overwriting this old data.

If the given target cache line is currently clean in the designated level of cache 18, 74, then at step 182 the discard-eligibility metadata 90 can be set to indicate that the given target cache line is eligible for being made discardable in response to a mark-dead event, and the line can be retained in the cache in the clean coherency state (either the previously cached data can be retained, or more up to date dirty data held in another cache 74, 18 could be obtained via the interconnect 40). As a clean entry is already present in the cache 18, 74, there is no need to reallocate any cache entries, or issue any linefill request.

If the given target cache line is currently dirty in the designated level of cache 18, 74 then a number of options are possible as shown in FIG. 12. In some cases, the instruction set architecture (ISA) may define a specific one of these options which must be followed for all processor implementations supporting that instruction set architectures. In other examples, the ISA may be more flexible and allow the hardware designer implementing a particular processor implementation to select between these options, but nevertheless the hardware may still only support a single one of these options. Alternatively, some hardware implementations may support two or more different options for responding to the mark-live instruction in the case when the given target cache line is held as dirty in the designated level of cache 18, 74, e.g. selecting between these options based on the current coherency state, or based on performance-monitoring metrics tracked based on previous processing, and/or based on programmable configuration information set by a system operator or user. Hence, a given implementation could vary which option is considered most efficient for a particular use case.

Hence, in a case where the given target cache line is currently held as dirty in the designated level of cache 18, 74, any of the following options are possible:

step 184 (option 1): the given target cache line can be left unchanged, without any update to the discard-eligibility metadata 90. Effectively, in respect of target cache lines selected by the mark-live target address information of the mark-live instruction, which are currently held as dirty in the designated level of cache 18, 74, the mark-live instruction can be treated as a "no-operation" (NOP) instruction which has no architectural effect on the state of that cache line (note that the "NOP" function applies to this particular cache line, but this does not exclude the mark-live instruction causing changes in state for other target cache lines selected by the mark-live instruction which were not held as dirty in the designated level of cache 18, 74).

Step 186 (option 2): the dirty data can be written back to a further cache or to memory, just in case that dirty data is meaningful for some software. The previously cached data can be retained in the designated level of cache 18, 74, but the cache line can then be marked as eligible for becoming discardable by setting the discard-eligibility metadata 90 accordingly.

Step 188 (option 3): the cached data 84 can be set to the predetermined value (with or without writeback of the previous dirty data-if the architecture supports clearing the dirty cached data 84 to the predetermined value without writeback, then the ISA can regard it as a programming error for the mark-live instruction to be called specifying an address that corresponds to dirty data that still needs to be preserved). The discard-eligibility metadata 90 is updated to indicate that the given target cache line is eligible for becoming discardable once a mark-dead event occurs. By setting the cached data 84 to the predetermined value (e.g. all 0 or all 1s), this may help improve efficiency of cache data storage, as some implementations may implement hardware to compress lines of cached data that have particular values (e.g. all 0s or all 1s) into a smaller storage capacity.

At step 190, the cache control circuitry 20, 72 determines whether there are any more target cache lines to be processed in response to the mark-live instruction. If so, then the method returns to step 174 to perform similar steps for another target cache line. Note that, although for ease of explanation, FIG. 12 shows a sequential process applied for one target cache line at a time, some implementations may parallelise the processing for multiple target cache lines at a time, or perform pipelining of the processing for multiple target cache lines in which later steps of the mark-live operation for one target cache line can be processed in parallel with earlier steps of the mark-live operation for another target cache line. Once all target cache lines identified based on the mark-live target address information have been processed, at step 192 the mark-live instruction can be regarded as complete.

Figure 13:
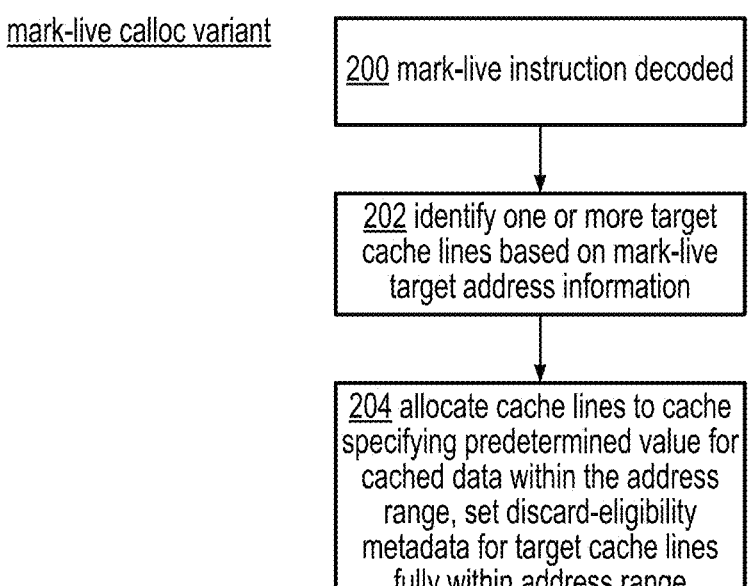
FIG. 13 illustrates processing of a calloc variant of a mark-live instruction.

FIG. 13 shows an alternative variant of the mark-live instruction, which can be useful for supporting a "calloc( )" memory allocation function which, in addition to allocating the new region of memory, also requires that the data for the new region is cleared to a predetermined value (such as zero). Steps 200 and 202 of FIG. 13 are the same as steps

170 and 172 of FIG. 12. However, in the calloc variant of the mark-live instruction, regardless of the current coherency state of the cache line in the designated level of cache 18, 74 at the point when the mark-live instruction is executed, each target cache lines may be allocated (if not previously held) or updated (if already present) in the designated level of cache 18, 74 to specify the predetermined value for the cached data. The discard-eligibility metadata 90 for target cache lines fully within the address range is set to indicate eligibility for future discard (in addition, the discard-indicating metadata 92 can also be set to indicate the materialised lines set to the predetermined value as also being currently discardable). With the calloc variant of the mark-live instruction, as well as performing the mark-live operation to update the discard control metadata 90, 92 for the cache lines entirely within the specified address range, for a cache line that crosses the boundary of the specified address range, the mark-live instruction also causes cached data 84 for the portion of that cache line that lies within the boundary of the address range to be set to the predetermined value, but without setting the discard control metadata 90, 92 to indicate the boundary-crossing cache line as discardable and discard-eligible. This helps to enforce the calloc( ) function's software requirement that the entirety of the specified address range is cleared to the predetermined value, even if the line cannot be marked with the metadata 90, 92 because not all of the data in the cache line is able to be discarded without writeback when evicted from the cache 18, 74.

Figure 14:
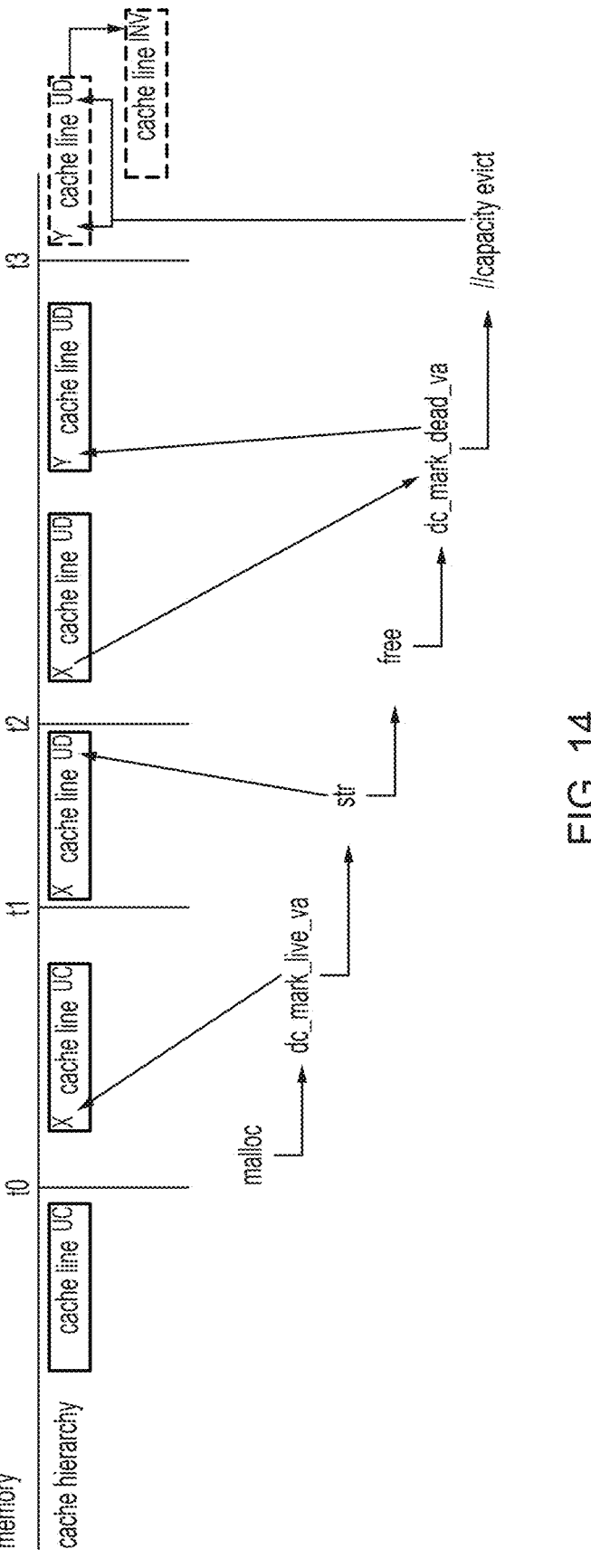
FIG. 14 schematically illustrates an example of processing of mark-live and mark-dead events, in an example where prior to the mark-live event a target cache line is already cached in a cache hierarchy.

FIG. 14 illustrates an example of processing of mark-live and mark-dead events. In particular, FIG. 14 shows how a cache line is changed over the course of processing such events when the cache line is already cached in the cache hierarchy at the point of the mark-live event.

Initially, the cache line is associated with a coherency state indicator 86 indicating UniqueClean (UC). At time to, a memory allocation function, malloc( ) is performed, for example by an operating system or a memory allocator routine. As described above, this may be used when an application is starting or when an application requests more memory address space for a particular variable or array of data. The memory allocation function in this example contains a mark-live instruction 78, "dc_mark_live_va", as described above. In the illustrated example, the cache line is determined to be entirely within a range of addresses identified based on mark-live target address information specified by the mark-live instruction. Therefore, the mark-live instruction 78 causes discard-eligibility metadata 90 (represented by X) to be set to indicate that the cache line is eligible for being treated as discardable when a subsequent mark-dead event occurs.

At time t1, a store instruction is executed to write data to the cache line. Accordingly, the coherency state indicator 86 is updated to indicate UniqueDirty, because the value of the cache line has been modified with respect to memory. The discard-eligibility metadata 90 is not affected by the value of the cached data. It will be appreciated that, as described previously, the discard-eligibility metadata 90 may be lost if the cache line is evicted. Hence, for the purposes of this example, the cache line is assumed to be maintained in the cache for the full duration of the illustrated process.

At time t2, the application finishes using the address range comprising this cache line, and calls the memory deallocation function, free( ) to return the address space for future re-allocation. The memory deallocation function in this example contains a mark-dead instruction 76, "dc_mark_dead_va", as described above. As above, the cache line is determined to be entirely within a range of addresses identified based on mark-dead target address information specified by the mark-dead instruction 76. Accordingly, the cache line is verified as being eligible to become discardable (by checking that X is set), and is then set as discardable by setting discard-indicating metadata 92 (represented by Y) and unsetting the discard-eligibility metadata 90. As a discardable cache line, the cache line is now allowed to be discarded without performing a data writeback of the data stored at time t1.

At time t3, the capacity eviction process is triggered, which causes selection of a victim cache line to be evicted from the cache. This process may be triggered, for example, due to new cached data being allocated to the cache. The capacity eviction process may utilise a cache eviction policy for selecting the victim cache line. In some examples, the cache eviction policy may prioritise evicting cache lines which are discardable, so as to preserve live data in the cache over dead data. The capacity eviction process selects the cache line of FIG. 14 as the victim cache line, and checks the current state of the coherency state indicator 86 and the discard control metadata 88. Upon verifying that the cache line is discardable (by checking that Y is set), the cache line is discarded without performing a data writeback, even though the coherency state indicator 86 indicates that the cache line is dirty. The cache line is then marked as invalid, which allows it to be overwritten by a newly allocated cache line. By discarding the cache line without performing a data writeback, bandwidth in the memory system may be freed up for other processes, thus improving performance.

Figure 15:
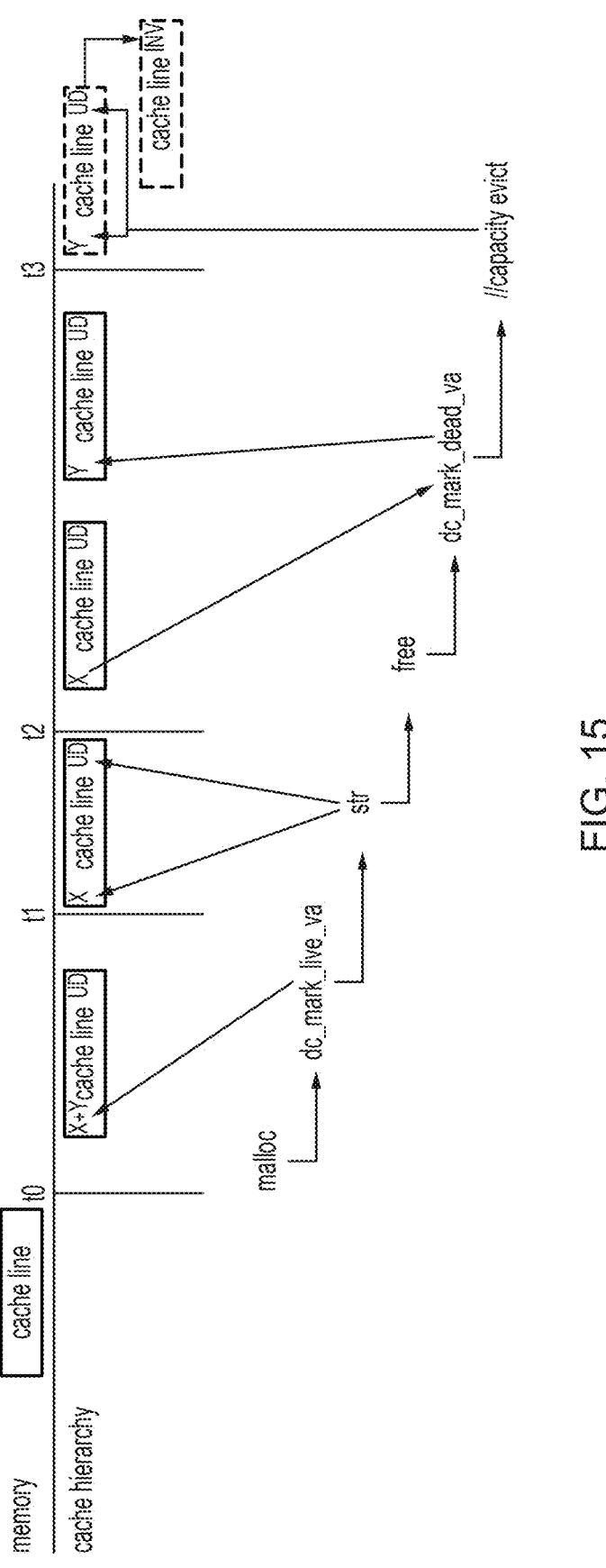
FIG. 15 schematically illustrates an example of processing of mark-live and mark-dead events, in an example where prior to the mark-live event a target cache line is not already cached in the cache hierarchy.

FIG. 15 illustrates an example of processing of mark-live and mark-dead events. In contrast to the previous example, FIG. 15 shows how a cache line is changed over the course of processing such events when the cache line is not already cached in the cache hierarchy at the time of the mark-live operation.

Initially, the cache line is a region of the main memory which aligns with line size and boundaries as defined in a particular memory system. At time t0, a memory allocation function, malloc( ) is performed, similar to that described above. In this example, the mark-live instruction, causes the cache line to be materialised in a target level of the cache hierarchy without a linefill request for the region of memory to be brought into the cache (with the cached data for the materialized line set to a predetermined value such as zero). As described in other examples, the target level of the cache hierarchy may be selected based on the size of the address range indicated by the mark-live target address information. For example, if the mark-live target address information indicates a larger address space, then the cache line(s) may be materialised in a lower (e.g. larger capacity) level of the cache hierarchy (e.g. level 3 or shared system cache 74), whereas if the mark-live target address information indicates a smaller address space, then the cache line(s) may be materialised in a higher (e.g. smaller capacity) level of the cache hierarchy (e.g. level 1 or level 2).

At this point, the cached data may be set to zero, irrespective of the data value currently stored in memory at the corresponding memory addresses. Since the cached data is therefore different to that stored in memory, the cache line is materialised with a coherency state indicator 86 of UniqueDirty. The cache line is also materialised with both discard-eligibility metadata 90(X) and discard-indicating metadata 92 (Y) set. For example, this may indicate that the materialised cache line does not contain meaningful cached data for the software, and so (provided there has not yet been an intervening read/write to the cache line) the cache line may be discarded without performing a data writeback, even before the corresponding mark-dead instruction is executed.

At time t1, a store instruction is executed to write data to the cache line. Since the coherency state indicator 86 already indicates UniqueDirty, there is no update required for the coherency state indicator 86. The discard control metadata 88 is updated to unset the discard-indicating metadata 92 (clear Y). In particular, since the cache line has been written to by the current software process, there is now meaningful data that should be preserved by being written back to memory if evicted before the mark-dead event is encountered. Accordingly, the cache line is no longer discardable, and the data writeback is to be performed upon eviction (unless the cache line is subsequently reset as discardable before being evicted).

At time t2, the memory deallocation function, free( ) is performed, similar to that described above. As above, the mark-dead instruction causes the cache line to be verified as being eligible to become discardable (by checking the X is set). The cache line is then reset as discardable by setting the discard-indicating metadata 92 (represented by Y) and unsetting the discard-eligibility metadata 90. As a discardable cache line, the cache line is allowed to be discarded without performing a data writeback of the data stored at time t1.

At time t3, the capacity eviction process is triggered, which may be performed in the same way as described with reference to FIG. 14 above.

Figure 16:
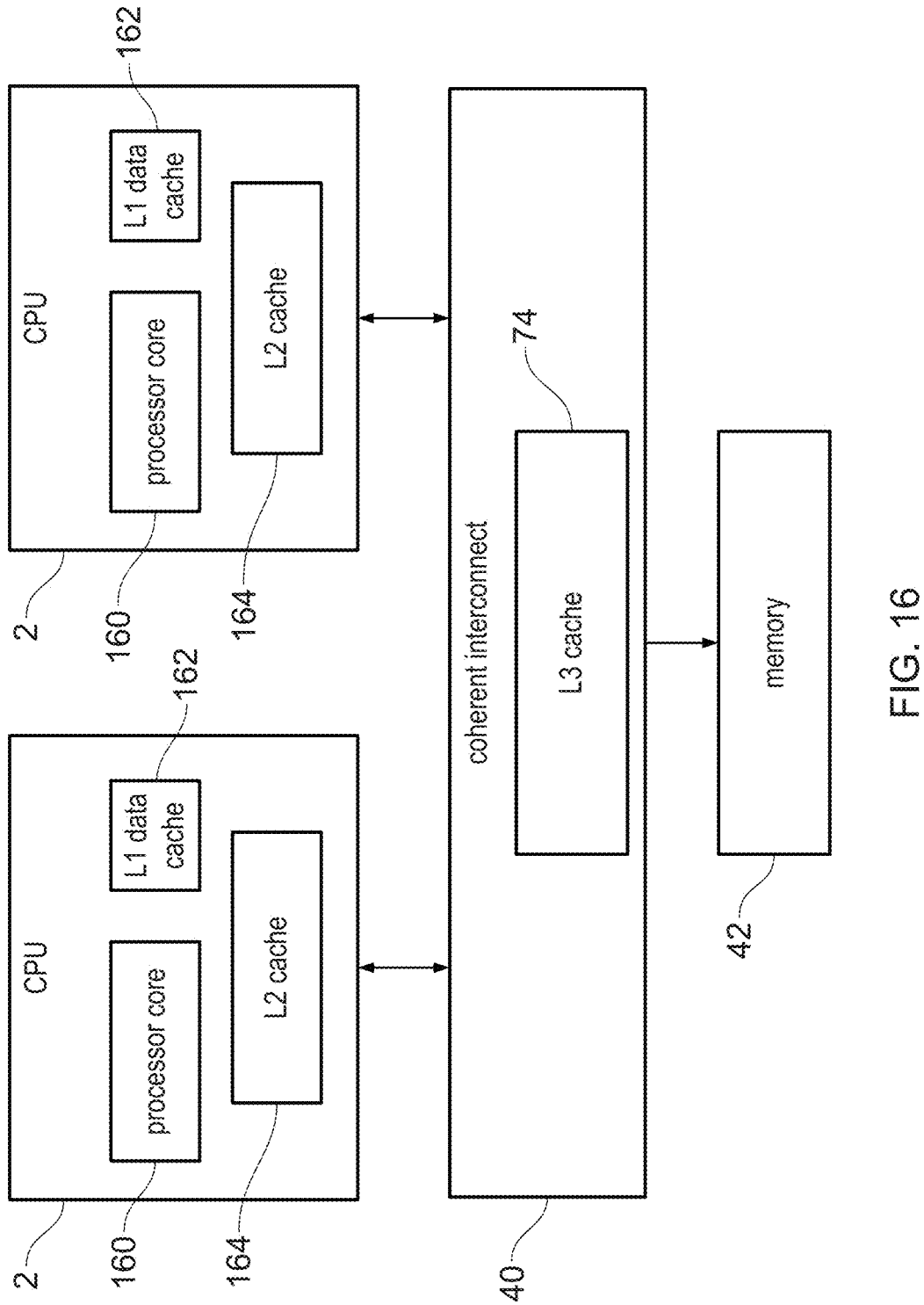
FIG. 16 illustrates an example of a cache hierarchy comprising multiple levels of cache.

FIG. 16 illustrates an example of a cache hierarchy comprising multiple levels of cache in a processing system. It will be appreciated that this example is primarily focused on the cache hierarchy, and hence other various elements (such as the specific internal layout of the apparatus 2 of FIG. 1 and the various interconnect features shown in FIG. 2) are not repeated here for conciseness, however such features may also be combined with the present example.

The processing system comprises a number of CPUs 2 such as those shown in FIG. 1.

The processing pipeline (e.g. the instruction fetch circuitry 4, instruction decoding circuitry 6, and processing circuitry 8) may be contained within the processor core 160. Each CPU 2 comprises a level 1 (L1) data cache 162 for storing cached data values for faster access by the processor core 160. The L1 data cache 162 is the "highest" level cache of this cache hierarchy, in that it has the smallest capacity, is closest to the processor core 160, and is the fastest to access. In this example, the L1 data cache 162 is configured to only store data values, instead of instructions. It will be appreciated that a further instruction cache may be provided for storing instructions that may be fetched by the instruction fetch circuitry 4.

Each CPU 2 further comprises a level 2 (L2) cache 164 for storing cache lines which have been evicted from the L1 data cache 162 (and in some examples, cache lines which have bene evicted from an instruction cache). The L2 cache 164 is lower in the cache hierarchy than the L1 data cache 162. This is to mean that the L2 cache 162 has a larger capacity, is further from the processor core 160 and is slower to access.

In this example, the L1 data cache 162 and L2 cache 164 are both private caches (and so are examples of the private cache 18 described earlier), because they both store data that is private to a respective CPU 2. Hence, for one of the CPUs 2 to access data held in the L1 data cache 162 or L2 cache 164 of the other CPU 2, a read/write request may be sent to the home node circuitry 70 of the interconnect 40 which may then send a snoop request to the other CPU 2 as described previously.

The system further comprises a level 3 (L3) cache 74 which, in this example, is contained within the interconnect 40. The L3 cache 74 may be used for storing cache lines which have been evicted from either of the L2 caches 164. Accordingly, the L3 cache 74 is also an example of a shared cache for storing shared data between both of the CPUs 2. The L3 cache 74 in this example is the "lowest" level cache (LLC) of this cache hierarchy, in that it has the largest capacity, is furthest from either processor core 160, and is the slowest to access. Hence, when cache lines are evicted from the L3 cache 74, those which are not discardable are written back to memory 42. While in FIG. 16, the shared system cache 74 is the level 3 cache of the cache hierarchy, other examples could provide a level 3 cache as a private cache in a given CPU 2, and the shared system cache 74 could be a further level of cache beyond level 3. While FIG. 16 shows both CPUs 2 having the same number of cache levels, other examples could provide one CPU 2 with a greater number of cache levels than another.

When materialising a cache line as described above, at least one target level of the cache hierarchy may be selected. The selection may be based on the size of the region of address space indicated by software (e.g. the mark-live target address data specified by a mark-live instruction). For example, each of the levels of the cache hierarchy may be associated with a respective capacity threshold, whereby if the region of address space exceeds that threshold, then cache lines are materialised in the next level down in the cache hierarchy. Hence, if the size of the region of address space is larger than the capacity threshold of the L1 data cache 162, then cache lines may be materialised in the L2 cache 164 instead of the L1 data cache 162. In some examples, a proportion of the cache lines may be materialised in the L1 data cache 162, while the remainder are materialised in the L2 cache 164. The same process may also be undertaken in respect of materialising cache lines in the L2 cache 164 or the L3 cache 74 based on a capacity threshold associated with the L2 cache 164.

By performing a selection of the target level of the cache hierarchy as above, a performance trade-off between materialising the cache lines in a fast-to-access level of cache (e.g. the L1 data cache 162 or the L2 cache 164) and the retention of cache lines already present in that level of cache. In particular, the performance benefits of materialising cache lines corresponding to a large region of address space in the L1 data cache 162 may be diminished if accessing that region of address space also includes accessing cache lines from the (slower) L2 cache 164 anyway. Furthermore, if cache lines were materialised in the L1 data cache 162, some existing data may be evicted to make room. In particular, the existing data would be pushed to the L2 cache 164, which in turn causes cascading evictions to the L3 cache 74 and to memory 42. Accordingly, the target level of cache for allocation of the materialised cache lines is selected with an aim to balance this performance trade-off. Hence, it may be acceptable to materialise only a few cache lines in the L1 data cache 162 (i.e. for small regions of address space), but not acceptable for materialising a lot of cache lines (i.e. for large regions of address space). Hence, the capacity thresholds of each level of cache may be set according to what would be acceptable in a given implementation.

It will be appreciated that the capacity threshold does not need to be equal to the capacity of the cache to which it relates. The capacity threshold may instead be equal to a proportion of the cache capacity that is acceptable to replace with materialised cache lines (recognising that it may not be desirable to allow the materialized lines to fully evict all data from a given cache level).

FIG. 17 illustrates a selection of a target level of the cache hierarchy. At step 250, software-provided information is obtained and the size of the region of address space is identified. As explained previously, the software-provided information may be the mark-live target address information specified by a decoded mark-live instruction. The software-provided information may also be obtained from another software hint that a particular region of address space is about to be used.

At step 252, a target level of the cache hierarchy is selected in dependence on the size of the region of address space. The particular method by which a level is selected may vary, but one example will be described in relation to FIG. 18 later.

At step 254, cache lines corresponding to the region of address space are allocated to the target level of cache. The cache lines are set to specify a predetermined value (e.g. zero) as cached data.

At step 256, discard-eligibility metadata is set in association with the allocated cache lines to indicate that they are eligible to be treated as a discardable cache line which is allowed to be discarded without data writeback even if the discardable cache line is dirty. In some examples, cache lines which are materialised are indicated as dirty by default (since the predetermined value may differ from the value of the data held for those cache lines in memory 42).

FIG. 18 illustrates an example for controlling the selection of the target level, and may be a sub-process contained within step 252. In step 270, it is determined whether the size of the region of live memory exceeds an L1 capacity threshold. If not, then at step 272, the L1 cache is selected.

If the size of the region of live memory does exceed the L1 capacity threshold, then at step 274, it is determined whether the size of the region of live memory exceeds a capacity threshold associated with the L2 cache. If not, then at step 276, either the L2 cache is selected or a combination of the L1 cache and the L2 cache is selected. Where the L1 cache and the L2 cache are selected as target levels, some cache lines corresponding to the L1 capacity threshold may be materialised in the L1 cache, with the remainder materialised in the L2 cache.

If the size of the region of live memory exceeds the L2 capacity threshold, then at step 278, either the L3 cache is selected or a combination of the L2 cache and L3 cache is selected.

The proportion of materialised cache lines in each cache may be based on the capacity threshold in the same way as above.

Figures 19, 20:
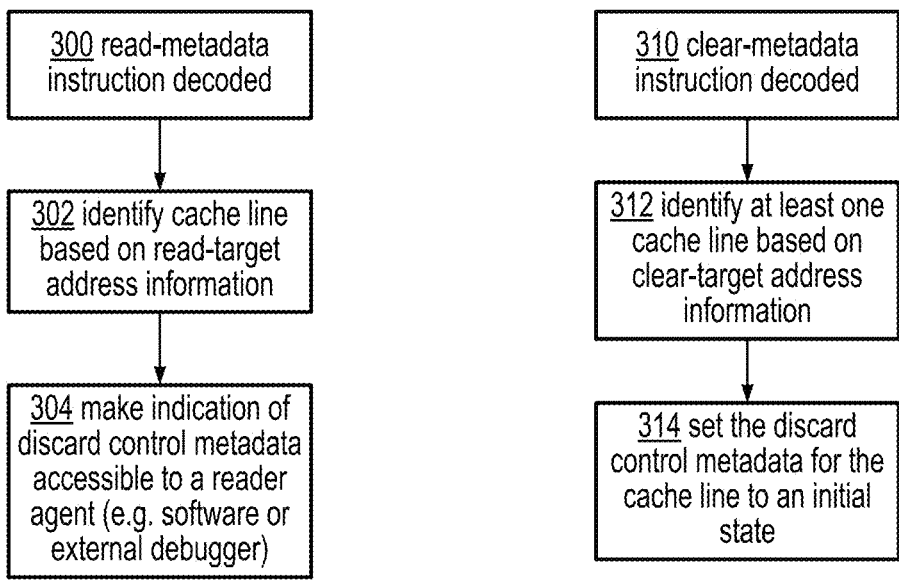
FIG. 19 illustrates processing of a read-metadata instruction.
FIG. 20 illustrates processing of a clear-metadata instruction.

FIG. 19 illustrates an example of processing of a read-metadata instruction encountered by the instruction decoding circuitry 6. At step 300, a read-metadata instruction is decoded. The read-metadata instruction specifies read-target address information which may be an address range similar to that specified by the mark-dead instruction or mark-live instruction. Alternatively, the read-metadata instruction may target single cache lines by indicating a single memory address. At step 302, a cache line 80 is identified based on the read-target address information. At step 304, the cache control circuitry 20 identifies the current value of the discard control metadata 88 (both or either of the discard-eligibility metadata 90 and the discard-indicating metadata 92) associated with that cache line 80, and makes an indication of the discard control metadata 88 available to a reader agent. The indication may be made available, for example, by storing it to a memory location indicated by the software, a software-readable register, e.g. to an indicated one of the registers 10, or by outputting the indication to an external debugger via a debug port.

FIG. 20 illustrates an example of processing of a clear-metadata instruction encountered by the instruction decoding circuitry 6. At step 310, a clear-metadata instruction is decoded. The clear-metadata instruction specifies clear-target address information which may be an address range similar to that specified by the mark-dead instruction or mark-live instruction. Alternatively, the clear-metadata instruction may target single cache lines by indicating a single memory address. At step 312, a cache line 80 is identified based on the clear-target address information. At step 314, the cache control circuitry 20 sets the discard control metadata for the cache line 80 to an initial state. In most use-cases, the initial state is that both the discard-eligibility metadata 90 and the discard-indicating metadata 92 are unset. In other words, the cache line 80 is neither discardable nor eligible to become discardable. The clear-metadata instruction may be included as part of a context switching routine executed when switching from one software process to another software process. It will be appreciated that, where cached data is used by two or more software processes, an outgoing process marking the cached data as dead when it is still in use by an incoming process risks the cached data (which is live from the perspective of the incoming process) being lost if discarded without a data writeback. Hence, the clear-metadata instruction may be used to unset the discardability of the cache line, so that it may be treated as live data and written back as expected. Accordingly, the respective interactions between one process and the memory system can be kept independent from another process.

Figure 21:
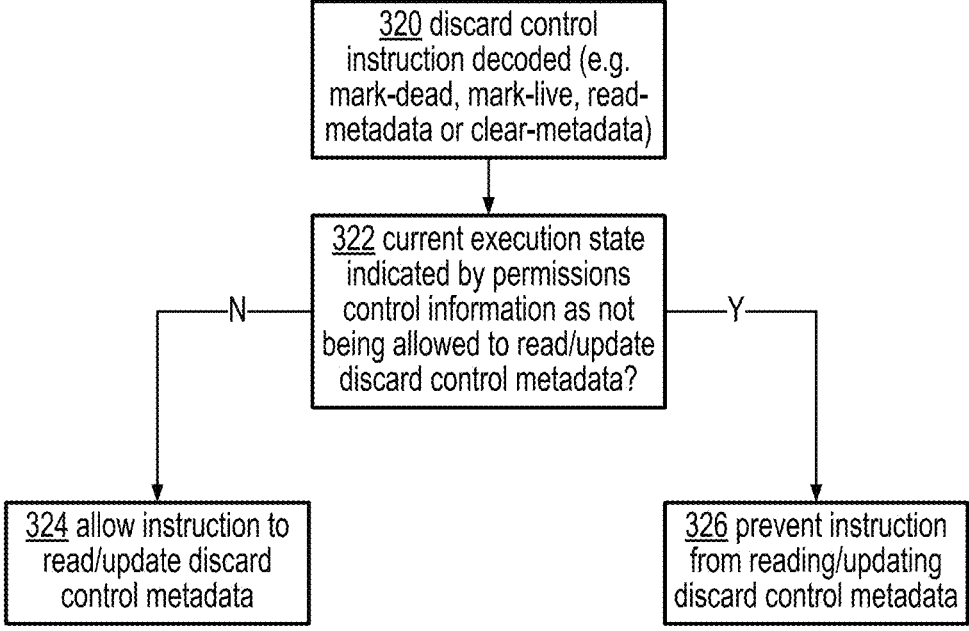
FIG. 21 illustrates use of permissions control information to control whether a discard control instruction is allowed to read or update discard control metadata.

FIG. 21 illustrates an example of using permissions control information to control whether a discard control instruction is allowed to read or update discard control metadata. At step 320, a discard control instruction, which may be any one or more of the mark-live, mark-dead, read-metadata or clear-metadata instructions described in other examples, is decoded by the instruction decoding circuitry 6.

At step 322, it is determined whether the current execution state is indicated by permissions control information as not being allowed to read or update the discard control metadata 88. The permissions control information may take a variety of forms. In some examples, the permissions control information may be programmable permissions specified in a system register which can only be written to in an execution state with an elevated privilege level (e.g. a hypervisor or an operating system). In other examples, the permissions information may be specified using page table attributes defined in a page table entry, thereby causing the permissions to be set by the process that is capable of updating the region of memory containing the page tables (typically an operating system). Hence, step 322 is for determining whether the discardability functions are allowed to be used.

Accordingly, if it is determined that the current execution state is allowed to read or update the discard control metadata 88, then at step 324, the instruction is allowed to read or update the discard control metadata 88. However, if it is determined that the current execution state is not allowed to read or update the discard control metadata 88, then at step 326, the instruction is prevented from reading or updating discard control metadata. It will be appreciated that how a system responds to the instruction being prevented from performing an intended operation may be similar to other scenarios where instructions do not have the requisite permissions. For example, step 326 may result in an exception signal being raised by hardware to indicate that the discard control information attempted to perform an operation without permission. In other examples, it may be acceptable to ignore the discard control instruction being prevented from performing an operation since it may simply result in the cached data being written back to memory which, while using the memory system bandwidth, does not risk discarding useful data.

As discussed above, in response to the mark-live instruction and mark-dead instruction, the cache control circuitry 20 of a given processor (e.g. CPU 2) can maintain discard control metadata 88 associated with cache lines held in a private cache 18, for use in controlling whether the cache line can be discarded without writeback while dirty, to help support performance improvements as discussed above. In some examples, the use of this discard control metadata 88 may be limited to particular levels of cache, e.g. the level 1 cache only, or the level 1/level 2 cache only, or the private caches of a given CPU 2, but may not propagate beyond the boundary at which cache lines pass to the interconnect 40. Even if the discard control metadata 88 is not exposed via the interconnect 40, it can still be beneficial to locally maintain discard control metadata 88 in the private cache hierarchy of a given CPU 2, to allow some instances where writebacks of dead data for marked-dead regions of memory or linefills of garbage data for marked-live regions of memory can be suppressed. However, in this case the discard control metadata 88 associated with a cache line would be lost once a cache line is evicted beyond a given cache hierarchy boundary (e.g. between private cache levels 1 and 2, or between private cache levels 2 and 3, or between the boundary between the private cache hierarchy of a given caching agent 2 and the shared system cache 74), and so even if the same cache line is later brought back into the cache which supports use of the discard control metadata 88, at that point the information allowing that cache line to become discardable is not available and so an opportunity to eliminate future writebacks may be lost.

On the other hand, in some examples, the interconnect 40 may support communication links between caching agent 2, 30 and the corresponding RNF 50, and control circuitry 72 and system cache logic 74 within the interconnect, which support sharing of the discard control metadata 88 between caching agent 2 and the interconnect 40, or between different caching agents 2, to allow the discard control metadata 88 to persist beyond the lifetime with which the cache line is held in the private cache hierarchy of an individual caching agent 2. This can allow longer periods when lines may remain marked as discard-eligible, even if the line is transferred from one caching agent to another during that period. This can provide a further performance uplift for cases when multiple threads of processing interact with shared memory data are executing on multiple processor cores, for example.

Hence, referring back to FIG. 2, on the communications link between an RNF 50 and its corresponding caching agent 2, 30, the receiving/transmitting communication paths on which communication packets are received by the receiving interface circuitry 52 and transmitted by the transmitting interface circuitry 54 may use a communication protocol supporting the reception of discard control metadata 88 for a given cache line by the receiving interface circuitry 52 from a corresponding metadata-transmitting caching agent 2, 30, and supporting the transmission of discard control metadata 88 for a given cache line by the transmitting interface circuitry 54 to a corresponding metadata-receiving caching agent 2, 30. The transmitted metadata 88 could include the discard-indicating metadata 92 and/or discard-eligibility metadata 90. Some implementations may support dedicated discard control metadata signal paths on the communication links between a caching agent 2, 30 and the interconnect, reserved for conveying the discard control metadata. Other implementations may convey the discard control metadata on a shared communication path which is also used for other information, e.g. with header information used to distinguish what particular information is sent on that communication path at a given time. In some cases, spare bits in a communication packet provided for other purposes could be reused to convey the discard control metadata.

FIG. 22 illustrates steps performed by the interconnect 44 for an example which supports transmission of discard control metadata 88 to/from the interconnect 40.

At step 350, the receiving interface circuitry 52 for a given RNF 50 receives, from a corresponding caching agent 2, 30 acting as metadata-transmitting caching agent, at least one item of discard control metadata 88 for a given cache line. Various types of events could cause the caching agent 2, 30 to transmit the discard control metadata 88 to the interconnect 40. For example:

when a snoop data response is returned by the metadata-transmitting caching agent 2, 30 in response to a snoop request sent to that caching agent 2, 30 by the interconnect 40 (the snoop request being sent in response to the interconnect receiving a read/write transaction initiated from another caching agent 2, 30), the snoop data response could specify the discard control metadata held by the metadata-transmitting caching agent 2, 30 for the cache line. This can enable the discard control metadata for the line to be set in the system cache 74 and/or transmitted back to the caching agent that initiated the read/write transaction. For example, this could be useful when the read/write transaction requires the line to be obtained in a Unique coherency state, hence requiring invalidation of corresponding copies at other caching agents' caches 18. By returning the discard control metadata 88 for the cache line in the snoop data response as well as invalidating and returning any dirty data, the discard control metadata 88 for the line can be preserved, which gives information about the managed data lifecycle of the data.

If the metadata-transmitting caching agent 2, 30 sends a writeback message to indicate that a dirty cache line is having its data written back to the system cache 74, the discard-eligibility metadata 90 for the line can be sent along with the dirty data, to allow that metadata to be preserved in the system cache 74, so that on a future mark-dead event, the cache line can still be eligible for discarding, reducing the likelihood a future writeback is needed.

If the metadata-transmitting caching agent 2, 30 sends an eviction message indicating that a cache line has been evicted from its private cache (without writeback of the corresponding data, either because the data is clean or because the cache line is discardable), then even though the line can simply be dropped from the private cache 18 of that caching agent without writeback, it may still be useful to transfer, along with an eviction message sent to notify the interconnect 40 of the eviction, the discard control metadata (e.g. discard-indicating metadata 92 and/or discard-eligibility metadata 90) for the cache line to the interconnect 40 to enable corresponding entries in the system cache 74 to be marked with the same discard control metadata.

At step 352, the transmitting interface circuitry for a given RNF transmits the discard control metadata 88 for a given cache line to a corresponding caching agent 2, 30 acting as metadata-receiving caching agent. Various types of events could cause the caching agent 2, 30 to transmit the discard control metadata 88 to the interconnect 40. For example:

the metadata 88 can be transmitted along with data for a read data message or linefill response providing data for a given cache line for caching in a private cache 8 of the metadata-receiving caching agent. The data 84 and discard control metadata 88 for the read data message or linefill response could be obtained from the system cache 74, for example.

the discard control metadata 88 can be transmitted along with related data 84, or as metadata in isolation, as part of a snoop forward response sent to the metadata-receiving caching agent following receipt of a snoop data response providing the metadata 88 as discussed above for step 350. Hence, the metadata 88 maintained by one caching agent could be forwarded to another caching agent.

In some examples, step 352 could take place directly in response to step 350 (e.g. to forward discard control metadata received in a snoop data response from one caching agent at step 350 to another caching agent at step 352). In other cases, there could be some time between steps 350 and 352, and step 352 could be triggered by a separate transaction flow from the transaction flow that caused the metadata to be received at step 350. For example, step 350 could return the discard control metadata 88 which is written to the system cache 74, and some time later a read/write transaction may cause a lookup of the system cache 74 and then cause the previously cached discard control metadata 88 to be returned at step 352 to the metadata-receiving caching agent. The metadata-receiving caching agent could be the same caching agent that originally executed a mark-live/mark-dead instruction to set the discard control metadata 88 the received at step 350, or could be a different caching agent from the caching agent that originally set the metadata 88.

FIG. 23 illustrates steps performed to preserve discard control metadata in a system cache 74. At step 360, the control circuitry 72 associated with the system cache 74 controls the system cache 74 to be updated to store discard control metadata for a given cache line received from a metadata-transmitting caching agent 2, 30. At step 362, in response to a linefill request for the given cache line hitting in the system cache, the discard control metadata 88 for the cache line is transmitted to a metadata-receiving caching agent 2, 30 which requested the data for the given cache line.

FIGS. 24 to 31 are ladder diagrams provided to illustrate signalling on the interconnect 40 in various scenarios. It will be appreciated these are just some examples for illustrating use of the features discussed above. The abbreviations I, UC, UD, SC, SD refer to the coherency states Invalid, Unique-Clean, UniqueDirty, SharedClean and SharedDirty described above. The request names are based on signals supported in the AMBAR 5 CHI coherent interconnect protocol provided by Arm® Limited, but it will be appreciated that other protocols could also be used.

Figure 24:
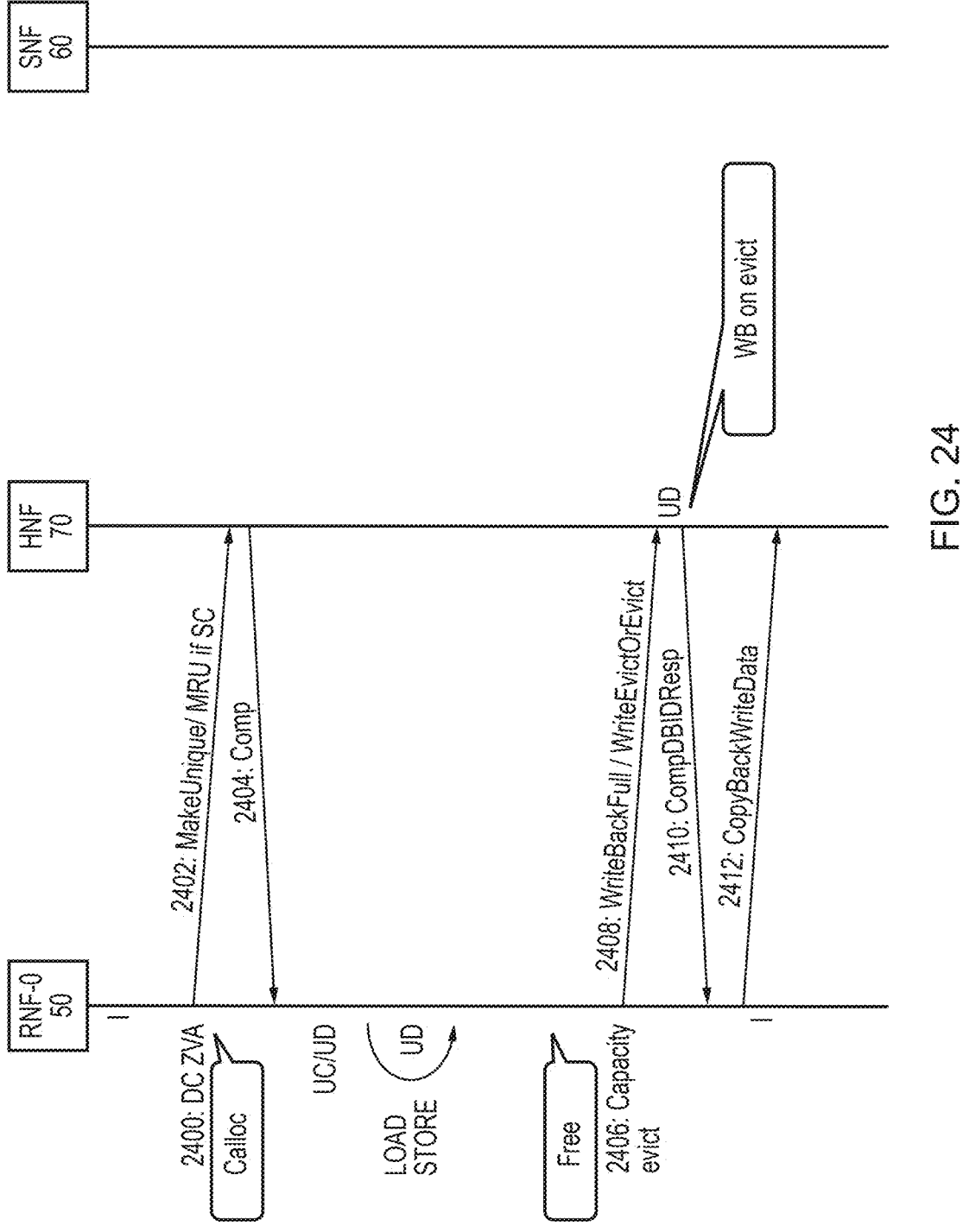
FIGS. 24 and 25 are ladder diagrams illustrating, for comparative purposes, examples of communication flows if the discard control metadata was not supported.
Figure 25:
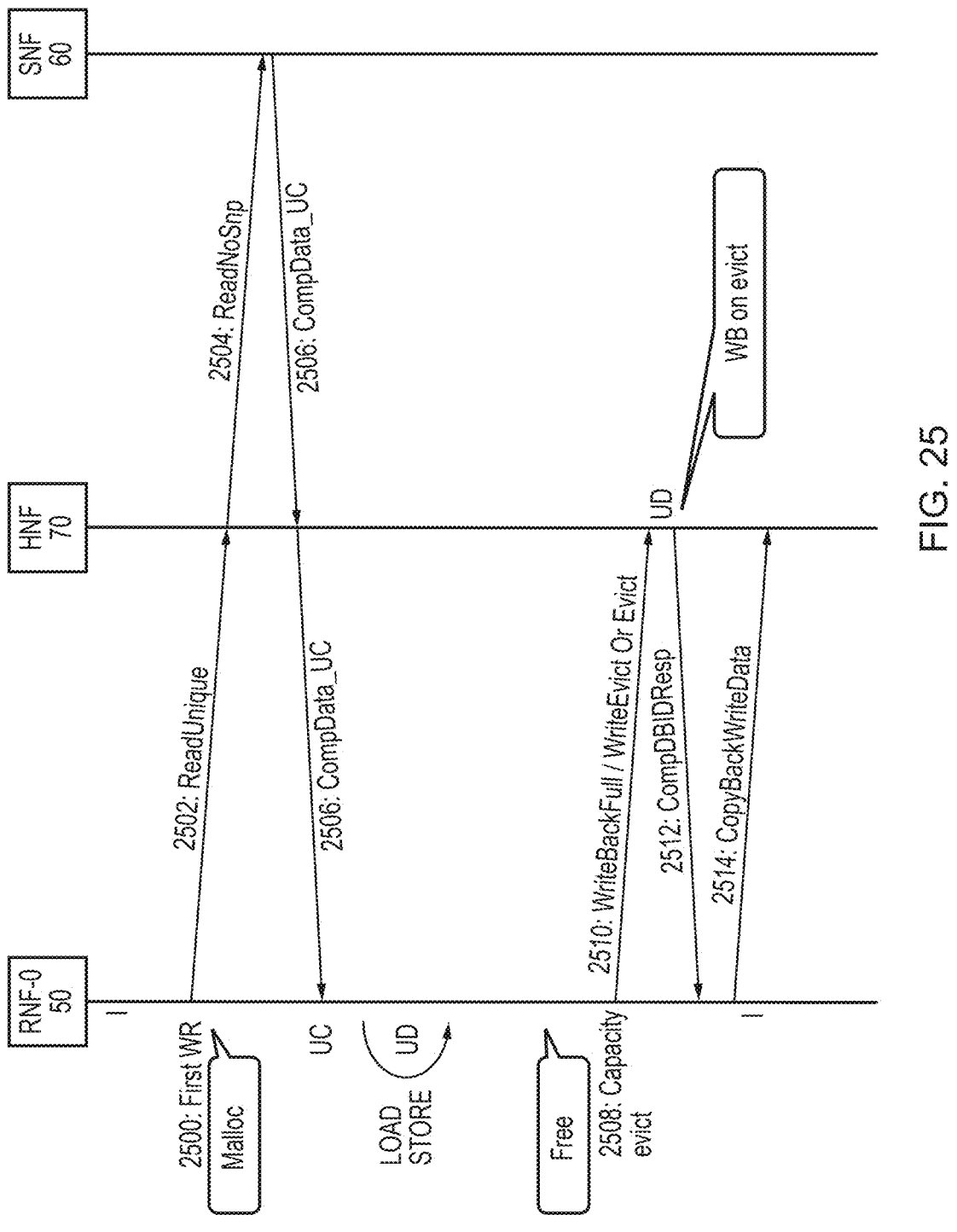

FIGS. 24 and 25 illustrate comparative examples, for an implementation which does not support the mark-live and mark-dead instructions, showing signalling flows between a requester node interface (RNF) 50 for a given CPU 2, the home node (HNF) 70, and a subsidiary node interface (SNF)

60 corresponding to the memory storage which stores a given cache line accessed by the given caching agent.

FIG. 24 shows an example for a "calloc" memory allocation call, comprising the following steps:

2400: the CPU 2 executes a zeroing cache maintenance instruction (DC ZVA) which requests that a given cache line is cleared to zero (this implements the "calloc" functionality to clear the line to zero when it is first allocated).

2402: the DC ZVA operation at the CPU 2 causes the RNF 50 to send a MakeUnique or MakeReadUnique request to the HNF 70 to request that the given cache line is obtained to be allocated in the private cache 18 of the CPU 2 in a Unique coherency state (UC or UD). Here MakeUnique is a request to obtain the right to cache the line in Unique state, without requiring return of associated data, while MakeReadUnique in addition to obtaining the right to cache the line in the Unique state also returns associated data. As the line will be cleared to zero in the private cache 18 of the CPU 2 (based on the DC ZVA operation), it does not matter whether MakeUnique or MakeReadUnique is used. If the line is initially cached as UC, it transitions to UD upon a store operation being executed by the CPU 2.

Subsequently, software frees the memory region including the given cache line, but as there is no support for a mark-dead instruction in this example, the hardware is unaware that the given cache line is dead from a software perspective.

2406: A capacity eviction causes the line to be evicted from the private cache 18 of the CPU 2, and the CPU signals to the RNF 50 to cause a writeback request 2408 (e.g. WriteBackFull or WriteEvictorEvict) to be sent to the HNF 70 (the hardware assumes the dirty cache line still needs to be preserved and is unaware that software will not need the data again). Here, "WriteBackFull" is a request to evict a dirty line from L1 or L2 caches, and WriteEvictorEvict is a writeback if the data is clean at the time the capacity eviction occurs. Either way, the writeback request is part of a write-pull flow, where the write data for the writeback request does not flow with the initial writeback request 2408, but is sent subsequently in a CopyBackWriteData message 2412 sent to HNF 70 once the HNF 70 has issued a completion response 2410 to acknowledge the initial writeback request 2408 and indicate that it is ready to accept the data. The written back cache line is cached in the system cache 74. Hence, without support for the mark-dead instruction, memory system bandwidth is consumed in writing back the data even after the data has become dead.

FIG. 25 shows a comparative example for a "malloc" memory allocation call, comprising the following steps:

Software performs the "malloc" memory allocation function, which allocates a region of memory, but does not provide any hint similar to the "mark-live" instruction which would indicate to the hardware that a cache line has been newly allocated for a new purpose. There is no way the hardware can know that the previous contents of the cache line are garbage data.

2500: the first time the CPU 2 associated with a given RNF 50 writes to a given cache line allocated in the "malloc" call, the CPU 2 requests a read of the previous contents of the cache line to be allocated into the CPU's private cache 18 in a Unique state, causing a ReadUnique request 2502 to be sent to the HNF 70. In this example, the line is not held in any other caching agent's private cache 18 or in the system cache 74, so the HNF 70 issues a ReadNoSnp request 2504 to the SNF 60 associated with the memory storage holding the data for the cache line. At 2506, the associated data is returned to the RNF 50 and then cached as UC in the private cache 18 of the associated CPU 2. The memory system bandwidth consumed in processing the linefill request 2502 and returning the read data 2506 is effectively wasted as the previous data for this cache line is garbage data which will not be needed by the software.

Subsequently, loads/stores may occur at the CPU 2. If a store to the cache line is performed, the line transitions to UD.

Again, there is no way for hardware to hint that the cache line has been freed from a software perspective, so on a subsequent capacity eviction at 2508, the writeback process (steps 2510-2514) is performed in the same way as for steps 2408-2412 of FIG. 24 consuming memory system bandwidth with an unnecessary writeback of dead data.

Figure 26:
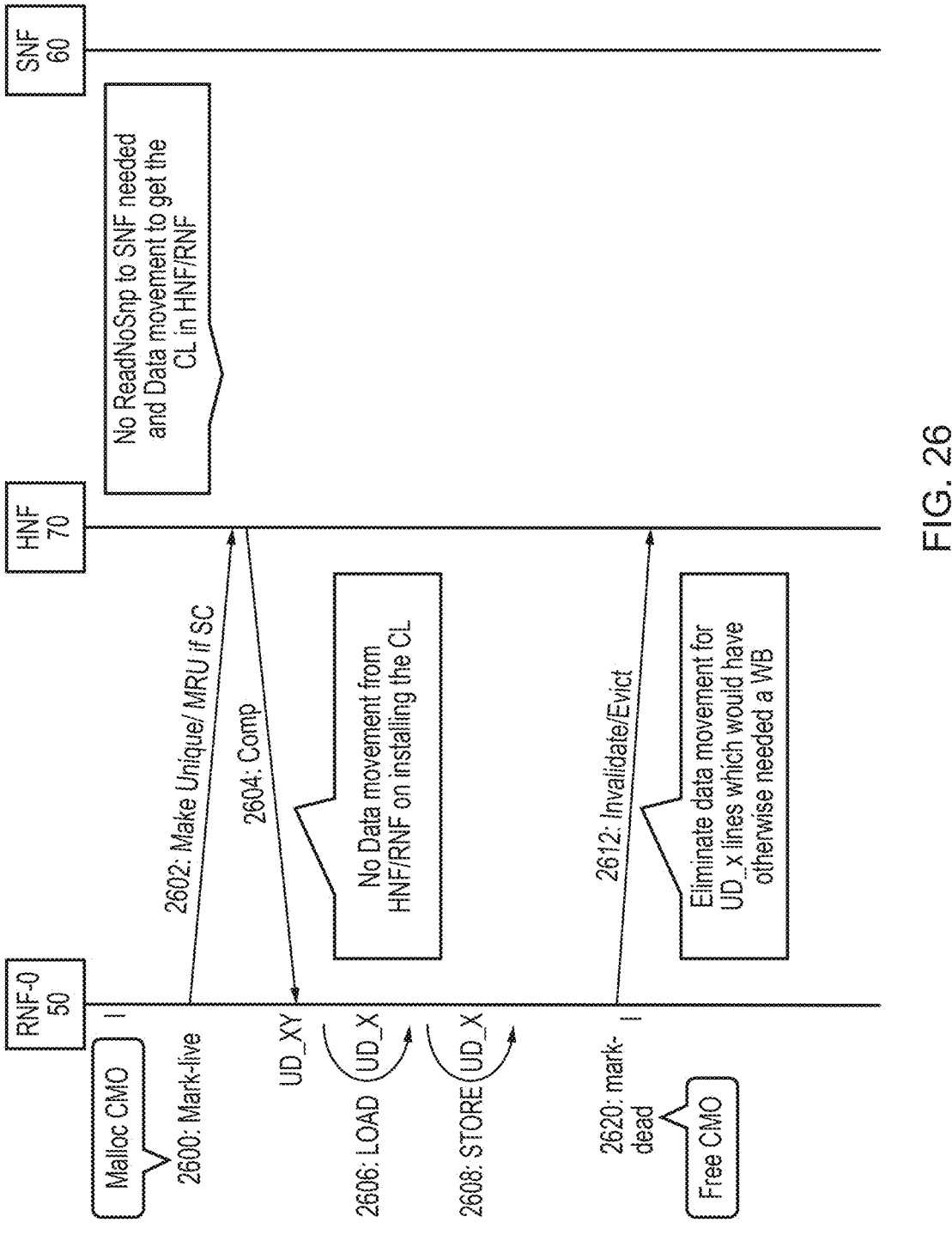
FIGS. 26 to 29 are ladder diagrams illustrating example scenarios for communication flows between a single caching agent and the interconnect in an example supporting use of the discard control metadata.

FIG. 26 shows a first example for using the mark-live and mark-dead instructions to eliminate the unnecessary linefill/writeback overhead, in a single-threaded example where only one CPU 2 (and hence one RNF 50) interacts with a given cache line allocated in the "malloc" call. FIG. 26 comprises the following steps:

2600: following the malloc call, the CPU 2 executes the mark-live instruction specifying mark-live target address information corresponding to at least part of the allocated memory address range.

2602: in response to the mark-live instruction, for a given target cache line corresponding to the mark-live target address information, rather than issuing a ReadUnique request as at 2502 of FIG. 25, the CPU 2 can cause the RNF 50 to send a MakeUnique or MakeReadUnique request to the HNF 70 which requests the right to cache the given target cache line in a Unique coherency state, but does not require return of corresponding read data. The HNF 70 acknowledges the request with a completion response 2604 (having snooped any other RNFs 50 if necessary to invalidate corresponding copies of the line held in other caching agents' private caches 18). The CPU 2 that executed the mark-live instruction allocates the given target cache line in its private cache 18 in the UC coherency state, specifying the predetermined value (e.g. zero) as its cached data 84, and sets the discard-eligibility metadata (X) 90 and discard-indicating metadata (Y) for the cache line (as in this case the line was not already held in that CPU's private cache 18 before executing the mark-live instruction, the line is materialised into the cache specifying the predetermined value). The memory system bandwidth consumed in obtaining read data for the given target cache line from memory (as in FIG. 25) or from another caching agent's private cache 18 can be eliminated.

2606, 2608: subsequent loads/stores can be performed locally in the private cache 18 by the CPU 2, causing the discard-indicating metadata (Y) to be cleared to indicate the line is not currently discardable (once a load/store has occurred, the line has been observed or overwritten with dirty data that is still live, and so would need to be preserved on a capacity eviction). However, the discard-eligibility metadata (X) is retained to indicate that the line is eligible for future discarding once a mark-dead event occurs.

2610: once the memory region comprising the given target cache line is freed, the CPU 2 executes the mark-dead instruction specifying mark-dead target address information for the given target cache line, and as the discard-eligibility metadata X is set, the line qualifies for being discardable. When the line is invalidated from the CPU's cache 18 (either immediately in response to the mark-dead instruction, or subsequently on a capacity-based eviction), the line can either be silently invalidated without informing the HNF 70, or an eviction message 2612 can be sent to the HNF 70 to indicate that the line is no longer held in the private cache 18 of the CPU 2. Either way, the data movement incurred in writing back the dead data at 2412 of FIG. 24 or 2514 of FIG. 25 is eliminated, even if the data for the cache line is dirty in the CPU's private cache 18 at the time of the eviction, conserving memory system bandwidth for use in other more useful transactions.

Figure 27:
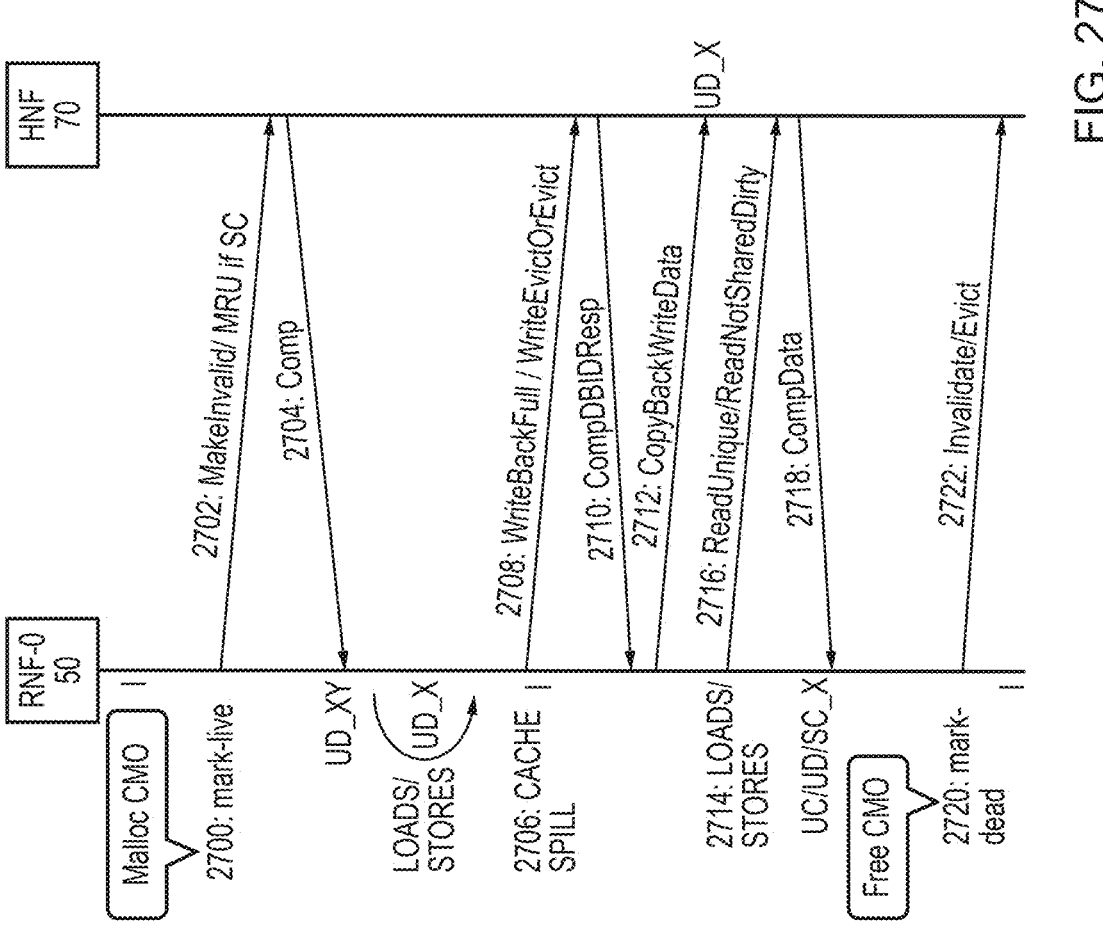

FIG. 27 shows a second example for a "malloc" call, comprising the following steps:

2700-2704: in response to the mark-live instruction being executed, steps 2700-2704 are the same as at steps 2600-2604 of FIG. 26.

2706: in this example a cache capacity conflict in the private cache 18 of the CPU 2 requires the given target cache line obtained at steps 2702, 2704 to be evicted from the private cache 18, before the point at which the line can be freed using the mark-dead instruction.

2708: Hence, the RNF 50 sends a writeback request to the HNF 70 (WriteBackFull if the line is dirty or WriteEvictorEvict if the line is clean) which triggers the HNF 70 to send a completion acknowledgement 2710 once it is ready to accept the written back data, and then subsequently the RNF 50 sends a CopyBack-WriteData request 2712 to writeback the data to the shared cache 74 managed by the HNF 70. The discard control metadata (in this example, the discard-eligibility metadata X being set to indicate that the line is discard-eligible) is sent along with the written back data, to allow the discard-eligible status for the cache line to be retained in the system cache 74. This shows an example of receiving discard control metadata from a metadata-transmitting caching agent in a writeback message which causes writeback of data from a private cache 18 to the interconnect 40.

2714: When the CPU 2 subsequently executes a load/store operation for the given target cache line, the line is read back into the private cache 18 of the CPU (by issuing a ReadUnique or ReadNotSharedDirty request 2716 triggering return of the data 2718 along with its discard control metadata). Hence, the line can be allocated back into the CPU's private cache 18 still specifying the discard eligibility metadata X. This is an example of transmitting the discard control metadata to a metadata-receiving caching agent in a linefill response or read data response 2718.

2720, 2722: the mark-dead instruction executed once the line has been freed by software triggers an invalidation/eviction (same as at steps 2610, 2612 of FIG. 26). Hence, the propagation of the discard control metadata X between the RNF 50 and HNF 70 means that an opportunity is preserved to elide the data writeback that would otherwise have been needed had the discard control metadata been lost upon eviction of the line from the CPU's cache 18 at steps 2706-2712.

Figure 28:
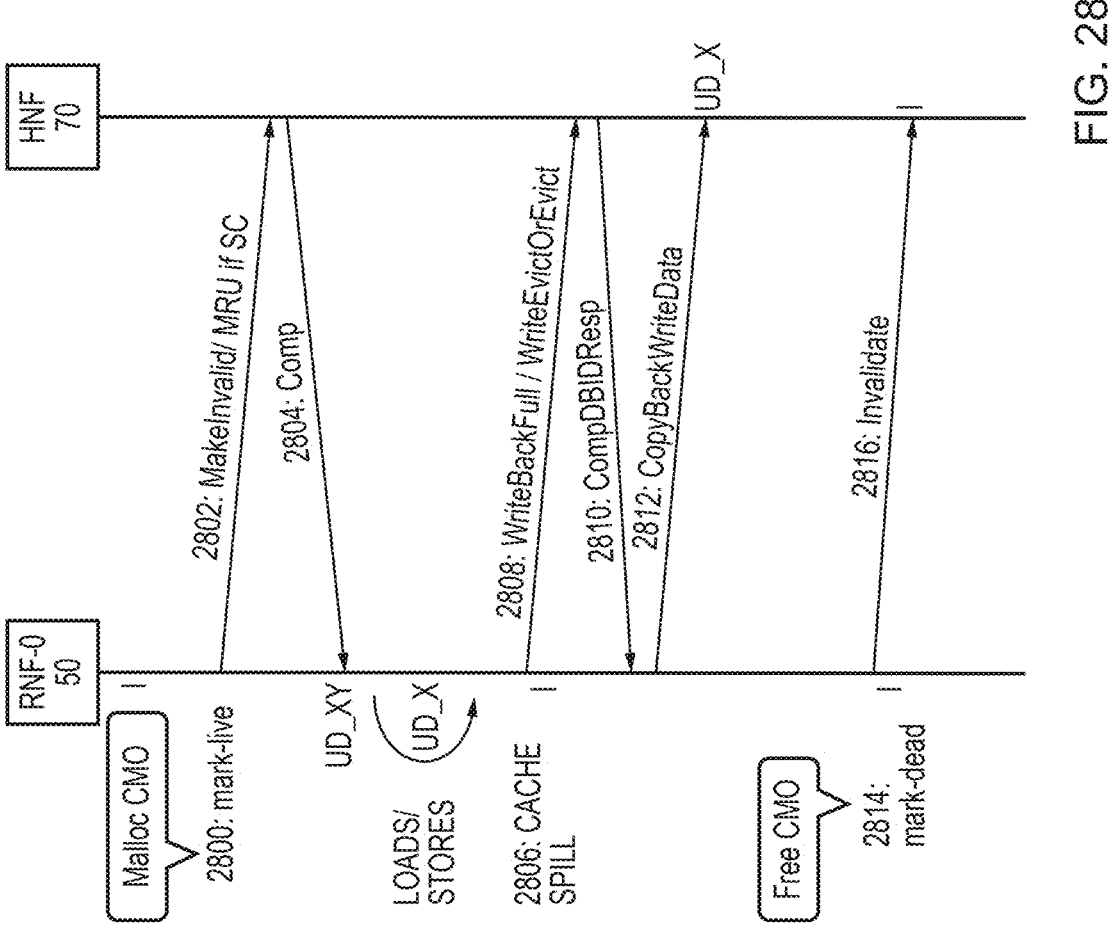

FIG. 28 shows another example which is similar to FIG. 27, but in this case at the point of the mark-dead instruction being executed, the given target cache line is no longer held in the private cache 18 of the CPU 18 that executes the mark-dead instruction. FIG. 28 comprises the following steps:

2800 to 2812: same as 2700 to 2712 in FIG. 27.

2814: the mark-dead instruction specifying address information corresponding to the given target cache line is executed at the CPU 2, but the line is no longer held in the private cache 18 of that CPU 2. Even though there is no need to update any state at the private cache 18 for that line, a mark-dead request 2816 can be sent to the HNF 70 to cause any discard-eligible entry for that cache line held in the system cache 74 or in another caching agent's private cache 18 to be treated as discardable (e.g. invalidated without writeback even if dirty).

Figure 29:
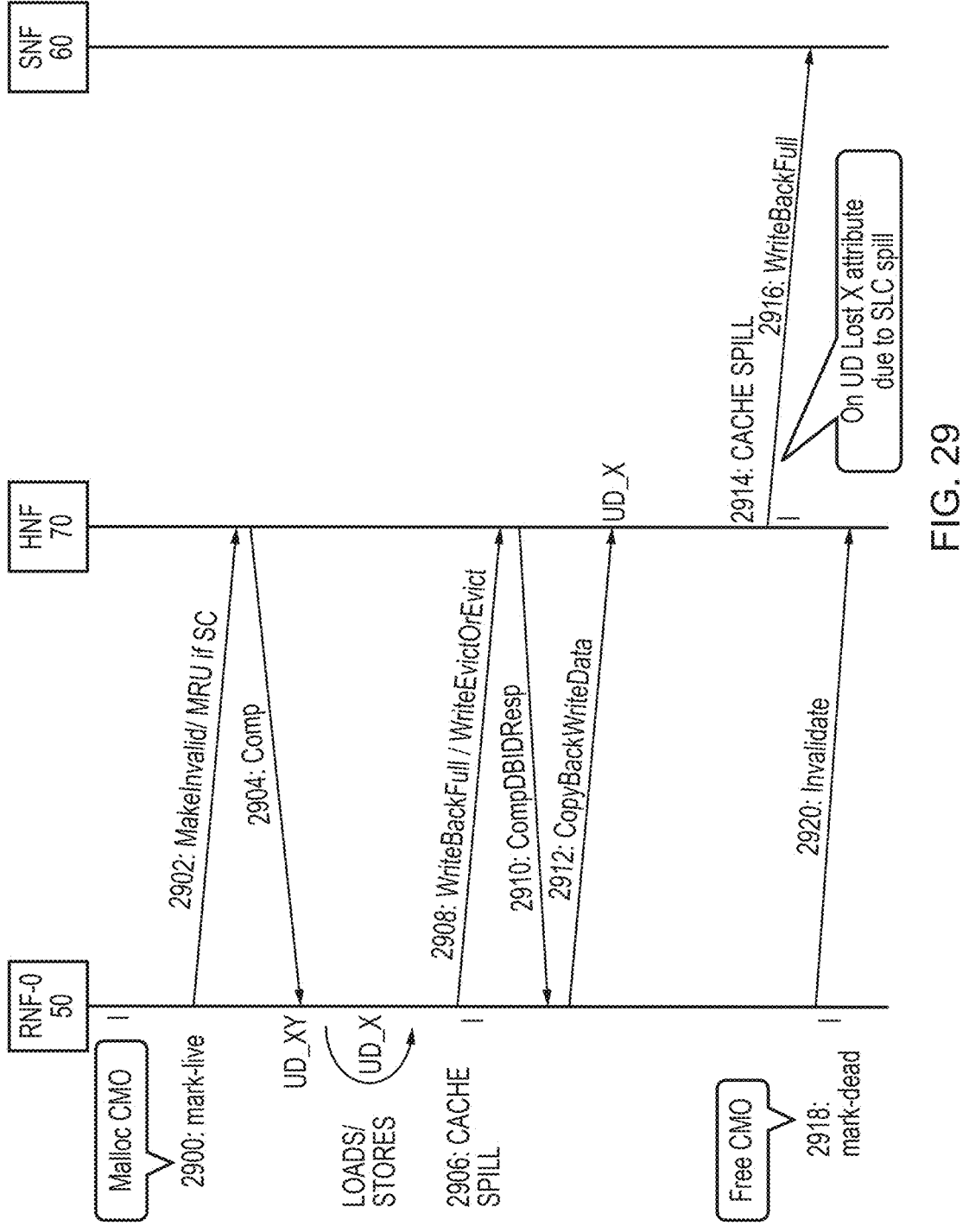

FIG. 29 shows another example in which, as in FIG. 28, the line is no longer held in the private cache 18 of the CPU 18 at the time of the mark-dead instruction, but in this example the line is also no longer in the system cache 74 at the time of mark-dead event. FIG. 29 comprises the following steps:

2902 to 2912: same as 2700 to 2712 in FIGS. 27 and 2800 to 2812 in FIG. 28.

2914: before the mark-dead event occurs, a capacity-based spill occurs at the shared system cache 74, causing a writeback request 2916 to be sent to the SNF 60 to write the line back to memory 42. If the line was subsequently read by one of the caching agents 2, 30, the previously set discard-eligibility metadata X for the line would no longer be available and so the line could not become discardable on a future mark-dead event.

2918/2920: same as 2814 of 2816 of FIG. 28, but this time the line is already invalid in the system cache 74 at the time of the mark-dead event, and so the mark-dead request 2920 has no effect.

Figure 30:
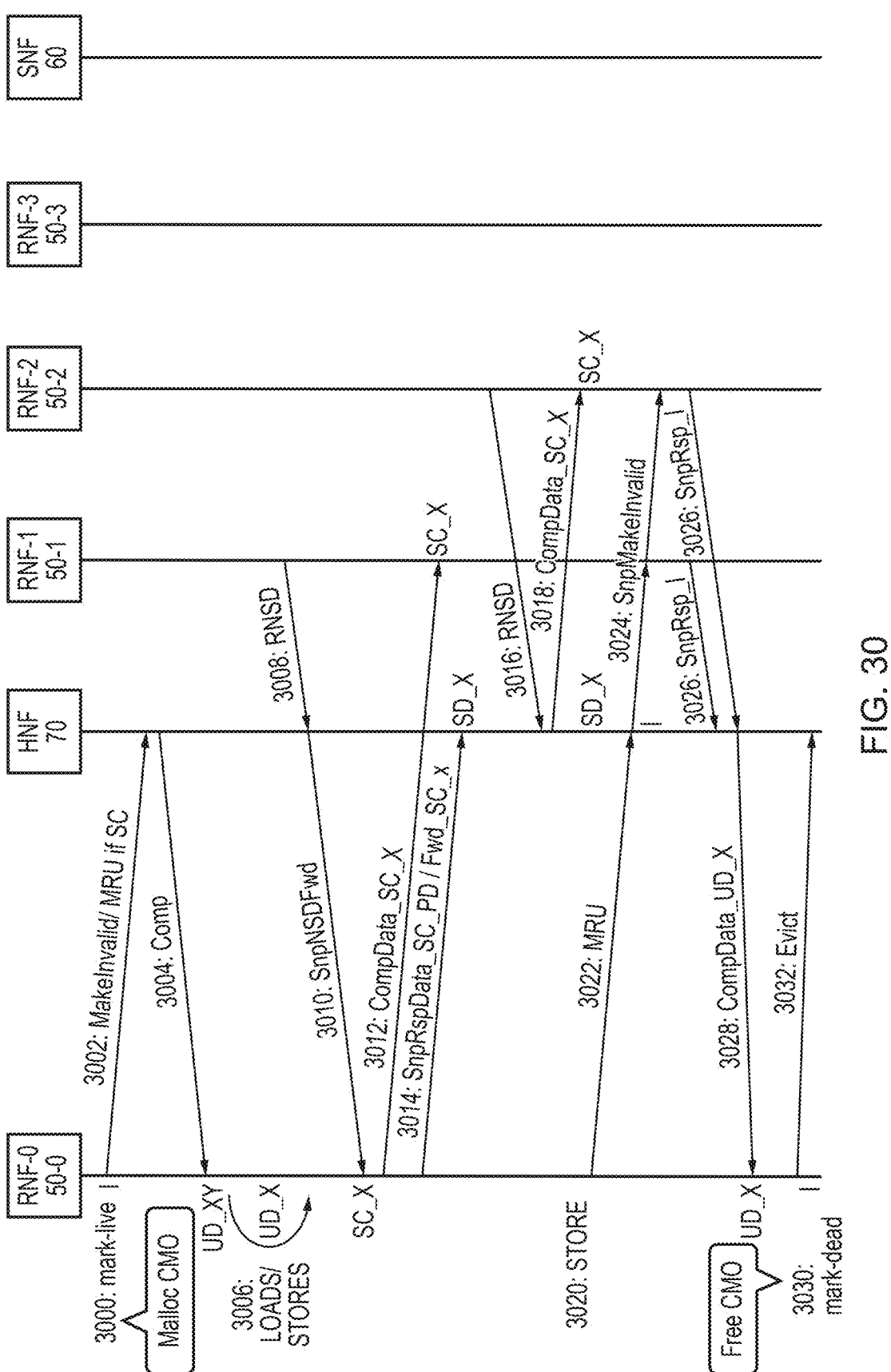
FIGS. 30 and 31 are ladder diagrams illustrating example scenarios for communication flows involving multiple caching agents and the interconnect, in an example supporting use of the discard control metadata.
Figure 31:
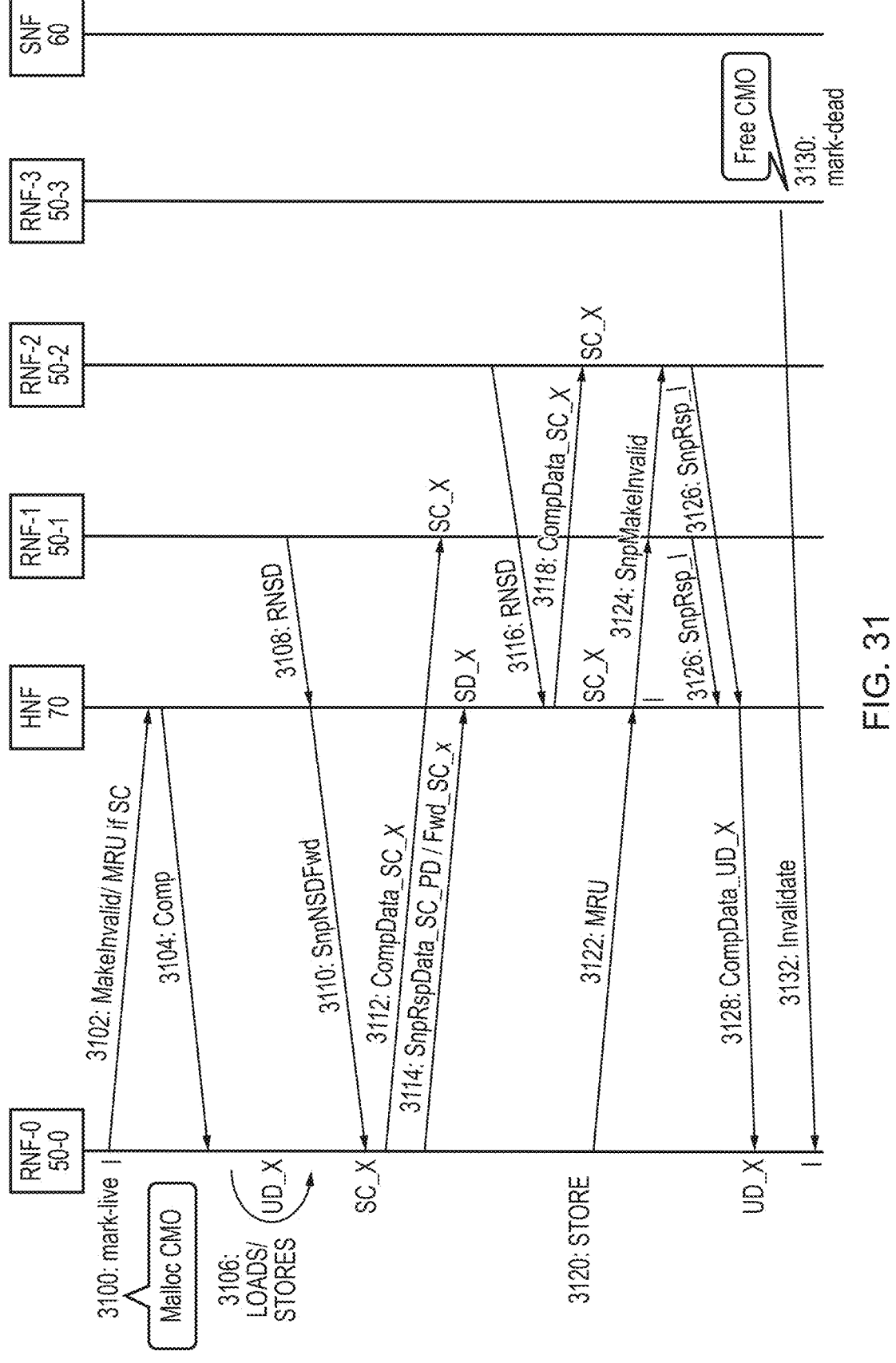

FIGS. 30 and 31 shows multi-threaded examples involving multiple caching agents 2, 30 interacting with a given cache line marked live by a mark-live instruction. Hence, FIGS. 30 and 31 show interaction between the HNF 70, an SNF 60 corresponding to the memory storage storing the data for a given cache line, and multiple RNFs 50-0, 50-1, 50-2, 50-3 corresponding to respective caching agents.

FIG. 30 shows a first example, comprising the following steps:

3000: the mark-live instruction is executed by a CPU 2 corresponding to RNF 50-0 following a malloc call. Steps 3000, 3002, 3004 are the same as 2600, 2602, 2604 of FIG. 26.

3006: load/store operations performed at the CPU 2 corresponding to RNF 50-0 may cause any discardable status (Y) to be dropped, but retain the discard-eligible status (X) for the cache line.

3008: a second caching agent corresponding to RNF 50-1 reads the cache line but does not require Unique status, causing a read shared request 3008 to be sent to HNF 70 which sends a snoop request 3010 to RNF 50-0 corresponding to the CPU 2 holding the line as UD. The CPU 2 and RNF 50-0 returns a snoop response 3012, 3014 causing the cached data for the cache line to be returned both to the caching agent corresponding to RNF 50-1 and to the HNF 70 for caching in the system cache 74. The line can be held as SD in the system cache 74 (indicating the line is dirty in comparison to the data in memory 42) and as SC in the private cache 18 of the caching agent corresponding to RNF 50-1 (indicating the line is clean in comparison to the data in shared system cache 74). Both system cache 74 and private cache 18 of the caching agent corresponding to RNF 50-1 retain the discard control metadata X propagated with the snoop response 3012, 3014. Hence, this is an example of conveying discard control metadata with a snoop data response 3014 and snoop forwarding message 3012, to preserve the discard control metadata when a cache line is passed via the interconnect 40 to the system cache 74 and/or another caching agent 2.

3016: a third caching agent corresponding to RNF 50-2 reads the line to be brought into its cache in a Shared coherency state, causing a read shared request 3016 similar to the request made at 3008, but this time as the dirty line is held in the system cache 74 and the line is clean in all other private caches 18, so a read data response (linefill response) 3018 can return the data obtained from the system cache 74 and there is no need to snoop other caching agents. The discard control metadata 88 (X) indicating that the line is eligible for becoming discardable is propagated back to the third caching agent corresponding to RNF 50-2 along with the linefill data response 3018, and the third caching agent caches the line as SC_X.

3020: the CPU 2 which originally executed the mark-live instruction executes a store operation to write to the cache line, causing a MakeReadUnique request 3022 to be sent to the HNF 70, requesting that the read data is returned in a Unique state for the cache line. The MakeReadUnique request 3022 causes an invalidating snoop request 3024 to be sent to both RNFs 50-1, 50-2 to cause the corresponding cache line to be invalidated in the private caches 18 of the caching agents 2, 30 associated with those RNFs 50-1, 50-2, and this causes snoop responses 2026 to be returned when the invalidation is acknowledged by those caching agents. The read data held in the shared system cache 74 is returned in a read data response (linefill response) 3028, along with the corresponding discard control metadata 88 indicating that the line is eligible for becoming discardable, and then the line is cached in the private cache 18 of the CPU associated with RNF 50-0 in a UD coherency state with the discard-eligibility metadata 90 (X) set to indicate that the line is eligible for becoming discardable.

3030: when the CPU 2 associated with RNF 50-0 executes the mark-dead instruction specifying mark-dead target address information corresponding to this cache line, the cache line becomes discardable (as it was still indicated as eligible for being discardable by the discard-eligibility metadata 90). Either directly in response to the mark-dead instruction, or subsequently on a capacity-based eviction, the line is invalidated without writeback even though dirty, and an eviction message 3032 may be sent to the HNF 70 to signal that any other cached copies can be invalidated or marked as discardable using the discard-indicating metadata 92.

FIG. 31 shows a second multi-threaded example showing interconnect signalling involving multiple caching agents interacting with the same cache line. FIG. 31 comprises the following steps:

3100 to 3128: same as steps 3000 to 3028 of FIG. 30.

3130: in this example, by the time the memory region including the given target cache line is freed, the software executing that freeing operation has migrated to a CPU 2 associated with RNF 50-3, but the given target cache line is currently held in the private cache of the CPU 2 associated with RNF 50-0 (still with the discard-eligibility metadata 90 indicating the line is eligible for becoming discardable, which was preserved despite the line being migrated between different caching agents since being made live at step 3100). The execution of the mark-dead instruction at the CPU 2 corresponding to RNF 50-3 causes a mark-dead request to be sent via RNF 50-3 to HNF 70 and on to any other caching agents 2, 30 which could hold a copy of the cache line in their private caches 18. The mark-dead request 3132 indicates that any copies of the cache line having the discard-eligibility metadata 90 set to indicate eligibility for becoming discardable can become discardable, either by immediate invalidation or by marking the line as discardable using the discard-indicating metadata. Hence, the mark-dead request 3132 (initiated based on an action at another caching agent) may be another example of a mark-dead event encountered at the private cache 18 of a particular caching agent (the caching agent corresponding to RNF 50-0). If there are any copies of the line in the shared system cache 74, such entries may also become discardable in response to the mark-dead request 3132, if the entry is marked eligible for discarding using the discard-eligibility metadata 90.

FIGS. 32 and 33 show a first example of coherency state transitions that may occur in response to various stimulus events, at both a private cache 18 (labelled CPU $ in FIGS. 32 and 33) and a shared system cache 74, as well as the corresponding interconnect requests that may be used to propagate discard control metadata 88 around the memory system. Again, the coherency states are denoted as Invalid (I), SharedClean (SC), SharedDirty (SD), UniqueClean (UC) and UniqueDirty (US) and the setting of discard control metadata 88 is represented by "x", indicating that the discard-eligibility metadata 90 is set to indicate the line is discard-eligible (discard-ineligibility being indicated by the absence of an "x" in the indicated state), and by "y", indicating the discard-indicating metadata 92 is set to indicate that the line is discardable (absence of "y" indicating a line for which the discard-indicating metadata 92 is cleared to indicate the line is not currently discardable). Hence, for example, "UD-xy" indicates a UniqueDirty coherency state for which the line is both discard-eligible and discardable, "UC-x" indicates a UniqueClean line for which the line is discard-eligible but not currently discardable, and "UD" indicates a UniqueDirty line which is neither discard-eligible nor discardable.

For example, the stimulus events listed in FIGS. 32 and 33 include:

Mark-live instruction ("dc mark live va" in FIG. 32): execution of mark-live instruction relating to the cache line. Depending on the current coherency state of the cache line in that CPU's private cache 18, the following coherency state transitions may occur:

current state in CPU$=Invalid: one of two options (selected either statically as one fixed option for a particular implementation, or dynamically selected between the two options based on the region size as discussed with respect to FIGS. 17 and 18):

I→UD-xy in CPU$: materialise line into the private CPU cache 18 with the cached data 84 set to the predetermined value (e.g. zero), to cause the cache line to transition to UD-xy in the private CPU cache 18 and to Invalid in the shared cache 74 (by issuing a MakeUnique request similar to step 2602 of FIG.

26). The discard control metadata 90, 92 is updated to set the line as both discard-eligible and discardable.

I→I in CPU$: materialise line into the shared cache 74 with the cached data 84 set to the predetermined value, to cause the cache line to remain as Invalid in the private CPU cache 18 and become UD-xy (dirty but both discard-eligible and discardable) in the system cache 74.

For both of these options, this corresponds to steps 178, 180 of FIG. 12.

current state in CPU$=SC, UC, UC-x: transition to UC-x, or remain at UC-x, in the private CPU cache 18, to retain the previous clean cached data or obtain more up to date dirty data for the cache line by issuing a "MakeReadUnique" (MRU) request, and set the discard-eligibility metadata 90 (if not set already) for the clean cache line to indicate the line is discard-eligible (UC-x). The line can be invalidated in in the system cache 74. This corresponds to step 182 of FIG. 12.

current state in CPU$=UD (not marked as discard-eligible or discardable): any of the following options are possible, either with the architecture mandating a specific one of these options (architectural design choice which is implemented), or with the architecture giving flexibility for system designers to select which option is taken, either statically with a fixed choice for a given hardware implementation, or dynamically based on runtime information such as performance monitoring metrics or configurable control settings set by a system operator or by software:

UD→UD in CPU$: treat mark-live instruction as NOP instruction in respect of this cache line, and retain dirty cache line in previous state in CPU$ 18 (with the line indicated as discard-ineligible and non-discardable-see step 184 of FIG. 12);

UD→UD-x in CPU$: write back dirty data in response to the mark-live instruction, but retain the dirty data in the CPU$ with the discard-eligible status set for the metadata 90 to indicate that the line can be discarded in future-see step 186 of FIG. 12.

UD→UD-xy in CPU$: write back dirty data in response to the mark-live instruction, and clear the cached data 84 to the predetermined value, and set the discard control metadata 88 to indicate that the line is both discard-eligible and discardable (see step 188 of FIG. 12).

current state in CPU$=UD-x or UD-xy: retain line unchanged (treat mark-live instruction as NOP in respect of this cache line).

Mark-dead instruction ("dc mark dead va"): execution of mark-dead instruction relating to the cache line. Depending on the current coherency state of the cache line in that CPU's private cache 18, the following coherency state transitions may occur:

not shown in FIG. 32—any state not having discard-eligibility status ("x") set-no change to the cache status. Treat mark-dead instruction as NOP in relation to this cache line, as the line is not eligible for being discardable.

current state in CPU$ is UC-x or SC-x: eligible for discarding, so clear discard-eligible status (drop "x"), and transition to either one of the following states (again, depending on architectural design choice, or hardware implementation choice for the system designer if both options are supported by the architecture):

UC-y: discardable, retain line as clean.

UD-y: discardable, clear the cached data 84 to the predetermined value (e.g. to allow compression into smaller storage space), and transition to dirty state to indicate the line is different from underlying data in memory 42 or in the system cache 74.

Either way, the discard-indicating metadata 92 is set to indicate the line is discardable. If the line was SC, the line can be made unique by issuing a MakeReadUnique request to the interconnect (if transitioning to UC-y) or MakeUnique request (if materialising with the line having the predetermined value and transitioning to UD-y).

current state in CPU$ is UD-x or UD-xy: transition to, or remain as, UD-y to indicate line is discardable on future eviction, but drop the discard-eligibility status x.

CopyBack: writeback of data from CPU cache 18 to shared cache 74 on a capacity based eviction. For conciseness, FIG. 32 does not show any of the state transitions for initial CPU$ states that do not have any discard control metadata set (states not labelled with x, y or xy), as these can follow the same approach as taken for any existing coherency protocol that does not support the use of discard control metadata 88.

For each state involving use of discard control metadata 88 set to indicate discard-eligibility and/or discardable status, the line transitions to Invalid at the CPU$ (as the line is being evicted for capacity reasons), and depending on the initial CPU$ state, the following request types can be sent to the interconnect 40 to cause allocation of the line in the system cache 74 in one of the following states:

initial CPU$ state UC-x (discard-eligible but not discardable): WriteEvictorEvict or WriteEvictFull or Evict, which propagates the discard-eligibility metadata x, to cause the line to be held as UC-x in the system cache 74;

initial CPU$ state UD-x (discard-eligible but not discardable): WriteBackFull which returns the dirty data previously held in the CPU$ and propagates the discard-eligibility metadata x, to cause the line to be held as UD-x in the system cache 74;

initial CPU$ state UD-y (discardable but not discard eligible): if the line is to be allocated to the system cache 74, WriteBackFull propagating the discard-indicating metadata y, to cause the line to be held as UD-y in the system cache 74 (alternatively, as the line is discardable, the line could simply be dropped without writing back to the system cache 74, and transitioned to Invalid in both CPU$ and system cache 74).

initial CPU$ state UD-xy (discardable and discard eligible—e.g. this may be the case if no read/write occurred to the line between the line being marked as live and the line being evicted for capacity reasons): if the line is to be allocated to the system cache 74, WriteBackFull propagating the discard control metadata in state "xy", to cause the line to be held as UD-xy in the system cache 74 (alternatively, as the line is marked discardable (y) the line could simply be dropped without writing back to the system cache 74, and transitioned to Invalid in both CPU$ and system cache 74).

initial CPU$ state SC-x (discard-eligible but not discardable): WriteEvictorEvict or Evict to propagate the discard-eligibility metadata x without needing the data to be written back, to cause the line to be held as SC-x in the system cache 74.

Rd-sharing SnpRd (see FIG. 33): a snoop request received at the CPU0$ corresponding to RNF0 triggered by a read transaction initiated from another caching agent (CPU1) corresponding to RNF1. Again, state transitions are not shown for any initial CPU0$ state at RNF0 that does not have the discard control metadata set to x, y, or xy, and such transitions can be performed according to those already defined for any known coherency protocol not using the metadata 88.

Depending on the initial CPU0$ state, the following responses can be taken:

UC-x→SC-x at CPU0$ and allocate as SC (or SC-x) in CPU1$ and as SC (or SC-x) in shared system cache 74.

UD-x→SC-x at CPU0$ and allocate as SC-x in CPU1$ and SD-x in shared system cache 74. The previous dirty data held by CPU0$ is returned in a snoop data response to the interconnect and allocated to the shared system cache as well as forwarding to the CPU1$ to be held in the SC state. The discard-eligibility status (x) is preserved in both system cache 74 and private CPU1$ 18.

UD-y→SC at CPU0$ and allocate as SC in CPU1$ and as SD in shared system cache 74. This corresponds to step 114 of FIG. 8. The line becomes shared at CPU0$ because it is now also held at CPU1$. The line becomes clean at CPU0$ because it is now consistent with underlying data in shared system cache 74, and becomes dirty at the system cache 74 as the data is inconsistent with main memory 42. By clearing the discardable status (removing "y") when the line has been observed by another observer, this prevents that observer gaining different views of the same cache line before and after a subsequent mark-dead event, which could be confusing if performing debugging for example.

UD-xy→SC-x at CPU0$ and allocate as SC-x in both CPU1$ and system cache 74. The discardable status y is cleared for the same reason as the UD-y→SC transition, but the discard-eligible status x can be retained and propagated to the system cache 74 and CPU1$ 18.

If the initial state at CPU0$ is SC-x, the state of the cache line can remain unchanged at CPU0$ and the discard-eligibility metadata x can be propagated to both CPU1$ and shared cache for caching in those caches with the line also in SC-x state.

Hence, a read from another caching agent causes any discardable status to be cleared, but any discard-eligible status can be retained.

Wr-sharing SnpWr (see FIG. 33): a snoop request received at the CPU0$ corresponding to RNF0 triggered by a write transaction initiated from another caching agent (CPU1) corresponding to RNF1. Again, state transitions are not shown for any initial CPU0$ state at RNF0 that does not have the discard control metadata set to x, y, or xy, and such transitions can be performed according to those already defined for any known coherency protocol not using the metadata 88.

Regardless of the initial state at CPU0$ (being one of UC, UC-x, UD-x, UD-xy, SC-x), the line is invalidated at CPU0$ and is invalid in the system cache 74, and the mappings between initial CPU0$ state and final CPU1$ state are as follows:

initial CPU0$=UC→final CPU1$=UC. The line can remain clean (although subsequently it is likely CPU1$ may write to the line to dirty the line).

initial CPU0$=UC-x→final CPU1$=UC-x. The line remains clean as for the UC example, but the current discard-eligibility metadata 90 is propagated to CPU1 to retain the hint that the line is eligible for becoming discardable in future.

initial CPU0$=UD-x→final CPU1$=UD-x. The dirty data is returned from CPU0$ in a snoop data response and then forwarded in a snoop data forward message to CPU1$ along with the corresponding discard-eligibility metadata 90 set to the state x indicating eligibility for future discards.

initial CPU0$=UD-xy→final CPU1$=UC-x. UD-xy indicates the line has not been modified since being materialised into the CPU0$ with the predetermined value. The dirty data for the line is returned to the interconnect and forwarded to CPU0$ together with the discard-eligibility indication x but the discardable status y is dropped because once the CPU1$ writes to the line that data is meaningful and should be retained even if there is a capacity eviction (although a future mark-dead event may still cause the line to once more become discardable with the "y" metadata set).

initial CPU0$=SC-x→final CPU1$=UC-x. The CPU1 obtains the right to cache the data as Unique, but retains the discard-eligibility status propagated using the metadata "x" from CPU0$, to enable opportunities for future writeback elision on a subsequent mark-dead event.

PE-side read/write access: read/write performed by CPU0$ in response to a load/store instruction executed by CPU0. Any discardable status (indicated by metadata y) is cleared, so that the line is no longer marked as discardable. If the line is marked as discard-eligible, that discard-eligibility status is retained. While FIG. 33 for conciseness only shows the UD-xy and UD-y transitions to UD-x and UD respectively, other state transitions are also possible-those state transitions being performed according to any known coherency protocol which defines responses to be taken in response to local PE-side read/writes, other than that if the discard-eligibility metadata x is currently set to indicate discard-eligibility status then that status can be retained.

FIG. 34 illustrates an alternative response to the mark-dead instruction which could be used as an alternative to the response options shown in FIG. 32. In this example, in response to a mark-dead instruction any data for the target cache lines held in private caches 18 of the CPU executing the mark-dead instruction could be invalidated and written back to the shared cache 74 to be held in a coherency state/discard control metadata state which corresponds to the initial coherency/discard control metadata state in which the CPU's private caches 18 held the data prior to the mark-dead instruction being executed.

It will be appreciated that the examples of FIGS. 32 to 34 show one possible implementation of coherency state transitions, and other examples could vary.

Concepts described herein may be embodied in a system comprising at least one packaged chip. The apparatus and/or interconnect circuitry described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 35:
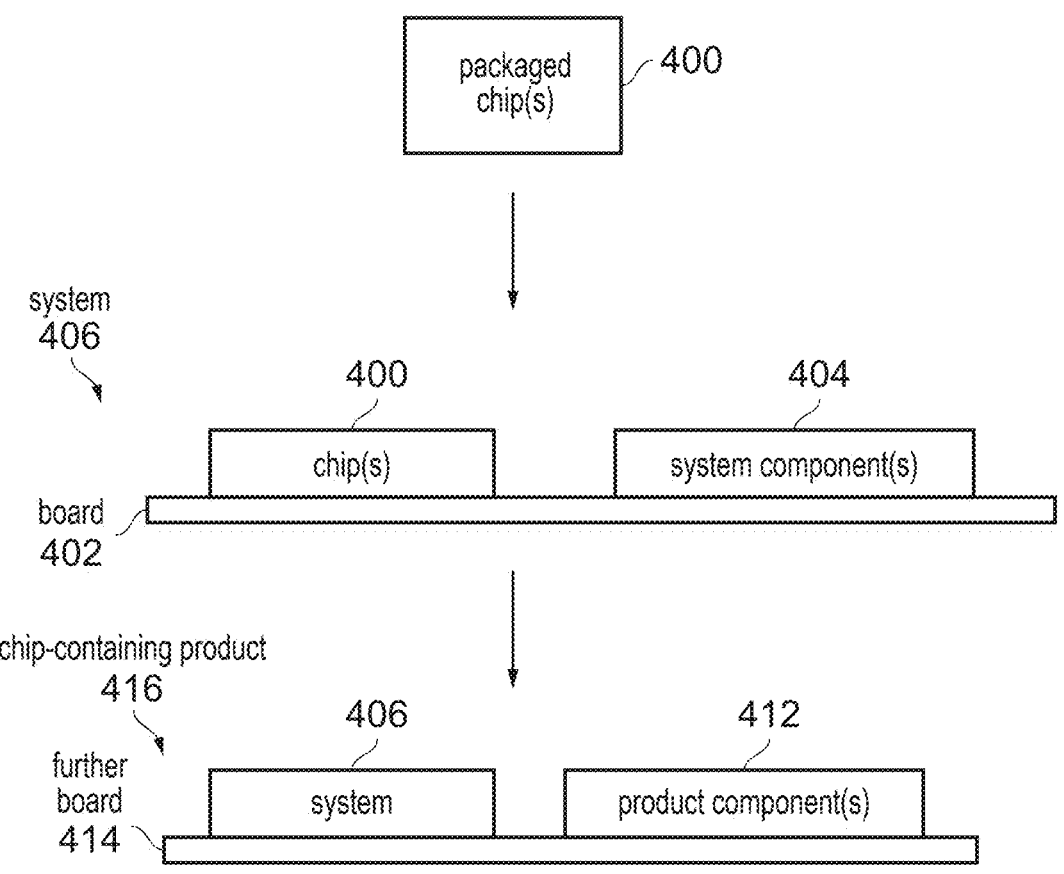
FIG. 35 illustrates a system and a chip-containing product.

As shown in FIG. 35, one or more packaged chips 400, with the apparatus and/or interconnect circuitry described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus and/or interconnect circuitry described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/ or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Figure 36:
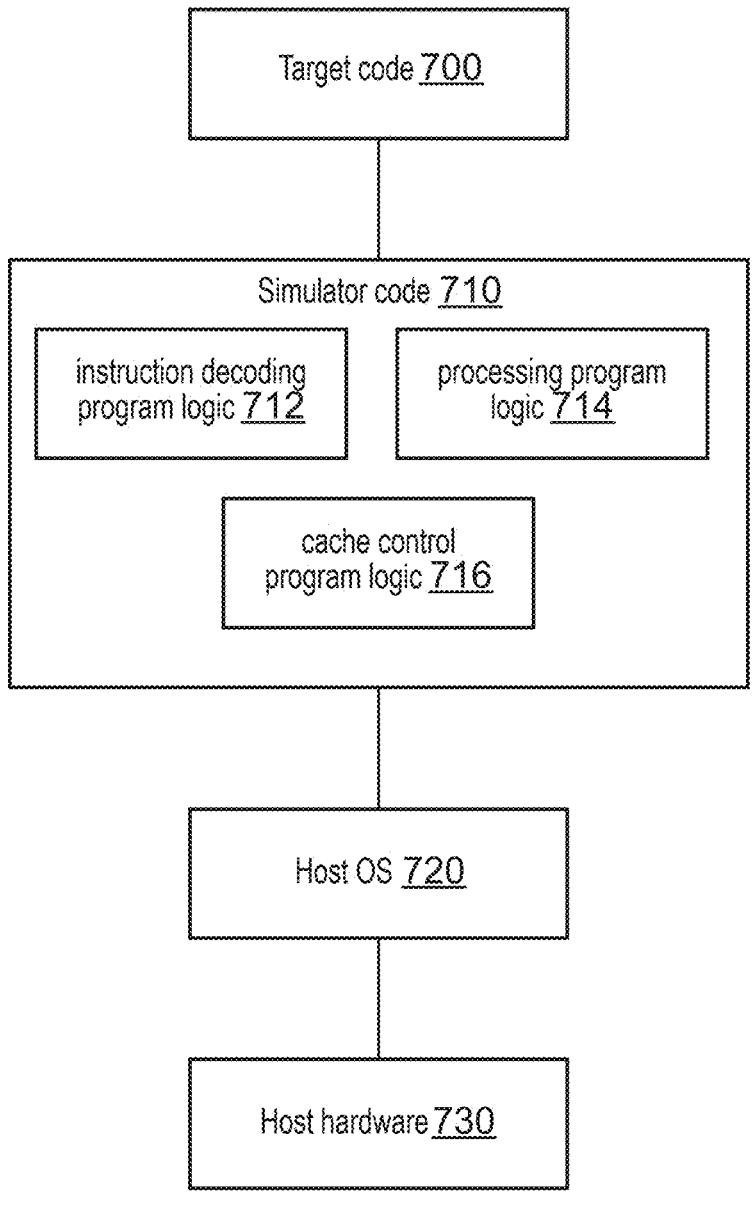
FIG. 36 illustrates a simulation example.

FIG. 36 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 (which may include applications, operating systems and a hypervisor) which is the same as the interface of the hardware architecture being modelled by the simulator program 710. Thus, the program instructions of the target code 700, including the mark-dead instruction, mark-live instruction and other discard control instructions (e.g. read-metadata or clear-metadata instructions), may be executed from within the instruction execution environment using the simulator program 710, so that a host computer 730 which does not actually have the hardware features of the apparatus 2 discussed above can emulate these features.

For example, the simulator program 710 may comprise instruction decoding program logic 712 configured to decode instructions of the target code; and processing program logic 714 configured to control the host data processing apparatus to perform data processing in response to the instructions decoded by the instruction decoding program logic 712. The instruction decoding program logic 712 could for example include instructions for parsing the encoding of an instruction of the target code, and instructions defining "if-then-else" functionality or conditional branch instruction functionality which selects which subsequent instructions (e.g. function routines corresponding to each instruction type) of the simulator code 710 are executed based on analysis of the encoding of the instruction of the target code 700. The processing program logic 714 may comprise the function routines which are conditionally selected by the instruction decoding program logic 712 based on the instruction encoding of the instruction.

The simulator program 710 may also have cache control program logic 716 which may simulate caching of data in a simulated cache, e.g. maintaining a data structure corresponding to the cache 18, 74 mirroring the information which a hardware cache would store. The cache control program logic 716 may update the discard control metadata 88 for a given cache line of a simulated address space in response to the mark-live instruction or mark-dead instruction of the target code or in response to other simulated events such as simulated snoop requests, in a corresponding way to that discussed above.

Such a simulator program 710 can be helpful for software developers who are developing software for a new version of the ISA, to enable the software to be developed and tested before any real hardware supporting that ISA version is ready yet. This can allow software development for the new ISA version to be developed in parallel with ongoing development of hardware supporting the new ISA version.

Some examples are set out in the following clauses:

A1. An apparatus comprising:
  instruction decoding circuitry configured to decode instructions;
  processing circuitry configured to perform data processing in response to instructions decoded by the instruction decoding circuitry; and
  cache control circuitry configured to:
    set, in response to the instruction decoding circuitry decoding a mark-dead instruction specifying mark-dead target address information, one or more target cache lines selected based on the mark-dead target address information as a discardable cache line,
    wherein the discardable cache line is allowed to be discarded without data writeback even if the discardable cache line is dirty.

A2. The apparatus of clause A1, wherein the cache control circuitry is configured to, in response to the instruction decoding circuitry decoding the mark-dead instruction, set discard-indicating metadata associated with the one or more target cache lines to indicate that the one or more target cache lines is a discardable cache line.

A3. The apparatus of clause A2, wherein the cache control circuitry is configured to, in response to receiving a read, write or snoop request targeting one of the one or more target cache lines that are discardable cache lines, to unset the discard-indicating metadata associated with the one of the one or more target cache lines.

A4. The apparatus of any of clauses A2 to A3, wherein in response to the instruction decoder circuitry decoding a read-metadata instruction specifying read-target address information, the cache control circuitry is configured to return, to a reader agent, an indication of a current value of the discard-indicating metadata for a cache line selected based on the read-target address information.

A5. The apparatus of any of clauses A2 to A4, wherein in response to the instruction decoder circuitry decoding a clear-metadata instruction specifying clear-target address information, the cache control circuitry is configured to set the discard-indicating metadata to an initial state for at least one cache line selected based on the clear-target address information.

A6. The apparatus of any of clauses A2 to A5, comprising eviction circuitry configured to select a victim cache line for eviction in dependence on the discard-indicating metadata.

A7. The apparatus of clause A6, wherein the eviction circuitry is configured to prioritise selection of a discardable cache line as the victim cache line.

A8. The apparatus of clause A6 or clause A7, wherein the eviction circuitry is configured to discard the discard-indicating metadata in response to evicting the victim cache line.

A9. The apparatus of any of clauses A1 to A8, wherein the cache control circuitry is configured to set the one or more target cache lines as a discardable cache line in dependence on the one or more target cache lines being eligible for becoming a discardable cache line.

A10. The apparatus of clause A9, wherein the cache control circuitry is configured to determine whether the one or more target cache lines are eligible for becoming a discardable cache line based on discard-eligibility metadata associated with the one or more target cache lines.

A11. The apparatus of any of clauses A1 to A10, wherein, when setting a given target cache line to be a discardable cache line, the cache control circuitry is configured to set cached data for the given target cache line to a predetermined value.

A12. The apparatus of clause A11, wherein the predetermined value is zero.

A13. The apparatus of clause A1, wherein the cache control circuitry is configured to, in response to the instruction decoding circuitry decoding the mark-dead instruction, evict the discardable cache line from a cache without performing a data writeback.

A14. The apparatus of any of clauses A1 to A13, wherein the mark-dead target address information specifies an address range, and the cache control circuitry is configured to identify, as the one or more target cache lines, cache lines which are entirely within the address range specified by the mark-dead target address information.

A15. The apparatus of clause A14, wherein the mark-dead instruction specifies a first end point of the address range; and the cache control circuitry is configured to determine the second end point of the address range based on size information stored in a control register.

A16. The apparatus of any of clauses A1 to A15, comprising:
    writeback circuitry configured to, in response to an eviction of a victim cache line from a cache, perform a data writeback of the victim cache line to a further cache or to memory,
    wherein in a case where the victim cache line is a discardable cache line, the writeback circuitry is configured to suppress the data writeback of the victim cache line.

A17. The apparatus of any of clauses A1 to A16, wherein the processing circuitry is configured to, in response to the instruction decoding circuitry decoding the mark-dead instruction, generate a mark-dead request to an interconnect, the mark-dead request specifying the mark-dead target address information to identify one or more target cache lines allowed to be treated as a discardable cache line in a system cache or a private cache of another caching agent.

A18. The apparatus of any of clauses A1 to A17, wherein, for at least one setting of the apparatus, the mark-dead instruction is allowed to be executed at a least privileged execution state.

A19. The apparatus of any of clauses A1 to A18, wherein, the instruction decoding circuitry or the processing circuitry is configured to determine, based on programmable permissions control information, whether to allow setting the one or more caches lines as discardable cache lines in response to the mark-dead instruction executed in a less privileged execution state.

A20. The apparatus of any of clauses A1 to A19, wherein the instruction decoding circuitry is configured to decode the instructions according to a CPU instruction set architecture.

A21. A system comprising:
    the apparatus of any of clauses A1 to A20, implemented in at least one packaged chip;
    at least one system component; and
    a board,
    wherein the at least one packaged chip and the at least one system component are assembled on the board.

A22. A chip-containing product comprising the system of clause A21, wherein the system is assembled on a further board with at least one other product component.

A23. A method comprising:
    decoding instructions;
    performing data processing in response to instructions decoded by instruction decoding circuitry; and
    setting, in response to the instruction decoding circuitry decoding a mark-dead instruction specifying mark-dead target address information, one or more target cache lines selected based on the mark-dead target address information as a discardable cache line,
    wherein the discardable cache line is allowed to be discarded without data writeback even if the discardable cache line is dirty.

A24. Computer-readable code for fabrication of an apparatus according to any of clauses A1 to A20.

A25. A storage medium storing the computer-readable code of clause A24.

A25. A non-transitory computer-readable medium storing a computer program comprising instructions which, when executed by a host data processing apparatus, control the host data processing apparatus to provide an instruction execution environment for execution of target program code, the computer program comprising:
    instruction decoding program logic configured to decode instructions of the target program code;

processing program logic configured to control the host data processing apparatus to perform data processing in response to the instructions decoded by the instruction decoding program logic; and cache control program logic configured to set, in response to the instruction decoding program logic decoding a mark-dead instruction specifying mark-dead target address information, one or more target cache lines selected based on the mark-dead target address information as a discardable cache line, wherein the discardable cache line is allowed to be discarded without data writeback even if the discardable cache line is dirty.

B1. An apparatus comprising:

instruction decoding circuitry configured to decode instructions;

processing circuitry configured to perform data processing in response to the instructions decoded by the instruction decoding circuitry; and cache control circuitry configured to:

set, in response to the instruction decoding circuitry decoding a mark-live instruction specifying mark-live target address information, discard-eligibility metadata associated with one or more target cache lines selected based on the mark-live target address information, to identify the one or more target cache lines as being eligible for being treated as a discardable cache line which is allowed to be discarded without data writeback even if the discardable cache line is dirty; and in response to a mark-dead event associated with a given cache line, determine depending on the discard-eligibility metadata for the given cache line whether the given cache line is eligible for becoming a discardable cache line.

B2. The apparatus according to clause B1, in which, in response to the mark-live instruction, for a given target cache line identified based on the mark-live target address information which is not already cached in a designated level of cache designated to be allocated with the given target cache line, the cache control circuitry is configured to allocate the given target cache line to the designated level of cache specifying a predetermined value as cached data for the given target cache line, and set the discard-eligibility metadata for the given target cache line to indicate that the given target cache line is eligible for being treated as a discardable cache line.

B3. The apparatus according to clause B2, in which the cache control circuitry is configured to generate the predetermined value as the cached data, without issuing a linefill request to obtain the cached data specifying the predetermined value from a further cache or memory.

B4. The apparatus according to any of clauses B2 and B3, in which the given target cache line specifying the predetermined value as the cached data is allowed to be incoherent with respect to memory.

B5. The apparatus according to any of clauses B2 to B4, in which the cache control circuitry is configured to allocate the given target cache line specifying the predetermined value to the given cache in a dirty-but-discardable state indicating that the given target cache line is dirty and is currently treated as a discardable cache line.

B6. The apparatus according to any of clauses B2 to B5, in which in response to the mark-live instruction, when the given target cache line is already cached in the designated level of cache in a clean state, the cache control circuitry is configured to retain the given target cache line in the designated level of cache in the clean state with the discard-eligibility metadata for the given target cache line set to indicate that the given target cache line is eligible for being treated as a discardable cache line.

B7. The apparatus according to any of clauses B2 to B6, in which in response to the mark-live instruction, when the given target cache line is already cached in the designated level of cache in a dirty state, the cache control circuitry is configured to leave the given target cache line unchanged in the designated level of cache, without updating the discard-eligibility metadata for the given target cache line.

B8. The apparatus according to any of clauses B2 to B6, in which in response to the mark-live instruction, when the given target cache line is already cached in the designated level of cache in a dirty state, the cache control circuitry is configured to clean the given target cache line to trigger writeback of dirty cached data for the given target cache line, retain previously cached data for the given target cache line in the designated level of cache, and set the discard-eligibility metadata for the given target cache line to indicate that the given target cache line is eligible for being treated as a discardable cache line.

B9. The apparatus according to any of clauses B2 to B6, in which in response to the mark-live instruction, when the given target cache line is already cached in the designated level of cache in a dirty state, the cache control circuitry is configured to set the cached data held by the designated level of cache for the given target cache line to the predetermined value, and set the discard-eligibility metadata for the given target cache line to indicate that the given target cache line is eligible for being treated as a discardable cache line.

B10. The apparatus according to any of clauses B2 to B5, in which in response to the mark-live instruction, the cache control circuitry is configured to set cached data held by the designated level of cache for the given target cache line to the predetermined value regardless of a previous coherency state in which the given target cache line is held in the designated level of cache.

B11. The apparatus according to any of clauses B1 to B10, in which the cache control circuitry is configured to identify, as the one or more target cache lines, one or more cache lines which are entirely within an address range identified based on the mark-live target address information.

B12. The apparatus according to clause B11, in which the address range is defined by a range start address and a range end parameter, the mark-live instruction identifying at least the range start address as an operand of the make-live instruction.

B13. The apparatus according to clause B12, in which the range end parameter is specified as a further operand of the make-live instruction.

B14. The apparatus according to clause B12, in which the range end parameter is specified in a control register.

B15. The apparatus according to any of clauses B1 to B14, in which, in response to the mark-dead event associated with mark-dead target address information, the cache control circuitry is configured to treat as a discardable cache line one or more cache lines corresponding to the mark-dead target address information which are indicated by the discard-eligibility metadata as being eligible for being treated as the discardable cache line.

B16. The apparatus according to clause B15, in which, in response to the mark-dead event, for a given cache line corresponding to the mark-dead target address information which is indicated by the discard-eligibility metadata as being ineligible for being treated as the discardable cache line, the cache control circuitry is configured to prevent the given cache line being treated as a discardable cache line.

B17. The apparatus according to any of clauses B15 and B16, in which the cache control circuitry is configured to treat a given cache line as the discardable cache line by setting discard-indicating metadata for the given cache line indicating that the given cache line is discardable on eviction without data writeback even if the given cache line is dirty.

B18. The apparatus according to clause B17, in which when setting a given cache line as the discardable cache line in response to the mark-dead event, the cache control circuitry is configured to update cached data for the discardable cache line to a predetermined value.

B19. The apparatus according to any of clauses B17 and B18, in which the cache control circuitry is configured to clear the discard-indicating metadata for the given cache line in response to detecting a read, write or snoop request to the given cache line.

B20. The apparatus according to any of clauses B15 to B19, in which the cache control circuitry is configured to identify, as the one or more cache lines, cache lines which are entirely within an address range identified based on the mark-dead target address information.

B21. The apparatus according to any of clauses B1 to B20, in which the mark-dead event comprises execution of a mark-dead instruction specifying the mark-dead target address information.

B22. The apparatus according to any of clauses B1 to B21, in which the mark-dead event comprises receipt, from an interconnect, of a mark-dead event request specifying the mark-dead target address information.

B23. The apparatus according to any of clauses B1 to B22, in which upon writeback from a given level of cache of a cache line specifying the discard-eligibility metadata, the cache control circuitry is configured to discard the discard-eligibility metadata for that cache line.

B24. The apparatus according to any of clauses B1 to B22, in which upon writeback from a given level of cache of a cache line specifying the discard-eligibility metadata, the cache control circuitry is configured to propagate the discard-eligibility metadata for that cache line for retention in a further level of cache or communication to home node circuitry or to another caching agent.

B25. The apparatus according to any of clauses B1 to B24, in response to a clear-metadata instruction specifying clear-target address information, the cache control circuitry is configured to set the discard-eligibility metadata to an initial state for at least one cache line selected based on the clear-target address information.

B26. The apparatus according to any of clauses B1 to B24, in response to a read-metadata instruction specifying read-target address information, the cache control circuitry is configured to return, to a reader agent, an indication of a current value of the discard-eligibility metadata for a cache line selected based on the read-target address information.

B27. The apparatus according to any of clauses B1 to B26, in which, for at least one setting of the apparatus, the discard-eligibility metadata is allowed to be updated in response to a mark-live instruction executed in a least privileged execution state.

B28. The apparatus according to any of clauses B1 to B27, in which the instruction decoding circuitry or the processing circuitry is configured to determine, based on programmable permissions control information, whether to allow the discard-eligibility metadata to be updated in response to the mark-live instruction.

B29. The apparatus according to any of clauses B1 to B28, in which the instruction decoding circuitry is configured to decode the instructions according to a CPU instruction set architecture.

B30. A system comprising:
the apparatus of any of clauses B1 to B29, implemented in at least one packaged chip;
at least one system component; and
a board,
wherein the at least one packaged chip and the at least one system component are assembled on the board.

B31. A chip-containing product comprising the system of clause B30, wherein the system is assembled on a further board with at least one other product component.

B32. Computer-readable code for fabrication of an apparatus according to any of clauses B1 to B29.

B33. A method comprising:
decoding instructions;
performing data processing in response to the decoded instructions; and
in response to decoding a mark-live instruction specifying mark-live target address information, setting discard-eligibility metadata associated with one or more target cache lines selected based on the mark-live target address information, to identify the one or more cache lines as being eligible for being treated as a discardable cache line which is allowed to be discarded without data writeback even if the discardable cache line is dirty; and
in response to a mark-dead event associated with a given cache line, determining depending on the discard-eligibility metadata for the given cache line whether the given cache line is eligible for becoming a discardable cache line.

B34. A computer program comprising instructions which, when executed by a host data processing apparatus, control the host data processing apparatus to provide an instruction execution environment for execution of target code, the computer program comprising:
instruction decoding program logic configured to decode instructions of the target code;
processing program logic configured to control the host data processing apparatus to perform data processing in response to the instructions decoded by the instruction decoding program logic; and
cache control program logic configured to:
set, in response to decoding a mark-live instruction specifying mark-live target address information, discard-eligibility metadata associated with one or more target cache lines selected based on the mark-live target address information, to identify the one or more target cache lines as being eligible for being treated as a discardable cache line which is allowed to be discarded without data writeback even if the discardable cache line is dirty; and
in response to a mark-dead event associated with a given cache line, determine depending on the discard-eligibility metadata for the given cache line whether the given cache line is eligible for becoming a discardable cache line.

C1. An apparatus comprising:
cache control circuitry configured to allocate, to a cache hierarchy comprising a plurality of levels of cache, one or more materialised cache lines corresponding to a region of address space indicated by software-provided information, each materialised cache line specifying a predetermined value as cached data; and cache level selection circuitry configured to select, based on a size of the region of address space indicated by the software-provided information, at least one target level of the plurality of levels of cache to which the one or more materialised cache lines are to be allocated.

C2. The apparatus of clause C1, wherein the predetermined value is zero.

C3. The apparatus of clause C1 or clause C2, wherein the cache level selection circuitry is configured to select a given level of the plurality of levels to be the at least one target level, based on whether the size of the region of address space exceeds a capacity threshold of the given level.

C4. The apparatus of clause C3, wherein in response to determining that the size of the region of address space does not exceed the capacity threshold of the given level, the cache level selection circuitry is configured to select the given level as one of the at least one target level.

C5. The apparatus of clause C3 or clause C4, wherein in response to determining that the size of the region of address space exceeds the capacity threshold of the given level, the cache level selection circuitry is configured to select, as the at least one target level:

the given level and a further level of the plurality of levels; or the further level.

C6. The apparatus of clause C5, wherein the further level has a larger capacity than the given level.

C7. The apparatus of any of clauses C5 to C6, wherein the further level comprises a private cache for holding cached data that is private to a processing element.

C8. The apparatus of any of clauses C5 to C6, wherein the further level comprises a shared cache for holding cached data shared between a plurality of processing elements.

C9. The apparatus of any of clauses C1 to C8, wherein cache control circuitry is configured to set discard-eligibility metadata associated with the one or more materialised cache lines, the discard-eligibility metadata indicating that each of the one or more materialised cache lines is eligible for being treated as a discardable cache line which is allowed to be discarded without data writeback even if the discardable cache line is dirty.

C10. The apparatus of any of clauses C1 to C9, wherein the cache line allocation circuitry is configured to allocate the one or more materialised cache lines without issuing a line fill request to obtain data from memory for the one or more materialised cache lines.

C11. The apparatus of any of clauses C1 to C10, comprising instruction decoding circuitry configured to decode instructions according to an instruction set architecture; and the software-provided information comprises mark-live target address information specified by a mark-live instruction decoded by the instruction decoding circuitry.

C12. The apparatus of clause C11, wherein the mark-live instruction specifies the mark-live target address information as an address range, and the cache line allocation circuitry is configured to identify, as the one or more materialised cache lines, cache lines which are entirely within the address range specified by the mark-live target address information.

C13. The apparatus of clause C12, wherein the mark-live instruction specifies a first end point of the address range; and the cache line allocation circuitry is configured to determine the second end point of the address range based on range size information stored in a control register.

C14. A system comprising:

the apparatus of any of clauses C1 to C13, implemented in at least one packaged chip;

at least one system component; and a board, wherein the at least one packaged chip and the at least one system component are assembled on the board.

C15. A chip-containing product comprising the system of clause C15, wherein the system is assembled on a further board with at least one other product component.

C16. A method comprising:

allocating, to a cache hierarchy comprising a plurality of levels of cache, one or more materialised cache lines corresponding to a region of address space indicated by software-provided information, each materialised cache line specifying a predetermined value as cached data; and selecting, based on a size of the region of address space indicated by the software-provided information, at least one target level of the plurality of levels of cache to which the one or more materialised cache lines are to be allocated.

C17. Computer-readable code for fabrication of an apparatus comprising:

cache control circuitry configured to allocate, to a cache hierarchy comprising a plurality of levels of cache, one or more materialised cache lines corresponding to a region of address space indicated by software-provided information, each materialised cache line specifying a predetermined value as cached data; and cache level selection circuitry configured to select, based on a size of the region of address space indicated by the software-provided information, at least one target level of the plurality of levels of cache to which the one or more materialised cache lines are to be allocated.

C18. A storage medium storing the computer-readable code of clause C17.

D1. Interconnect circuitry comprising:

receiving interface circuitry configured to receive, from a metadata-transmitting caching agent, discard control metadata for a given cache line previously held in a private cache of the data-transmitting caching agent; and transmitting interface circuitry configured to transmit the discard control metadata for the given cache line to a metadata-receiving caching agent for caching in a private cache of the metadata-receiving caching agent;

the discard control metadata indicating whether the given cache line is, or is eligible for becoming, a discardable cache line allowed to be discarded without data writeback even if the discardable cache line is dirty.

D2. The interconnect circuitry according to clause D1, comprising control circuitry configured to cache the discard-eligibility metadata received from the metadata-transmitting caching agent for the given cache line in a shared system cache shared between a plurality of caching agents.

D3. The interconnect circuitry according to clause D2, in which the control circuitry is configured to discard the discard-eligibility metadata for the given cache line from the shared system cache upon eviction of the given cache line from the shared system cache.

D4. The interconnect circuitry according to any of clauses D2 and D3, in which the transmitting interface circuitry is configured to transmit the discard control metadata cached in the shared system cache for the given cache line to the metadata-receiving caching agent in response to a linefill request received from the metadata-receiving caching agent requesting that the given cache line is allocated into the private cache of the metadata-receiving caching agent.

D5. The interconnect circuitry according to any of clauses D1 to D4, in which the transmitting interface circuitry is configured to support transmission of the discard control metadata set by the metadata-transmitting caching agent to the metadata-receiving caching agent, in a case where the metadata-receiving caching agent is a different caching agent to the metadata-transmitting caching agent.

D6. The interconnect circuitry according to any of clauses D1 to D5, in which the receiving interface circuitry is configured to receive the discard control metadata from the metadata-transmitting caching agent in a snoop data response which responds to a snoop request previously transmitted to the metadata-transmitting caching agent.

D7. The interconnect circuitry according to clause D6, in which the metadata-receiving caching agent is a different caching agent to the metadata-transmitting caching agent; and the transmitting interface circuitry is configured to transmit to the metadata-receiving caching agent a snoop forward response specifying the discard control metadata obtained from the snoop data response.

D8. The interconnect circuitry according to any of clauses D1 to D7, in which the receiving interface circuitry is configured to receive from the metadata-transmitting caching agent a writeback message or eviction message specifying the discard control metadata for the given cache line.

D9. The interconnect circuitry according to any of clauses D1 to D8, in which the transmitting interface circuitry is configured to transmit to the metadata-receiving caching agent a read data message providing read data and the discard control metadata for the given cache line to be allocated into the private cache of the metadata-receiving caching agent.

D10. The interconnect circuitry according to any of clauses D1 to D9, in which the discard control metadata comprises discard-indicating metadata indicating whether the given cache line is a discardable cache line.

D11. The interconnect circuitry according to any of clauses D1 to D10, in which the discard control metadata comprises discard-eligibility metadata indicating whether the given cache line is eligible to become a discardable cache line upon occurrence of a mark-dead event.

D12. The interconnect circuitry according to any of clauses D1 to D11, comprising control circuitry responsive to a mark-dead event request received from a given caching agent to cause a target cache line identified by the mark-dead event request to be treated as a discardable cache line.

D13. The interconnect circuitry according to clause D12, in which, in response to the mark-dead event request, whether the target cache line becomes treated as the discardable cache line is dependent on whether the discard control metadata associated with the target cache line indicates that the target cache line is eligible to become a discardable cache.

D14. The interconnect circuitry according to any of clauses D12 and D13, in which the control circuitry is configured to cause the target cache line to become treated as a discardable cache line in a system cache shared between a plurality of caching agents.

D15. The interconnect circuitry according to any of clauses D12 to D14, in which the control circuitry is configured to forward the mark-dead event request to a further caching agent, to cause the target cache line to become treated as a discardable cache line at the private cache of the further caching agent.

D16. The interconnect circuitry according to any of clauses D1 to D15, in which the discard-eligibility metadata for a given cache line is separate from a coherency state associated with the given cache line.

D17. The interconnect circuitry according to any of clauses D1 to D16, comprising home node circuitry configured to manage coherency of data cached in private caches of a plurality of caching agents.

D18. A system comprising:
the interconnect circuitry of any of clauses D1 to D17, implemented in at least one packaged chip;
at least one system component; and
a board,
wherein the at least one packaged chip and the at least one system component are assembled on the board.

D19. A chip-containing product comprising the system of clause D18, wherein the system is assembled on a further board with at least one other product component.

D20. Computer-readable code for fabrication of interconnect circuitry comprising:
receiving interface circuitry configured to receive, from a metadata-transmitting caching agent, discard control metadata for a given cache line previously held in a private cache of the data-transmitting caching agent; and
transmitting interface circuitry configured to transmit the discard control metadata for the given cache line to a metadata-receiving caching agent for caching in a private cache of the metadata-receiving caching agent;
the discard control metadata indicating whether the given cache line is, or is eligible for becoming, a discardable cache line allowed to be discarded without data writeback even if the discardable cache line is dirty.

D21. A method comprising:
receiving, from a metadata-transmitting caching agent, discard control metadata for a given cache line previously held in a private cache of the data-transmitting caching agent; and
transmitting the discard control metadata for the given cache line to a metadata-receiving caching agent for caching in a private cache of the metadata-receiving caching agent;
the discard control metadata indicating whether the given cache line is, or is eligible for becoming, a discardable cache line allowed to be discarded without data writeback even if the discardable cache line is dirty.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
instruction decoding circuitry configured to decode instructions;
processing circuitry configured to perform data processing in response to the instructions decoded by the instruction decoding circuitry; and
cache control circuitry configured to:
set, in response to the instruction decoding circuitry decoding a mark-live instruction specifying mark-live target address information, discard-eligibility metadata associated with one or more target cache lines selected based on the mark-live target address information, to identify the one or more target cache lines as being eligible for being treated as a discardable cache line which is allowed to be discarded without data writeback even if the discardable cache line is dirty; and
in response to a mark-dead event associated with a given cache line, determine depending on the discard-eligibility metadata for the given cache line whether the given cache line is eligible for becoming a discardable cache line.

2. The apparatus according to claim 1, in which, in response to the mark-live instruction, for a given target cache line identified based on the mark-live target address information which is not already cached in a designated level of cache designated to be allocated with the given target cache line, the cache control circuitry is configured to allocate the given target cache line to the designated level of cache specifying a predetermined value as cached data for the given target cache line, and set the discard-eligibility metadata for the given target cache line to indicate that the given target cache line is eligible for being treated as a discardable cache line.

3. The apparatus according to claim 2, in which the cache control circuitry is configured to generate the predetermined value as the cached data, without issuing a linefill request to obtain the cached data specifying the predetermined value from a further cache or memory.

4. The apparatus according to claim 2, in which the cache control circuitry is configured to allocate the given target cache line specifying the predetermined value to the given cache in a dirty-but-discardable state indicating that the given target cache line is dirty and is currently treated as a discardable cache line.

5. The apparatus according to claim 2, in which in response to the mark-live instruction, when the given target cache line is already cached in the designated level of cache in a clean state, the cache control circuitry is configured to retain the given target cache line in the designated level of cache in the clean state with the discard-eligibility metadata for the given target cache line set to indicate that the given target cache line is eligible for being treated as a discardable cache line.

6. The apparatus according to claim 2, in which in response to the mark-live instruction, the cache control circuitry is configured to set cached data held by the designated level of cache for the given target cache line to the predetermined value regardless of a previous coherency state in which the given target cache line is held in the designated level of cache.

7. The apparatus according to claim 1, in which the cache control circuitry is configured to identify, as the one or more target cache lines, one or more cache lines which are entirely within an address range identified based on the mark-live target address information.

8. The apparatus according to claim 7, in which the address range is defined by a range start address and a range end parameter, the mark-live instruction identifying at least the range start address as an operand of the make-live instruction.

9. The apparatus according to claim 1, in which, in response to the mark-dead event associated with mark-dead target address information, the cache control circuitry is configured to treat as a discardable cache line one or more cache lines corresponding to the mark-dead target address information which are indicated by the discard-eligibility metadata as being eligible for being treated as the discardable cache line.

10. The apparatus according to claim 9, in which, in response to the mark-dead event, for a given cache line corresponding to the mark-dead target address information which is indicated by the discard-eligibility metadata as being ineligible for being treated as the discardable cache line, the cache control circuitry is configured to prevent the given cache line being treated as a discardable cache line.

11. The apparatus according to claim 9, in which the cache control circuitry is configured to treat a given cache line as the discardable cache line by setting discard-indicating metadata for the given cache line indicating that the given cache line is discardable on eviction without data writeback even if the given cache line is dirty.

12. The apparatus according to claim 11, in which the cache control circuitry is configured to clear the discard-indicating metadata for the given cache line in response to detecting a read, write or snoop request to the given cache line.

13. The apparatus according to claim 1, in which the mark-dead event comprises execution of a mark-dead instruction specifying the mark-dead target address information.

14. The apparatus according to claim 1, in which the mark-dead event comprises receipt, from an interconnect, of a mark-dead event request specifying the mark-dead target address information.

15. The apparatus according to claim 1, in which, for at least one setting of the apparatus, the discard-eligibility metadata is allowed to be updated in response to a mark-live instruction executed in a least privileged execution state.

16. A system comprising:
the apparatus of claim 1, implemented in at least one packaged chip;
at least one system component; and
a board,
wherein the at least one packaged chip and the at least one system component are assembled on the board.

17. A chip-containing product comprising the system of claim 16, wherein the system is assembled on a further board with at least one other product component.

18. A non-transitory storage medium storing computer-readable code for fabrication of an apparatus according to claim 1.

19. A method comprising:

decoding instructions;

performing data processing in response to the decoded instructions; and in response to decoding a mark-live instruction specifying mark-live target address information, setting discard-eligibility metadata associated with one or more target cache lines selected based on the mark-live target address information, to identify the one or more target cache lines as being eligible for being treated as a discardable cache line which is allowed to be discarded without data writeback even if the discardable cache line is dirty; and in response to a mark-dead event associated with a given cache line, determining depending on the discard-eligibility metadata for the given cache line whether the given cache line is eligible for becoming a discardable cache line.

20. A non-transitory storage medium storing a computer program comprising instructions which, when executed by a host data processing apparatus, control the host data processing apparatus to provide an instruction execution environment for execution of target code, the computer program comprising:

instruction decoding program logic configured to decode instructions of the target code;

processing program logic configured to control the host data processing apparatus to perform data processing in response to the instructions decoded by the instruction decoding program logic; and cache control program logic configured to:

set, in response to decoding a mark-live instruction specifying mark-live target address information, discard-eligibility metadata associated with one or more target cache lines selected based on the mark-live target address information, to identify the one or more target cache lines as being eligible for being treated as a discardable cache line which is allowed to be discarded without data writeback even if the discardable cache line is dirty; and in response to a mark-dead event associated with a given cache line, determine depending on the discard-eligibility metadata for the given cache line whether the given cache line is eligible for becoming a discardable cache line.

\* \* \* \* \*